US012659754B2

(12) United States Patent     (10) Patent No.:   US 12,659,754 B2

Ying et al.     (45) Date of Patent:    Jun. 16, 2026

(54) SPECTRUM RESOURCE SHARING METHOD, DEVICE, AND SYSTEM

(71) Applicant: HUAWEI TECHNOLOGIES CO., LTD., Shenzhen (CN)

(72) Inventors: Jiangwei Ying, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 346 days.

(21) Appl. No.: 18/342,540

(22) Filed: Jun. 27, 2023

(65) Prior Publication Data

US 2023/0345255 A1     Oct. 26, 2023

Related U.S. Application Data

(63) Continuation of application No. PCT/CN2020/141107, filed on Dec. 29, 2020.

(51) Int. Cl.
*H04W 16/14*     (2009.01)
*H04W 8/02*     (2009.01)

(52) U.S. Cl.
CPC ............. *H04W 16/14* (2013.01); *H04W 8/02* (2013.01)

(58) Field of Classification Search
CPC ... H04W 48/02; H04W 12/06; H04W 84/042; H04W 88/12; H04W 12/08; H04W 48/18; H04W 16/14; H04W 8/02; H04W 8/18; H04W 88/14; H04L 63/101; H04L 63/0853
See application file for complete search history.

(56) References Cited

U.S. PATENT DOCUMENTS

| | | | |
|---|---|---|---|
| 2008/0043679 A1* | 2/2008 | Karlsson | H04W 16/14 |
| | | | 370/335 |
| 2014/0323140 A1 | 10/2014 | Yan et al. | |
| 2015/0099530 A1 | 4/2015 | Aminaka | |
| 2015/0173111 A1* | 6/2015 | Agarwal | H04W 8/04 |
| | | | 370/329 |
| 2019/0261264 A1* | 8/2019 | Lou | H04W 48/18 |
| 2020/0092795 A1* | 3/2020 | Raval | H04L 63/101 |

OTHER PUBLICATIONS

Search Report dated Dec. 4, 2023 from corresponding application No. EP20967477.

* cited by examiner

*Primary Examiner* — Dady Chery
(74) *Attorney, Agent, or Firm* — HAUPTMAN HAM, LLP

(57) ABSTRACT

A spectrum resource sharing method includes determining, by a mobility management entity, that a first terminal device is configured to be allowed to occupy a spectrum resource of a first network, wherein the first terminal device is configured to subscribe to a second network, and the mobility management entity is in the second network. The spectrum resource sharing method further includes sending, by the mobility management entity, first indication information to an access network device, wherein the first indication information is useable to indicate that the first terminal device is configured to be allowed to occupy the spectrum resource of the first network, and the access network device is shared by the first network and the second network.

13 Claims, 13 Drawing Sheets

30

| Session management entity | / 301 |

| Access network device | / 302 |

SPECTRUM RESOURCE SHARING METHOD, DEVICE, AND SYSTEM

CROSS-REFERENCE TO RELATED APPLICATIONS

This application is a continuation of International Application No. PCT/CN2020/141107, filed on Dec. 29, 2020, which is hereby incorporated by reference in its entirety.

TECHNICAL FIELD

One or more embodiments of the present application relate to the field of communication technologies, and in particular, to a spectrum resource sharing method, a device, and a system.

BACKGROUND

A multi-operator core network (MOCN) is one of a plurality of network sharing modes proposed by the 3rd generation partnership project (3GPP). The MOCN enables a radio network to connect to core network nodes of a plurality of networks, enabling a plurality of networks to share the same radio network. For example, as shown in FIG. 1, the MOCN allows a network corresponding to a public land mobile network (PLMN)-A and a network corresponding to a PLMN-B to share an access network device by using respective independent core network devices (for example, a core network device A in the PLMN-A and a core network device B in the PLMN-B) and share a serving cell of the access network device. The shared access network device sends, in cell broadcast, PLMN identifiers of all networks participating in sharing, and a terminal device performs access based on a PLMN identifier corresponding to the terminal device. It can be learned that the MOCN greatly improves sharing degrees of spectrum resources (also referred to as spectrums or radio resources for short), devices, transmission, and network management systems, and can reduce network construction costs to a maximum extent.

Currently, to efficiently implement 5th generation (5G) network coverage, quickly form a 5G service capability, enhance market competitiveness of 5G networks and services, and improve network efficiency and asset operation efficiency, many operators use the MOCN mode to jointly build 5G networks. To be specific, an access network is shared, a core network is constructed separately, and two or more operators share 5G spectrum resources to build a 5G network. However, in a network co-construction solution, how to improve user experience of a specific user (for example, a high-value user) or a specific service (for example, a high-value service) is an urgent problem to be resolved currently.

SUMMARY

One or more embodiments of the present application provide a spectrum resource sharing method, a device, and a system, to improve user experience of a specific user (for example, a high-value user) or a specific service (for example, a high-value service).

To achieve the foregoing objectives, the following technical solutions are used in one or more embodiments of the present application.

According to a first aspect, a spectrum resource sharing method is provided. A communication apparatus that performs the spectrum resource sharing method may be a mobility management entity, or may be a module used in the mobility management entity, for example, a chip or a chip system. The following uses an example in which an execution body is the mobility management entity for description. The method includes: The mobility management entity determines that a first terminal device is allowed to occupy a spectrum resource of a first network, where the first terminal device subscribes to a second network, and the mobility management entity is a mobility management entity in the second network; and the mobility management entity sends first indication information to an access network device, where the first indication information indicates that the first terminal device is allowed to occupy the spectrum resource of the first network, and the access network device is an access network device shared by the first network and the second network. Based on this solution, the access network device can occupy, only after the mobility management entity determines that the first terminal device is allowed to occupy the spectrum resource of the first network, the spectrum resource of the first network for the first terminal device based on the first indication information sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the first aspect, in some embodiments, that the mobility management entity determines that a first terminal device is allowed to occupy a spectrum resource of a first network includes: The mobility management entity determines, based on at least one of subscription information of the first terminal device, access and mobility control policy information of the first terminal device, or local policy information of the second network, that the first terminal device is allowed to occupy the spectrum resource of the first network. For example, the mobility management entity determines, based on the subscription information of the first terminal device, that the first terminal device is allowed to occupy the spectrum resource of the first network; the mobility management entity determines, based on the access and mobility control policy information, that the first terminal device is allowed to occupy the spectrum resource of the first network; the mobility management entity determines, based on the local policy information of the second network, that the first terminal device is allowed to occupy the spectrum resource of the first network; the mobility management entity determines, based on the subscription information of the first terminal device and the access and mobility control policy information, that the first terminal device is allowed to occupy the spectrum resource of the first network; the mobility management entity determines, based on the access and mobility control policy information and the local policy information of the second network, that the first terminal device is allowed to occupy the spectrum resource of the first network; the mobility management entity determines, based on the subscription information of the first terminal device and the local policy information of the second network, that the first terminal device is allowed to occupy the spectrum resource of the first network; or the mobility management entity determines, based on the subscription information of the first terminal device, the access and mobility control policy information, and the local policy information of the second network, that the first terminal device is allowed to occupy the spectrum resource of the first network.

With reference to the first aspect, in some embodiments, the subscription information of the first terminal device includes first information, and the first information indicates that the first terminal device is allowed to occupy the spectrum resource of the first network.

With reference to the first aspect, in some embodiments, the access and mobility control policy information includes second information, where the second information indicates that the first terminal device is allowed to occupy the spectrum resource of the first network in a first time period, in a first location area, and/or in a first spectrum resource, and the first spectrum resource is a spectrum resource in the first network.

With reference to the first aspect, in some embodiments, the local policy information of the second network includes third information, where the third information indicates that a terminal device that subscribes to the second network is allowed to occupy the spectrum resource of the first network.

With reference to the first aspect, in some embodiments, the spectrum resource sharing method provided in this embodiment of this application further includes: The mobility management entity sends, to the access network device, duration in which the first terminal device is allowed to occupy the spectrum resource of the first network. In this way, when duration in which the first terminal device occupies the spectrum resource of the first network reaches the duration, the access network device may no longer occupy the spectrum resource of the first network for the first terminal device, to effectively control occupation of a spectrum resource of another network.

With reference to the first aspect, in some embodiments, the spectrum resource sharing method provided in this embodiment of this application further includes: The mobility management entity receives a second message from the access network device, where the second message indicates that the second network to which the first terminal device subscribes has insufficient spectrum resources, or the second message is for requesting to determine whether the first terminal device is allowed to occupy the spectrum resource of the first network. In other words, in this solution, the access network device dynamically requests, based on a service requirement, the mobility management entity to determine whether the first terminal device is allowed to occupy the spectrum resource of the first network. Therefore, the solution design is more flexible.

According to a second aspect, a spectrum resource sharing method is provided. A communication apparatus that performs the spectrum resource sharing method may be an access network device, or may be a module used in the access network device, for example, a chip or a chip system. The following uses an example in which an execution body is the access network device for description. The method includes: The access network device receives first indication information from a mobility management entity, where the first indication information indicates that a first terminal device is allowed to occupy a spectrum resource of a first network, the first terminal device subscribes to a second network, the mobility management entity is a mobility management entity in the second network, and the access network device is an access network device shared by the first network and the second network; and the access network device occupies the spectrum resource of the first network for the first terminal device based on the first indication information. Based on this solution, the access network device can occupy, only after the mobility management entity determines that the first terminal device is allowed to occupy the spectrum resource of the first network, the spectrum resource of the first network for the first terminal device based on the first indication information sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the second aspect, in some embodiments, the spectrum resource sharing method provided in this embodiment of this application further includes: The access network device receives, from the mobility management entity, duration in which the first terminal device is allowed to occupy the spectrum resource of the first network; and when duration in which the first terminal device occupies the spectrum resource of the first network reaches the duration, the access network device no longer occupies the spectrum resource of the first network for the first terminal device. Based on this solution, occupation of spectrum resources of another network can be effective controlled.

With reference to the second aspect, in some embodiments, the spectrum resource sharing method provided in this embodiment of this application further includes: The access network device sends a second message to the mobility management entity when the access network device determines that a required quantity of spectrum resources of the second network to which the first terminal device subscribes is greater than or equal to a preset threshold, where the second message indicates that the second network to which the first terminal device subscribes has insufficient spectrum resources, or the second message is for requesting to determine whether the first terminal device is allowed to occupy the spectrum resource of the first network. In other words, in this solution, the access network device dynamically requests, based on a service requirement, the mobility management entity to determine whether the first terminal device is allowed to occupy the spectrum resource of the first network. Therefore, the solution design is more flexible.

According to a third aspect, a spectrum resource sharing method is provided. A communication apparatus that performs the spectrum resource sharing method may be a mobility management entity, or may be a module used in the mobility management entity, for example, a chip or a chip system. The following uses an example in which an execution body is the mobility management entity for description. The method includes: The mobility management entity determines that a first service of a first terminal device is allowed to occupy a spectrum resource of a first network, where the first terminal device subscribes to a second network, and the mobility management entity is a mobility management entity in the second network; and the mobility management entity sends second indication information to an access network device, where the second indication information indicates that the first service of the first terminal device is allowed to occupy the spectrum resource of the first network, and the access network device is an access network device shared by the first network and the second network. Based on this solution, the access network device can occupy, only after the mobility management entity determines that the first service of the first terminal device is allowed to occupy the spectrum resource of the first network, the spectrum resource of the first network for the first service of the first terminal device based on the second indication information sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the third aspect, in some embodiments, that the mobility management entity determines that a first service of a first terminal device is allowed to occupy a spectrum resource of a first network includes: The mobility management entity determines, based on at least one of subscription information of the first terminal device, access and mobility control policy information of the first terminal device, or local policy information of the second network, that the first service of the first terminal device is allowed to occupy the spectrum resource of the first network. For example, the mobility management entity determines, based on the subscription information of the first terminal device, that the first service of the first terminal device is allowed to occupy the spectrum resource of the first network; the mobility management entity determines, based on the access and mobility control policy information, that the first service of the first terminal device is allowed to occupy the spectrum resource of the first network; the mobility management entity determines, based on the local policy information of the second network, that the first service of the first terminal device is allowed to occupy the spectrum resource of the first network; the mobility management entity determines, based on the subscription information of the first terminal device and the access and mobility control policy information, that the first service of the first terminal device is allowed to occupy the spectrum resource of the first network; the mobility management entity determines, based on the access and mobility control policy information and the local policy information of the second network, that the first service of the first terminal device is allowed to occupy the spectrum resource of the first network; the mobility management entity determines, based on the subscription information of the first terminal device and the local policy information of the second network, that the first service of the first terminal device is allowed to occupy the spectrum resource of the first network; the mobility management entity determines, based on the subscription information of the first terminal device, the access and mobility control policy information, and the local policy information of the second network, that the first service of the first terminal device is allowed to occupy the spectrum resource of the first network.

With reference to the third aspect, in some embodiments, the subscription information of the first terminal device includes at least one of the following: first information, fourth information, or identification information of the first service, where the first information indicates that the first terminal device is allowed to occupy the spectrum resource of the first network, and the fourth information indicates that the first service of the first terminal device is allowed to occupy the spectrum resource of the first network.

With reference to the third aspect, in some embodiments, the access and mobility control policy information includes fifth information, where the fifth information indicates that the first service of the first terminal device is allowed to occupy the spectrum resource of the first network in a first time period, in a first location area, and/or in a first spectrum resource, and the first spectrum resource is a spectrum resource in the first network.

With reference to the third aspect, in some embodiments, the local policy information of the second network includes sixth information, where sixth third information indicates that a first service of a terminal device that subscribes to the second network is allowed to occupy the spectrum resource of the first network.

With reference to the third aspect, in some embodiments, the spectrum resource sharing method provided in this embodiment of this application further includes: The mobility management entity sends, to the access network device, duration in which the first service of the first terminal device is allowed to occupy the spectrum resource of the first network. In this way, when duration in which the first service of the first terminal device occupies the spectrum resource of the first network reaches the duration, the access network device may no longer occupy the spectrum resource of the first network for the first service of the first terminal device, to effectively control occupation of a spectrum resource of another network.

With reference to the third aspect, in some embodiments, the spectrum resource sharing method provided in this embodiment of this application further includes: The mobility management entity receives a fourth message from the access network device, where the fourth message indicates that the second network to which the first terminal device subscribes has insufficient spectrum resources, or the fourth message is for requesting to determine whether the first terminal device or the first service of the first terminal device is allowed to occupy the spectrum resource of the first network. In this solution, the access network device dynamically requests, based on a service requirement, the mobility management entity to determine whether the first service of the first terminal device is allowed to occupy the spectrum resource of the first network. Therefore, the solution design is more flexible.

According to a fourth aspect, a spectrum resource sharing method is provided. A communication apparatus that performs the spectrum resource sharing method may be an access network device, or may be a module used in the access network device, for example, a chip or a chip system. The following uses an example in which an execution body is the access network device for description. The method includes: The access network device receives second indication information from a mobility management entity, where the second indication information indicates that a first service of a first terminal device is allowed to occupy a spectrum resource of a first network, the first terminal device subscribes to a second network, the mobility management entity is a mobility management entity in the second network, and the access network device is an access network device shared by the first network and the second network; and the access network device occupies the spectrum resource of the first network for the first service of the first terminal device based on the second indication information. Based on this solution, the access network device can occupy, only after the mobility management entity determines that the first service of the first terminal device is allowed to occupy the spectrum resource of the first network, the spectrum resource of the first network for the first service of the first terminal device based on the second indication information sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the fourth aspect, in some embodiments, the spectrum resource sharing method provided in this embodiment of this application further includes: The access network device receives, from the mobility management entity, duration in which the first service of the first terminal device is allowed to occupy the spectrum resource of the first network; and when duration in which the first service of the first terminal device occupies the spectrum resource of the first network reaches the duration, the access network device no longer occupies the spectrum resource of the first network for the first service of the first terminal device. Based on this solution, occupation of spectrum resources of another network can be effective controlled.

With reference to the fourth aspect, in some embodiments, the spectrum resource sharing method provided in this embodiment of this application further includes: The access network device sends a fourth message to the mobility management entity when the access network device determines that a required quantity of spectrum resources of the second network to which the first terminal device subscribes is greater than or equal to a preset threshold, where the fourth message indicates that the second network to which the first terminal device subscribes has insufficient spectrum resources, or the fourth message is for requesting to determine whether the first terminal device or the first service of the first terminal device is allowed to occupy the spectrum resource of the first network. In this solution, the access network device dynamically requests, based on a service requirement, the mobility management entity to determine whether the first service of the first terminal device is allowed to occupy the spectrum resource of the first network. Therefore, the solution design is more flexible.

According to a fifth aspect, a spectrum resource sharing method is provided. A communication apparatus that performs the spectrum resource sharing method may be a session management entity, or may be a module used in the session management entity, for example, a chip or a chip system. The following uses an example in which an execution body is the session management entity for description. The method includes: The session management entity determines that a first session of a first terminal device or a first quality of service QoS flow of the first session of the first terminal device is allowed to occupy a spectrum resource of a first network, where the first terminal device subscribes to a second network, and the session management entity is a session management entity in the second network; and the session management entity sends third indication information to an access network device, where the third indication information indicates that the first session of the first terminal device is allowed to occupy the spectrum resource of the first network, or the third indication information indicates that the first QoS flow of the first session of the first terminal device is allowed to occupy the spectrum resource of the first network, and the access network device is an access network device shared by the first network and the second network. Based on this solution, the access network device can occupy, only after the session management entity determines that the first session of the first terminal device or the first QoS flow of the first session of the first terminal device is allowed to occupy the spectrum resource of the first network, the spectrum resource of the first network for the first session of the first terminal device or the first QoS flow of the first session of the first terminal device based on the third indication information sent by the session management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the fifth aspect, in some embodiments, the third indication information indicates that the first QoS flow of the first session of the first terminal device is allowed to occupy the spectrum resource of the first network. The spectrum resource sharing method provided in this embodiment of this application further includes: The session management entity receives a fifth message from a policy control entity, where the fifth message includes session policy information of the first terminal device. In other words, after determining whether the first QoS flow of the first session of the first terminal device is allowed to occupy the spectrum resource of the first network, the policy control entity may trigger the session management entity to determine whether the first QoS flow of the first session of the first terminal device is allowed to occupy the spectrum resource of the first network.

According to a sixth aspect, a spectrum resource sharing method is provided. A communication apparatus that performs the spectrum resource sharing method may be a session management entity, or may be a module used in the session management entity, for example, a chip or a chip system. The following uses an example in which an execution body is the session management entity for description.

The method includes: The session management entity receives a sixth message, where the sixth message indicates that a second network to which a first terminal device subscribes has insufficient spectrum resources, or the sixth message is for requesting to determine whether a first session of the first terminal device or a first QoS flow of the first session of the first terminal device is allowed to occupy a spectrum resource of a first network, the first terminal device subscribes to the second network, and the session management entity is a session management entity in the second network; in response to the sixth message, the session management entity determines that the first session of the first terminal device or the first quality of service QoS flow of the first session of the first terminal device is allowed to occupy the spectrum resource of the first network; and the session management entity sends third indication information to an access network device, where the third indication information indicates that the first session of the first terminal device is allowed to occupy the spectrum resource of the first network, or the third indication information indicates that the first QoS flow of the first session of the first terminal device is allowed to occupy the spectrum resource of the first network, and the access network device is an access network device shared by the first network and the second network. Based on this solution, the access network device can occupy, only after the session management entity determines that the first session of the first terminal device or the first QoS flow of the first session of the first terminal device is allowed to occupy the spectrum resource of the first network, the spectrum resource of the first network for the first session of the first terminal device or the first QoS flow of the first session of the first terminal device based on the third indication information sent by the session management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator. In addition, in this solution, the access network device dynamically requests, based on a service requirement, the session management entity to determine whether the first session of the first terminal device or the first QoS flow of the first session of the first terminal device is allowed to occupy the spectrum resource of the first network. Therefore, the solution design is more flexible.

With reference to the sixth aspect, in some embodiments, the spectrum resource sharing method provided in this embodiment of this application further includes: The session management entity sends, to the access network device, duration in which the first session of the first terminal device or the first QoS flow of the first session of the first terminal device is allowed to occupy the spectrum resource of the first network. In this way, when duration in which the first session of the first terminal device or the first QoS flow of the first session of the first terminal device occupies the spectrum resource of the first network reaches the duration, the access network device may no longer occupy the spectrum resource of the first network for the first session of the first terminal device or the first QoS flow of the first session of the first terminal device, to effectively control occupation of a spectrum resource of another network.

With reference to the fifth aspect or the sixth aspect, in some embodiments, that the session management entity determines that the first session of the first terminal device or the first QoS flow of the first session of the first terminal device is allowed to occupy the spectrum resource of the first network includes: The session management entity determines, based on subscription information of the first terminal device and/or session policy information of the first terminal device, that the first session of the first terminal device is allowed to occupy the spectrum resource of the first network; or the session management entity determines, based on subscription information of the first terminal device and/or session policy information of the first terminal device, that the first QoS flow of the first session of the first terminal device is allowed to occupy the spectrum resource of the first network. For example, the session management entity may determine, based on the subscription information of the first terminal device, that the first session of the first terminal device or the first QoS flow of the first session of the first terminal device is allowed to occupy the spectrum resource of the first network; or the session management entity determines, based on the session policy information of the first terminal device, that the first session of the first terminal device or the first QoS flow of the first session of the first terminal device is allowed to occupy the spectrum resource of the first network. For example, the session management entity may determine, based on the subscription information and the session policy information of the first terminal device, that the first session of the first terminal device or the first QoS flow of the first session of the first terminal device is allowed to occupy the spectrum resource of the first network.

With reference to the fifth aspect or the sixth aspect, in some embodiments, a service corresponding to the first QoS flow of the first session of the first terminal device is a first service, and the subscription information of the first terminal device includes at least one of the following: first information, fourth information, or identification information of the first service, where the first information indicates that the first terminal device is allowed to occupy the spectrum resource of the first network, and the fourth information indicates that the first service of the first terminal device is allowed to occupy the spectrum resource of the first network.

With reference to the fifth aspect or the sixth aspect, in some embodiments, the service corresponding to the first QoS flow of the first session of the first terminal device is the first service, and the session policy information of the first terminal device includes seventh information, where the seventh information indicates that the first service of the first terminal device is allowed to occupy the spectrum resource of the first network.

According to a seventh aspect, a spectrum resource sharing method is provided. A communication apparatus that performs the spectrum resource sharing method may be an access network device, or may be a module used in the access network device, for example, a chip or a chip system. The following uses an example in which an execution body is the access network device for description. The method includes: The access network device receives third indication information from a session management entity, where the third indication information indicates that a first session of a first terminal device is allowed to occupy a spectrum resource of a first network or the third indication information indicates that a first quality of service QoS flow of the first session of the first terminal device is allowed to occupy the spectrum resource of the first network, the first terminal device subscribes to a second network, the session management entity is a session management entity in the second network, and the access network device is an access network device shared by the first network and the second network; and the access network device occupies the spectrum resource of the first network for the first session of the first terminal device or the first QoS flow of the first session of the first terminal device based on the third indication information. Based on this solution, the access network device can occupy, only after the session management entity determines that the first session of the first terminal device or the first QoS flow of the first session of the first terminal device is allowed to occupy the spectrum resource of the first network, the spectrum resource of the first network for the first session of the first terminal device or the first QoS flow of the first session of the first terminal device based on the third indication information sent by the session management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the seventh aspect, in some embodiments, before the access network device receives the third indication information from the session management entity, the spectrum resource sharing method provided in this embodiment of this application further includes: The access network device sends a sixth message to a mobility management entity when the access network device determines that a required quantity of spectrum resources of the second network to which the first terminal device subscribes is greater than or equal to a preset threshold, where the sixth message indicates that the second network to which the first terminal device subscribes has insufficient spectrum resources, or the sixth message is for requesting to determine whether the first session of the first terminal device or the first QoS flow of the first session of the first terminal device is allowed to occupy the spectrum resource of the first network. In other words, in this solution, the access network device dynamically requests, based on a service requirement, the mobility management entity to determine whether the first session of the first terminal device or the first QoS flow of the first session of the first terminal device is allowed to occupy the spectrum resource of the first network. Therefore, the solution design is more flexible.

With reference to the seventh aspect, in some embodiments, the spectrum resource sharing method provided in this embodiment of this application further includes: The access network device receives, from the session management entity, duration in which the first session of the first terminal device or the first QoS flow of the first session of the first terminal device is allowed to occupy the spectrum resource of the first network; and when duration in which the first session of the first terminal device or the first QoS flow of the first session of the first terminal device occupies the spectrum resource of the first network reaches the duration, the access network device no longer occupies the spectrum resource of the first network for the first session of the first terminal device or the first QoS flow of the first session of the first terminal device. Based on this solution, occupation of spectrum resources of another network can be effective controlled.

According to an eighth aspect, a spectrum resource sharing method is provided. A communication apparatus that performs the spectrum resource sharing method may be a mobility management entity, or may be a module used in the mobility management entity, for example, a chip or a chip system. The following uses an example in which an execution body is the mobility management entity for description. The method includes: The mobility management entity obtains subscription information of a first terminal device, where the subscription information of the first terminal device includes information about a first spectrum resource, the first spectrum resource is a spectrum resource that is of a first network and that is allowed to be occupied by the first terminal device, the first terminal device subscribes to a second network, and the mobility management entity is a mobility management entity in the second network; and the mobility management entity sends the information about the first spectrum resource to an access network device, where the access network device is an access network device shared by the first network and the second network. Based on this solution, the access network device can occupy, only after the mobility management entity determines that the first terminal device is allowed to occupy the spectrum resource of the first network, the first spectrum resource for the first terminal device based on the information about the first spectrum resource sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

According to a ninth aspect, a spectrum resource sharing method is provided. A communication apparatus that performs the spectrum resource sharing method may be an access network device, or may be a module used in the access network device, for example, a chip or a chip system. The following uses an example in which an execution body is the access network device for description. The method includes: The access network device receives information about a first spectrum resource from a mobility management entity, where the first spectrum resource is a spectrum resource that is of a first network and that is allowed to be occupied by a first terminal device, the first terminal device subscribes to a second network, the mobility management entity is a mobility management entity in the second network, and the access network device is an access network device shared by the first network and the second network; and the access network device occupies the first spectrum resource for the first terminal device. Based on this solution, the access network device can occupy, only after the mobility management entity determines that the first terminal device is allowed to occupy the spectrum resource of the first network, the first spectrum resource for the first terminal device based on the information about the first spectrum resource sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

According to a tenth aspect, a spectrum resource sharing method is provided. A communication apparatus that performs the spectrum resource sharing method may be a mobility management entity, or may be a module used in the mobility management entity, for example, a chip or a chip system. The following uses an example in which an execution body is the mobility management entity for description. The method includes: The mobility management entity obtains subscription information of a first terminal device, where the subscription information of the first terminal device includes information about a second spectrum resource, the second spectrum resource is a spectrum resource that is of a first network and that is allowed to be occupied by a first service of the first terminal device, the first terminal device subscribes to a second network, and the mobility management entity is a mobility management entity in the second network; and the mobility management entity sends the information about the second spectrum resource to an access network device, where the access network device is an access network device shared by the first network and the second network. Based on this solution, the access network device can occupy, only after the mobility management entity determines that the first service of the first terminal device is allowed to occupy the spectrum resource of the first network, the second spectrum resource for the first service of the first terminal device based on the information about the second spectrum resource sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the tenth aspect, in some embodiments, the information about the second spectrum resource includes a first identifier, where there is a mapping relationship between the first identifier, an identifier of the second spectrum resource, and identification information of the first service. In other words, in this embodiment of this application, the first service of the first terminal device that can occupy the spectrum resource of the first network and the second spectrum resource that is of the first network and that is allowed to be occupied may be learned of based on the first identifier.

With reference to the tenth aspect, in some embodiments, the information about the second spectrum resource includes an identifier of the second spectrum resource and identification information of the first service.

According to an eleventh aspect, a spectrum resource sharing method is provided. A communication apparatus that performs the spectrum resource sharing method may be an access network device, or may be a module used in the access network device, for example, a chip or a chip system. The following uses an example in which an execution body is the access network device for description. The method includes: The access network device receives information about a second spectrum resource from a mobility management entity, where the second spectrum resource is a spectrum resource that is of a first network and that is allowed to be occupied by a first service of a first terminal device, the first terminal device subscribes to a second network, the mobility management entity is a mobility management entity in the second network, and the access network device is an access network device shared by the first network and the second network; and the access network device occupies the second spectrum resource for the first service of the first terminal device based on the information about the second spectrum resource. Based on this solution, the access network device can occupy, only after the mobility management entity determines that the first service of the first terminal device is allowed to occupy the spectrum resource of the first network, the second spectrum resource for the first service of the first terminal device based on the information about the second spectrum resource sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the eleventh aspect, in some embodiments, the information about the second spectrum resource includes a first identifier, where there is a mapping relationship between the first identifier, an identifier of the second spectrum resource, and identification information of the first service. In other words, in this embodiment of this application, the first service of the first terminal device that can occupy the spectrum resource of the first network and the second spectrum resource that is of the first network and that is allowed to be occupied may be learned of based on the first identifier.

With reference to the eleventh aspect, in some embodiments, when the information about the second spectrum resource includes the first identifier, that the access network device occupies the second spectrum resource for the first service of the first terminal device based on the information about the second spectrum resource includes: The access network device determines the second spectrum resource based on the first identifier and a mapping relationship between the first identifier and the identifier of the second spectrum resource; the access network device determines the first service based on the first identifier and a mapping relationship between the first identifier and the identification information of the first service; and the access network device occupies the second spectrum resource for the first service of the first terminal device.

With reference to the eleventh aspect, in some embodiments, the information about the second spectrum resource includes an identifier of the second spectrum resource and identification information of the first service.

According to a twelfth aspect, a spectrum resource sharing method is provided. A communication apparatus that performs the spectrum resource sharing method may be a mobility management entity, or may be a module used in the mobility management entity, for example, a chip or a chip system. The following uses an example in which an execution body is the mobility management entity for description. The method includes: The mobility management entity obtains first indication information, where the first indication information indicates that a first terminal device is allowed to occupy a spectrum resource of a first network, the first terminal device subscribes to a second network, and the mobility management entity is a mobility management entity in the second network; and the mobility management entity sends the first indication information to an access network device, where the first indication information indicates that the first terminal device is allowed to occupy the spectrum resource of the first network, and the access network device is an access network device shared by the first network and the second network. Based on this solution, the access network device may obtain the first indication information from the mobility management entity, and occupy the spectrum resource of the first network for the first terminal device based on the first indication information. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the twelfth aspect, in some embodiments, that the mobility management entity obtains first indication information includes: The mobility management entity obtains the first indication information from subscription information of the first terminal device, access and mobility control policy information of the first terminal device, or local policy information of the second network.

According to a thirteenth aspect, a spectrum resource sharing method is provided. A communication apparatus that performs the spectrum resource sharing method may be a mobility management entity, or may be a module used in the mobility management entity, for example, a chip or a chip system. The following uses an example in which an execution body is the mobility management entity for description.

The method includes: The mobility management entity obtains second indication information, where the second indication information indicates that a first service of a first terminal device is allowed to occupy a spectrum resource of a first network, the first terminal device subscribes to a second network, and the mobility management entity is a mobility management entity in the second network; and the mobility management entity sends the second indication information to an access network device, where the access network device is an access network device shared by the first network and the second network. Based on this solution, the access network device may obtain the second indication information from the mobility management entity, and occupy the spectrum resource of the first network for the first service of the first terminal device based on the second indication information. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the thirteenth aspect, in some embodiments, that the mobility management entity obtains second indication information includes: The mobility management entity obtains the second indication information from subscription information of the first terminal device, access and mobility control policy information of the first terminal device, or local policy information of the second network.

According to a fourteenth aspect, a spectrum resource sharing method is provided. A communication apparatus that performs the spectrum resource sharing method may be a session management entity, or may be a module used in the session management entity, for example, a chip or a chip system. The following uses an example in which an execution body is the session management entity for description. The method includes: The session management entity obtains third indication information, where the third indication information indicates that a first session of a first terminal device is allowed to occupy a spectrum resource of a first network, or the third indication information indicates that a first QoS flow of the first session of the first terminal device is allowed to occupy the spectrum resource of the first network, the first terminal device subscribes to a second network, and the session management entity is a mobility management entity in the second network; and the session management entity sends the third indication information to an access network device, where the access network device is an access network device shared by the first network and the second network. Based on this solution, the access network device may obtain the third indication information from the session management entity, and occupy the spectrum resource of the first network for the first session of the first terminal device or the first QoS flow of the first session of the first terminal device based on the third indication information. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

With reference to the fourteenth aspect, in some embodiments, that the session management entity obtains third indication information includes: The session management entity obtains the third indication information from subscription information of the first terminal device or session policy information of the first terminal device.

With reference to any one of the foregoing aspects, in some embodiments, the first network is a first public land mobile network PLMN network, and the second network is a second PLMN network; the first network is a public network, and the second network is a private network; or the first network is a private network, and the second network is a public network. In other words, in embodiments of this application, a terminal device may occupy spectrum resources of different types of networks in a subscribed operator network, or may occupy a spectrum resource of another operator network. This is not specifically limited in embodiments of this application.

According to a fifteenth aspect, a communication apparatus is provided, and is configured to implement the foregoing methods. The communication apparatus may be the mobility management entity in the first aspect, the third aspect, the eighth aspect, the tenth aspect, the twelfth aspect, or the thirteenth aspect, an apparatus including the mobility management entity, or a module used in the mobility management entity, for example, a chip or a chip system. Alternatively, the communication apparatus may be the access network device in the second aspect, the fourth aspect, the seventh aspect, the ninth aspect, or the eleventh aspect, an apparatus including the access network device, or a module used in the access network device, for example, a chip or a chip system. Alternatively, the communication apparatus may be the session management entity in the fifth aspect, the sixth aspect, or the fourteenth aspect, an apparatus including the session management entity, or a module used in the session management entity, for example, a chip or a chip system. The communication apparatus includes a corresponding module, unit, or means for performing the foregoing methods. The module, unit, or means may be implemented by using hardware or software, or may be implemented by using hardware executing corresponding software. The hardware or the software includes one or more modules or units corresponding to the foregoing functions.

With reference to the fifteenth aspect, in some embodiments, the communication apparatus includes a processing module and a transceiver module. The processing module is configured to perform a message processing operation or a control operation performed on the communication apparatus side in the method according to any one of the foregoing aspects. The transceiver module is configured to perform message receiving and sending operations on the communication apparatus in the method according to any one of the foregoing aspects.

With reference to the fifteenth aspect, in some embodiments, the communication apparatus includes a processor and a transceiver. The processor is configured to perform a message processing operation or a control operation performed on the communication apparatus side in the method according to any one of the foregoing aspects. The transceiver is configured to perform message receiving and sending operations on the communication apparatus in the method according to any one of the foregoing aspects.

According to a sixteenth aspect, a communication apparatus is provided. The apparatus includes: a processor, where the processor is coupled to a memory, and is configured to: read computer instructions stored in the memory, perform, according to the instructions, the method according to any one of the foregoing aspects.

With reference to the sixteenth aspect, in some embodiments, the communication apparatus further includes the memory, and the memory is configured to store the computer instructions.

With reference to the sixteenth aspect, in some embodiments, the communication apparatus further includes a communication interface, and the communication interface is used by the communication apparatus to communicate with another device. For example, the communication interface may be a transceiver, an input/output interface, an interface circuit, an output circuit, an input circuit, a pin, or a related circuit.

With reference to the sixteenth aspect, in some embodiments, the interface circuit may be a code/data read/write interface circuit. The interface circuit is configured to receive computer-executable instructions (the computer execution instructions are stored in the memory, and may be directly read from the memory, or may be read by using another component) and transmit the computer-executable instructions to the processor. The processor is configured to run the computer-executable instructions to perform the method according to any one of the foregoing aspects.

With reference to the sixteenth aspect, in some embodiments, the communication apparatus may be a chip or a chip system. When the communication apparatus is the chip system, the communication apparatus may include a chip, or may include the chip and another discrete device.

With reference to the sixteenth aspect, in some embodiments, when the communication apparatus is the chip or the chip system, the communication interface may be an input/output interface, an interface circuit, an output circuit, an input circuit, a pin, a related circuit, or the like on the chip or the chip system. The processor may also be embodied as a processing circuit or a logic circuit.

According to a seventeenth aspect, a computer-readable storage medium is provided. The computer-readable storage medium stores instructions. When the instructions are run on a computer, the computer is enabled to perform the method according to any one of the foregoing aspects.

According to an eighteenth aspect, a computer program product including instructions is provided. When the computer program product runs on a computer, the computer is enabled to perform the method according to any one of the foregoing aspects.

For technical effects achieved by any one of the possible implementations of the fifteenth aspect to the eighteenth aspect, refer to the technical effects achieved by different implementations of any one of the first aspect to the fourteenth aspect. Details are not described herein again.

According to a nineteenth aspect, a communication system is provided. The communication system includes a mobility management entity that performs the spectrum resource sharing method according to the first aspect and an access network device that performs the spectrum resource sharing method according to the second aspect; the communication system includes a mobility management entity that performs the spectrum resource sharing method according to the twelfth aspect and an access network device that performs the spectrum resource sharing method according to the second aspect; the communication system includes a mobility management entity that performs the spectrum resource sharing method according to the third aspect and an access network device that performs the spectrum resource sharing method according to the fourth aspect; the communication system includes a mobility management entity that performs the spectrum resource sharing method according to the thirteenth aspect and an access network device that performs the spectrum resource sharing method according to the fourth aspect; the communication system includes a session management entity that performs the spectrum resource sharing method according to the fifth aspect and an access network device that performs the spectrum resource sharing method according to the seventh aspect; the communication system includes a session management entity that performs the spectrum resource sharing method according to the sixth aspect and an access network device that performs the spectrum resource sharing method according to the seventh aspect; the communication system includes a mobility management entity that performs the spectrum resource sharing method according to the eighth aspect and an access network device that performs the spectrum resource sharing method according to the ninth aspect; the communication system includes a session management entity that performs the spectrum resource sharing method according to the fourteenth aspect and an access network device that performs the spectrum resource sharing method according to the seventh aspect; or the communication system includes a mobility management entity that performs the spectrum resource sharing method according to the tenth aspect and an access network device that performs the spectrum resource sharing method according to the eleventh aspect.

DETAILED DESCRIPTION

Figures 1, 2:
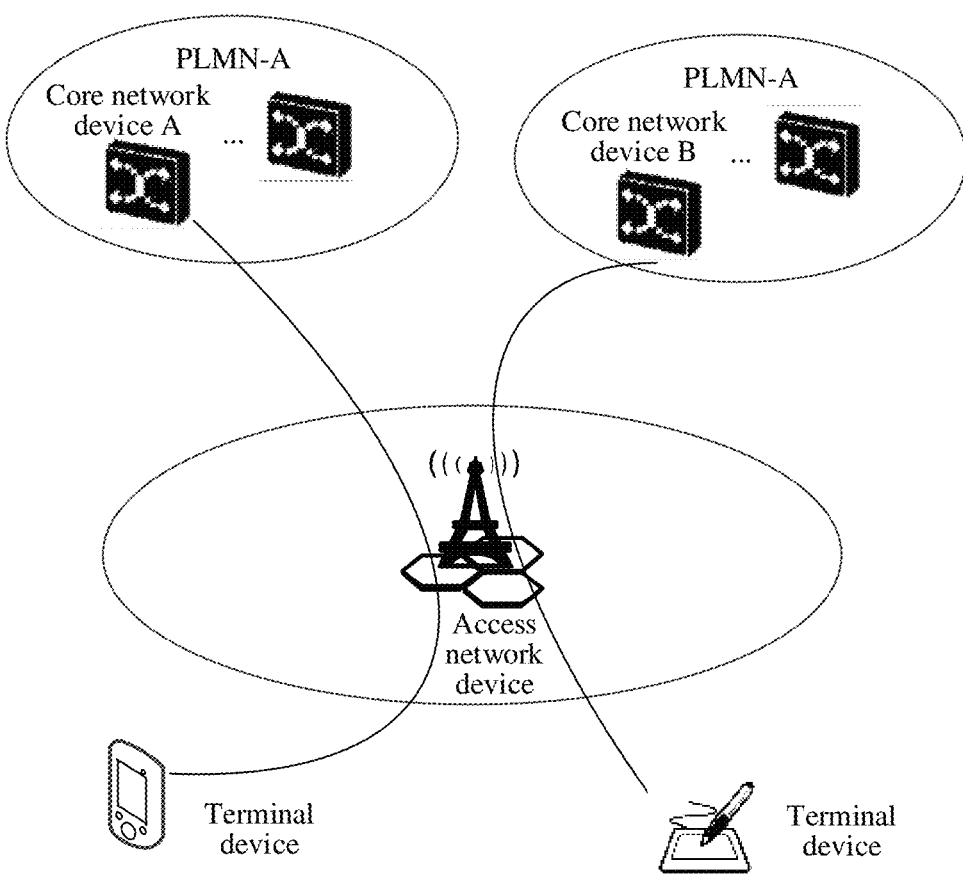
FIG. 1 is a schematic diagram of an architecture of an MOCN sharing mode in some approaches.
FIG. 2 is a schematic diagram of a structure of a communication system according to an embodiment of this application.

The following describes the technical solutions in embodiments of this application with reference to the accompanying drawings in embodiments of this application. In descriptions of this application, "/" represents an "or" relationship between associated objects unless otherwise specified. For example, AB may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In a network co-construction solution, if spectrum resources of another network are unconditionally occupied for all terminal devices or all services of the terminal devices, spectrum resources are insufficient and services of some terminal devices are congested. As a result, experience of a specific user (for example, a high-value user) or a specific service (for example, a high-value service) deteriorates. In addition, because the spectrum resources of the another network are used with compensation, when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This is not in line with commercial interests of the operator.

FIG. 2 shows a communication system 20 according to an embodiment of this application. The communication system 20 includes a mobility management entity 201 and an access network device 202. The mobility management entity 201 is a mobility management entity in a second network, and the access network device 202 is an access network device shared by a first network and the second network. The mobility management entity 201 and the access network device 202 may directly communicate with each other, or may communicate with each other through forwarding by another device. This is not specifically limited in this embodiment of this application.

In some embodiments, the mobility management entity 201 is configured to send first indication information to the access network device 202 after determining that a first terminal device is allowed to occupy a spectrum resource of the first network, where the first indication information indicates that the first terminal device is allowed to occupy the spectrum resource of the first network. The first terminal device subscribes to the second network. The access network device 202 is configured to: receive the first indication information from the mobility management entity, and occupy the spectrum resource of the first network for the first terminal device based on the first indication information. Specific implementation and related technical effects of the solution are described in detail in subsequent method embodiments. Details are not described herein.

In another possible implementation, the mobility management entity 201 is configured to send second indication information to the access network device 202 after determining that a first service of a first terminal device is allowed to occupy a spectrum resource of the first network, where the second indication information indicates that the first service of the first terminal device is allowed to occupy the spectrum resource of the first network, and the first terminal device subscribes to the second network. The access network device 202 is configured to: receive the second indication information from the mobility management entity, and occupy the spectrum resource of the first network for the first service of the first terminal device based on the second indication information. Specific implementation and related technical effects of the solution are described in detail in subsequent method embodiments. Details are not described herein.

In still another possible implementation, the mobility management entity 201 is configured to obtain subscription information of a first terminal device, where the subscription information of the first terminal device includes information about a first spectrum resource, the first spectrum resource is a spectrum resource that is of the first network and that is allowed to be occupied by the first terminal device, and the first terminal device subscribes to the second network. The mobility management entity 201 is further configured to send the information about the first spectrum resource to the access network device 202. The access network device 202 is configured to: receive the information about the first spectrum resource from the mobility management entity, and occupy the first spectrum resource for the first terminal device. Specific implementation and related technical effects of the solution are described in detail in subsequent method embodiments. Details are not described herein.

In still another possible implementation, the mobility management entity 201 is configured to obtain subscription information of a first terminal device, where the subscription information of the first terminal device includes information about a second spectrum resource, the second spectrum resource is a spectrum resource that is of the first network and that is allowed to be occupied by a first service of the first terminal device, and the first terminal device subscribes to the second network. The mobility management entity 201 is further configured to send the information about the second spectrum resource to the access network device 202. The access network device 202 is configured to: receive the information about the second spectrum resource from the mobility management entity, and occupy the second spectrum resource for the first service of the first terminal device based on the information about the second spectrum resource. Specific implementation and related technical effects of the solution are described in detail in subsequent method embodiments. Details are not described herein.

Figures 3, 4:
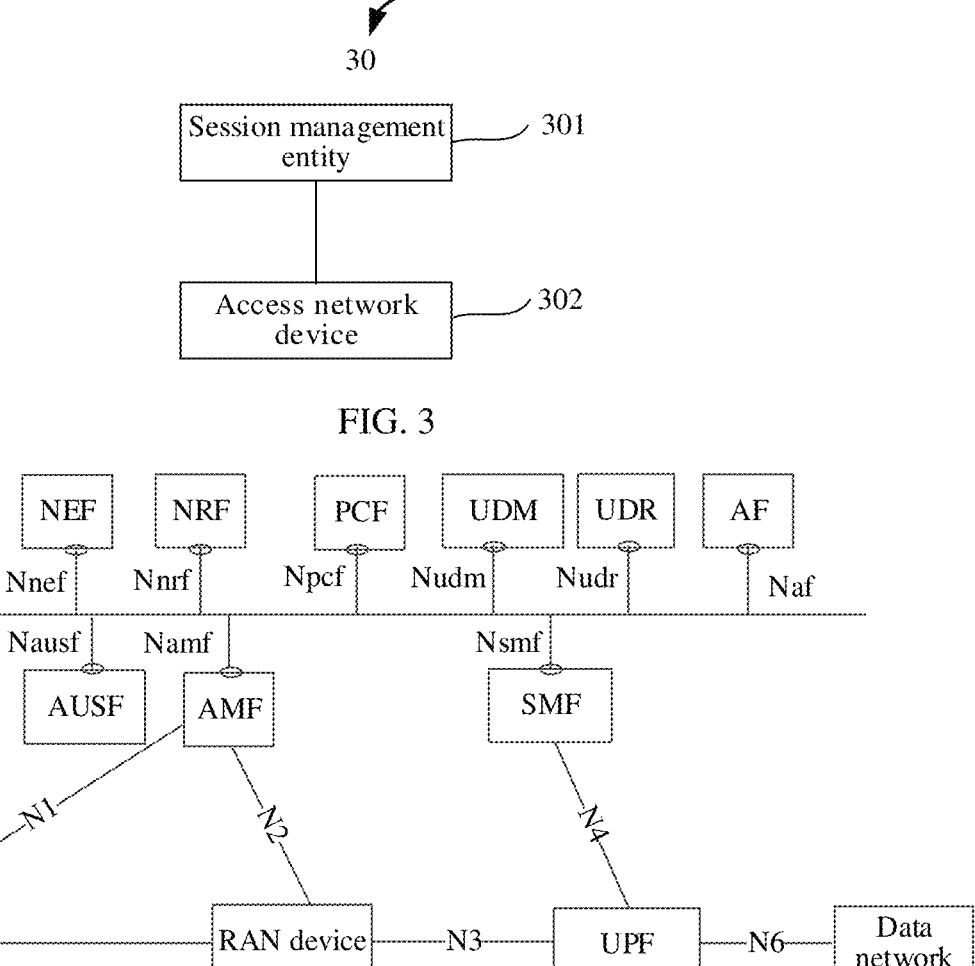
FIG. 3 is a schematic diagram of a structure of another communication system according to an embodiment of this application.
FIG. 4 is a schematic diagram of a network architecture of a 5G system according to an embodiment of this application.

FIG. 3 shows another communication system 30 according to an embodiment of this application. The communication system 30 includes a session management entity 301 in a second network and an access network device 302 in a first network. The session management entity 301 and the access network device 302 may directly communicate with each other, or may communicate with each other through forwarding by another device. This is not specifically limited in this embodiment of this application.

The session management entity 301 is configured to: after determining that a first session of a first terminal device or a first quality of service (QoS) flow of the first session of the first terminal device is allowed to occupy a spectrum resource of the first network, send third indication information to the access network device 302, where the third indication information indicates that the first session of the first terminal device is allowed to occupy the spectrum resource of the first network, or the third indication information indicates that the first QoS flow of the first session of the first terminal device is allowed to occupy the spectrum resource of the first network, and the first terminal device subscribes to the second network. The access network device 302 is configured to: receive the third indication information from the session management entity, and occupy the spectrum resource of the first network for the first session of the first terminal device or the first QoS flow of the first session of the first terminal device based on the third indication information. Specific implementation and related technical effects of the solution are described in detail in subsequent method embodiments. Details are not described herein.

It should be noted that, in this embodiment of this application, that the first terminal device subscribes to the second network may also be understood as that a home network of the first terminal device is the second network. This is uniformly described herein, and details are not described below again.

It should be noted that, in this embodiment of this application, the first network and the second network are different networks sharing a same radio access network. In other words, the first network and the second network are different networks. The first network and the second network may correspond to a same operator, or may correspond to different operators. This is not specifically limited in this embodiment of this application. For example, the first network is a first PLMN network, and the second network is a second PLMN network (for example, a telecommunication network). For example, the first PLMN network may be a China Unicom network, and the second PLMN network may be a telecommunication network; or the first PLMN network is Beijing Mobile, and the second PLMN network is Hebei Mobile. Alternatively, for example, the first network is a public network, and the second network is a private network. Alternatively, the first network is a private network, and the second network is a public network; the first network is a first public network, and the second network is a second public network; or the first network is a first private network, and the second network is a second private network. This is uniformly described herein, and is not specifically limited in this embodiment of this application.

In some embodiments, the communication system 20 shown in FIG. 2 or the communication system 30 shown in FIG. 3 is applicable to a 5G network that is currently being discussed, or is applicable to another future network or the like. This is not specifically limited in embodiments of this application.

For example, the communication system 20 shown in 2 or the communication system 30 shown in FIG. 3 is applicable to the 5G network that is currently being discussed. As shown in FIG. 4, a network element or entity corresponding to the access network device may be a RAN device in the 5G network, a network element or entity corresponding to the mobility management entity may be an AMF in the 5G network, and a network element or entity corresponding to the session management entity may be an SMF in the 5G network.

In addition, as shown in FIG. 4, the 5G network may further include a user plane function (UPF), an authentication server function (AUSF), a network slice selection function (NSSF), a network exposure function (NEF), a network repository function (NRF), a policy control function (PCF), a unified data management (UDM), a unified data repository (UDR), an application function (AF), or the like. A terminal device accesses the 5G network via the RAN device, the terminal device communicates with the AMF through an N1 interface (N1 for short); the RAN device communicates with the AMF through an N2 interface (N2 for short); the RAN device communicates with the UPF through an N3 interface (N3 for short); the SMF communicates with the UPF through an N4 interface (N4 for short), and the UPF accesses a data network through an N6 interface (N6 for short). In addition, control plane functions such as the AUSF, the AMF, the SMF, the NSSF, the NEF, the NRF, the PCF, the UDM, the UDR, or the AF shown in FIG. 4 interact with each other through service-oriented interfaces. For example, a service-oriented interface exhibited by the AUSF is Nausf, a service-oriented interface exhibited by the AMF is Namf, a service-oriented interface exhibited by the SMF is Nsmf, a service-oriented interface exhibited by the NSSF is Nnssf, a service-oriented interface exhibited by the NEF is Nnef, a service-oriented interface exhibited by the NRF is Nnrf, a service-oriented interface exhibited by the PCF is Npcf, a service-oriented interface exhibited by the UDM is Nudm, a service-oriented interface exhibited by the UDR is Nudr, and a service-oriented interface exhibited by the AF is Naf. For related function descriptions and interface descriptions, refer to a diagram of a 5G system architecture in the 23.501 standard. Details are not described herein.

In some embodiments, the first terminal device is a device with a wireless transceiver function, for example, a terminal or a chip that can be used in a terminal. The first terminal device may be deployed on land, where the deployment includes indoor or outdoor, or handheld or vehicle-mounted deployment, may be deployed on water (for example, on a ship), or may be deployed in air (for example, on an aerocraft, a balloon, or a satellite). The terminal may be user equipment (UE), an access terminal, a terminal unit, a terminal station, a mobile station, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (SIP) phone, a wireless local loop (WLL) station, a personal digital assistant (PDA), a handheld device or a computing device having a wireless communication function, another processing device, vehicle-mounted device, or wearable device connected to a wireless modem, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or fixed.

In some embodiments, the access network device may be any communication device that has a wireless transceiver function and that is configured to communicate with the terminal device. The access network device includes but is not limited to: an evolved NodeB (eNB), a baseband unit (BBU), an access point (AP) in a wireless fidelity (Wi-Fi) system, a wireless relay node, a wireless backhaul node, a transmission point (TP), or a TRP. The access network device may alternatively be a RAN device in the 5G system. The RAN device includes, for example, a gNB, a TRP, or a TP, or one antenna panel or a group of antenna panels (including a plurality of antenna panels) of a base station in the 5G system. In addition, the RAN device may alternatively be a network node included in a gNB or a TP, for example, a BBU or a distributed unit (DU).

In some deployments, a gNB may include a central unit (CU) and a DU. In addition, the gNB may further include an active antenna unit (AAU). The CU performs some functions of the gNB, and the DU performs some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the access network device may be a device including one or more of a CU node, a DU node, and an AAU node.

In some embodiments, the mobility management entity, the session management entity, or the access network device may also be referred to as a communication apparatus, and may be a general-purpose device or a dedicated device. This is not specifically limited in embodiments of this application.

In some embodiments, a related function of the mobility management entity, the session management entity, or the access network device may be implemented by one device, may be jointly implemented by a plurality of devices, or may be implemented by one or more function modules in one device. This is not specifically limited in this embodiment of this application. It may be understood that the foregoing function may be a network element in a hardware device, may be a software function running on dedicated hardware, a combination of hardware and software, or a virtualization function instantiated on a platform (for example, a cloud platform).

Figure 5:
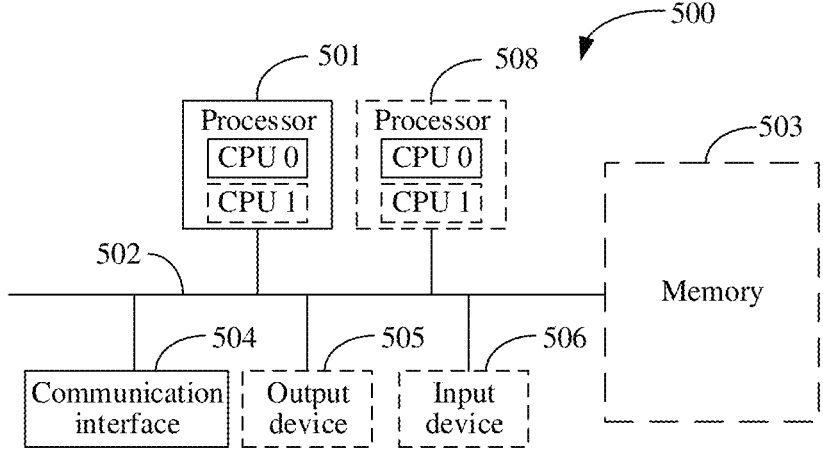
FIG. 5 is a schematic diagram of a structure of a communication apparatus according to an embodiment of this application.

For example, the related function of the mobility management entity, the session management entity, or the access network device in embodiments of this application may be implemented by using a communication apparatus 500 in FIG. 5. FIG. 5 is a schematic diagram of a structure of the communication apparatus 500 according to an embodiment of this application. The communication apparatus 500 includes one or more processors 501, a communication line 502, and at least one communication interface (FIG. 5 uses only an example in which a communication interface 504 and one processor 501 are included for description). In some embodiments, the communication apparatus may further include a memory 503.

The processor 501 may be a general-purpose central processing unit (CPU), a microprocessor, an application-specific integrated circuit (ASIC), or one or more integrated circuits configured to control program execution of the solutions of this application.

The communication line 502 may include a channel, and is configured to connect different components.

The communication interface 504 may be a transceiver module configured to communicate with another device or a communication network such as the Ethernet, a RAN, or a wireless local area network (WLAN). For example, the transceiver module may be an apparatus such as a transceiver or a transceiver. In some embodiments, the communication interface 504 may alternatively be a transceiver circuit located inside the processor 501, and is configured to implement signal input and signal output of the processor.

The memory 503 may be an apparatus having a storage function. For example, the memory may be a read-only memory (ROM) or another type of static storage device capable of storing static information and instructions, may be a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium capable of carrying or storing expected program code in a form of instructions or a data structure and capable of being accessed by a computer. This is not limited thereto. The memory may exist independently, and connect to the processor through the communication line 502. The memory may alternatively be integrated with the processor.

The memory 503 is configured to store computer-executable instructions for performing the solutions in this application, and the processor 501 controls execution. The processor 501 is configured to execute the computer-executable instructions stored in the memory 503, to implement a spectrum resource sharing method provided in embodiments of this application.

Alternatively, In some embodiments, the processor 501 may perform processing-related functions in the spectrum resource sharing method provided in the following embodiments of this application, and the communication interface 504 is responsible for communication with another device or a communication network. This is not specifically limited in this embodiment of this application.

In some embodiments, the computer-executable instructions may also be referred to as application program code. This is not specifically limited in this embodiment of this application.

During specific implementation, in an embodiment, the processor 501 may include one or more CPUs, for example, a CPU 0 and a CPU 1 in FIG. 5.

During specific implementation, in an embodiment, the communication apparatus 500 may include a plurality of processors, for example, the processor 501 and a processor 508 in FIG. 5. Each of the processors may be a single-core processor or a multi-core processor. The processor herein may include but is not limited to at least one of the following various computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions.

During specific implementation, in an embodiment, the communication apparatus 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, or a projector. The input device 506 communicates with the processor 501, and may receive user input in a plurality of manners. For example, the input device 506 may be a mouse, a keyboard, a touchscreen device, or a sensor device.

The communication apparatus 500 may also be referred to as a communication device sometimes, and may be a general-purpose device or a dedicated device. For example, the communication apparatus 500 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to a structure shown in FIG. 5. A type of the communication apparatus 500 is not limited in this embodiment of this application.

The spectrum resource sharing method provided in embodiments of this application is described below with reference to the accompanying drawings.

Figure 6:
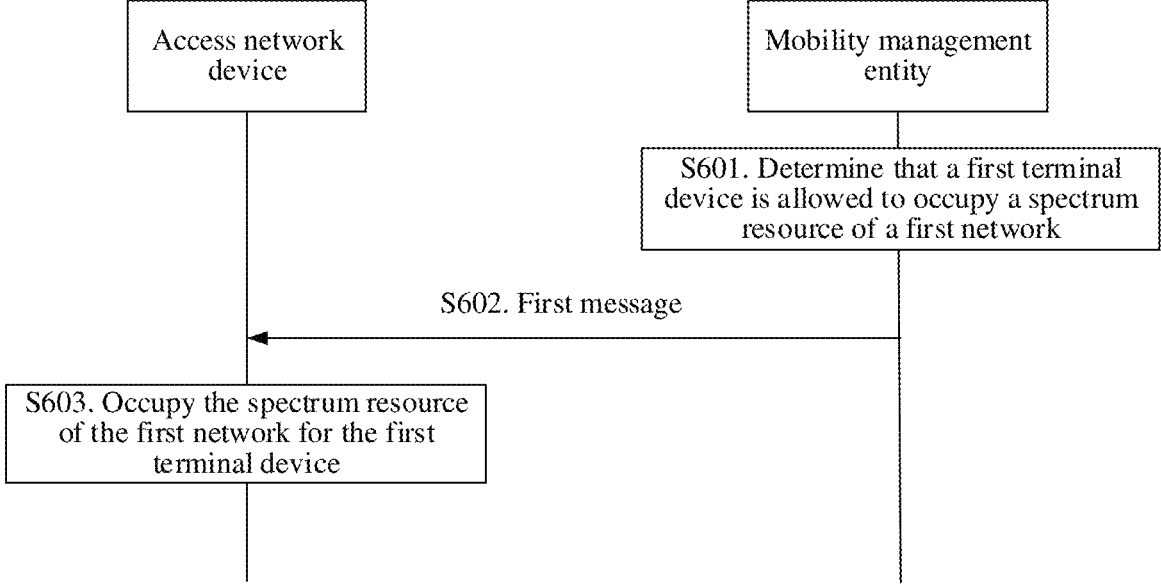
FIG. 6 is a schematic flowchart 1 of a spectrum resource sharing method according to an embodiment of this application.

FIG. 6 shows a spectrum resource sharing method according to an embodiment of this application. Details are as follows:

S601. A mobility management entity determines that a first terminal device is allowed to occupy a spectrum resource of a first network.

The first terminal device subscribes to a second network. The mobility management entity is a mobility management entity in the second network.

In some embodiments, step S601 includes: The mobility management entity determines, based on at least one of subscription information of the first terminal device, access and mobility control policy information of the first terminal device, or local policy information of the second network, that the first terminal device is allowed to occupy the spectrum resource of the first network.

In some embodiments, the subscription information of the first terminal device includes first information, and the first information indicates that the first terminal device is allowed to occupy the spectrum resource of the first network.

For example, the first information may be represented by using one bit. For example, "1" indicates that the first terminal device is allowed to occupy the spectrum resource of the first network, and "0" indicates that the first terminal device is not allowed to occupy the spectrum resource of the first network. Alternatively, "0" indicates that the first terminal device is allowed to occupy the spectrum resource of the first network, and "1" indicates that the first terminal device is not allowed to occupy the spectrum resource of the first network. This is not specifically limited in this embodiment of this application.

In some embodiments, the access and mobility control policy information of the first terminal device includes second information, where the second information indicates that the first terminal device is allowed to occupy the spectrum resource of the first network in a first time period, in a first location area, and/or in a first spectrum resource, and the first spectrum resource is a spectrum resource in the first network.

For example, the second information may include information about the first time period, the first location area, and/or the first spectrum resource in which the first terminal device is allowed to occupy the spectrum resource of the first network.

In some embodiments, the local policy information of the second network includes third information, where the third information indicates that a terminal device that subscribes to the second network is allowed to occupy the spectrum resource of the first network. For example, the first terminal device subscribes to the second network. In this case, the mobility management entity may determine, based on the local policy information of the second network, that the first terminal device is allowed to occupy the spectrum resource of the first network.

For example, the third information may be represented by using one bit. For example, "1" indicates that a terminal device that subscribes to the second network is allowed to occupy the spectrum resource of the first network, and "0" indicates that the terminal device that subscribes to the second network is not allowed to occupy the spectrum resource of the first network. Alternatively, "0" indicates that a terminal device that subscribes to the second network is allowed to occupy the spectrum resource of the first network, and "1" indicates that the terminal device that subscribes to the second network is not allowed to occupy spectrum resource of the first network. This is not specifically limited in this embodiment of this application.

For example, when the subscription information of the first terminal device includes the first information, the mobility management entity may determine, based on the subscription information of the first terminal device, that the first terminal device is allowed to occupy the spectrum resource of the first network. Alternatively, when the access and mobility control policy information of the first terminal device includes the second information, the mobility management entity may determine, based on the access and mobility control policy information of the first terminal device, that the first terminal device is allowed to occupy the spectrum resource of the first network in the first time period, in the first location area, and/or in the first spectrum resource. Alternatively, when the local policy information of the second network includes the third information, the mobility management entity may determine, based on the local policy information of the second network, that the terminal device that subscribes to the second network is allowed to occupy the spectrum resource of the first network. Because the first terminal device subscribes to the second network, the mobility management entity may determine that the first terminal device is allowed to occupy the spectrum resource of the first network. Alternatively, when the subscription information of the first terminal device includes the first information, and the access and mobility control policy information of the first terminal device includes the second information, the mobility management entity may determine, based on the subscription information of the first terminal device, that the first terminal device is allowed to occupy the spectrum resource of the first network. Further, the mobility management entity may determine, based on the access and mobility control policy information of the first terminal device, that the first terminal device is allowed to occupy the spectrum resource of the first network in the first time period, in the first location area, and/or in the first spectrum resource. Alternatively, when the subscription information of the first terminal device includes the first information, and the local policy information of the second network includes the third information, the mobility management entity may determine, based on the local policy information of the second network, that the terminal device of the second network is allowed to occupy the spectrum resource of the first network. Further, the mobility management entity may determine, based on the subscription information of the first terminal device, that the first terminal device is allowed to occupy the spectrum resource of the first network. Alternatively, when the access and mobility control policy information of the first terminal device includes the second information, and the local policy information of the second network includes the third information, the mobility management entity may determine, based on the local policy information of the second network, that the terminal device of the second network is allowed to occupy the spectrum resource of the first network. Further, because the first terminal device subscribes to the second network, the mobility management entity may determine, based on the access and mobility control policy information of the first terminal device, that the first terminal device is allowed to occupy the spectrum resource of the first network in the first time period, in the first location area, and/or in the first spectrum resource. Alternatively, when the subscription information of the first terminal device includes the first information, the access and mobility control policy information of the first terminal device includes the second information, and the local policy information of the second network includes the third information, the mobility management entity may determine, based on the local policy information of the second network, that the terminal device of the second network is allowed to occupy the spectrum resource of the first network. Further, the mobility management entity may determine, based on the subscription information of the first terminal device, that the first terminal device is allowed to occupy the spectrum resource of the first network. Further, the mobility management entity may determine, based on the access and mobility control policy information of the first terminal device, that the first terminal device is allowed to occupy the spectrum resource of the first network in the first time period, in the first location area, and/or in the first spectrum resource.

For example, when the local policy information of the second network includes the third information, and the subscription information of the first terminal device includes information indicating that the first terminal device is not allowed to occupy the spectrum resource of the first network, the mobility management entity may determine, based on the subscription information of the first terminal device and the local policy information of the second network, that the first terminal device is not allowed to occupy the spectrum resource of the first network. Alternatively, when the local policy information of the second network includes the third information, the subscription information of the first terminal device includes the first information, and a current location of the first terminal device does not meet a location area information requirement in the access and mobility control policy information of the first terminal device (for example, the location area information requirement is that the first terminal device is allowed to occupy the spectrum resource of the first network in the first location area but the first terminal device is not in the first location area in this case; or the location area information requirement is that the first terminal device is not allowed to occupy the spectrum resource of the first network in an area other than the first location area, but the first terminal device is in the area in this case), the mobility management entity may determine, based on the subscription information of the first terminal device, the local policy information of the second network, and the access and mobility control policy information of the first terminal device, that the first terminal device is not allowed to occupy the spectrum resource of the first network.

S602. The mobility management entity sends a first message to the access network device. Correspondingly, the access network device receives the first message from the mobility management entity.

The first message includes first indication information, and the first indication information indicates that the first terminal device is allowed to occupy the spectrum resource of the first network. The access network device is an access network device shared by the first network and the second network.

S603. The access network device occupies the spectrum resource of the first network for the first terminal device based on the first indication information.

It should be noted that, that the access network device occupies the spectrum resource of the first network for the first terminal device may be understood as that the access network device may occupy the spectrum resource of the first network for all services of the first terminal device, or may be understood as that the access network device may transmit all service data of the first terminal device by using the spectrum resource of the first network. This is uniformly described herein, and details are not described below again.

For example, it is assumed that the spectrum resource of the first network is 100 MHz between 3.5 GHz and 3.6 GHz, and a spectrum resource of the second network to which the first terminal device subscribes is 100 MHz between 3.4 GHz and 3.5 GHz. When the access network device determines that an available spectrum resource of the second network to which the first terminal device subscribes is only 20 MHz left, which cannot meet a service requirement (for example, a 40 MHz spectrum resource is required) of the first terminal device, the access network device may occupy the spectrum resource of the first network to meet the service requirement of the first terminal device.

In some embodiments, the access network device may continue to occupy the spectrum resource (for example, a 20 MHz spectrum resource in the 100 MHz spectrum resource between 3.5 GHz and 3.6 GHz) of the first network for the first terminal device after occupying the remaining available spectrum resource (for example, the 20 MHz spectrum resource between 3.4 GHz and 3.5 GHz) of the second network for the first terminal device.

Alternatively, in another possible implementation, although the spectrum resource of the first network is 100 MHz between 3.4 GHz and 3.6 GHz, and the spectrum resource of the second network is 100 MHz between 3.4 GHz and 3.5 GHz, in a network sharing case, the first network and the second network may dynamically occupy any 100 MHz spectrum resource between 3.4 GHz and 3.6 GHz. In this case, the access network device may occupy a part of the remaining available spectrum resource of the second network and a part of the spectrum resource of the first network for the first terminal device. For example, the access network device may occupy a 10 MHz spectrum resource (for example, a 10 MHz spectrum resource in the 20 MHz available spectrum resource between 3.4 GHz and 3.5 GHz) of the second network and a 30 MHz spectrum resource (for example, a 30 MHz spectrum resource in the 100 MHz spectrum resource between 3.5 GHz and 3.6 GHz) of the first network for the first terminal device.

It should be noted that the access network device may allocate the spectrum resource of the first network occupied for the first terminal device to the first terminal device and/or another terminal device in the second network for use. If the access network device allocates the spectrum resource of the first network occupied for the first terminal device to another terminal device in the second network for use, the access network device may allocate, to the first terminal device for use, a corresponding quantity of spectrum resources of the second network that are allocated to the another terminal device in the second network. How the access network device allocates the spectrum resource of the first network and the spectrum resource of the second network that are occupied for the first terminal device is not limited in this embodiment of this application. For example, still in the foregoing example, if the spectrum resource (for example, a 20 MHz spectrum resource in the 100 MHz spectrum resource between 3.5 GHz and 3.6 GHz) of the first network occupied to meet the service requirement of the first terminal device is allocated to another terminal device in the second network for use, the access network device may allocate, to the first terminal device, a 20 MHz spectrum resource of the second network that is allocated to the another terminal device in the second network, that is, allocate a 20 MHz spectrum resource between 3.4 GHz and 3.5 GHz to the first terminal device for use. Alternatively, still in the foregoing example, in the spectrum resource (for example, a 30 MHz spectrum resource in the 100 MHz spectrum resource between 3.5 GHz and 3.6 GHz) of the first network occupied to meet the service requirement of the first terminal device, if a part (for example, a 10 MHz spectrum resource) is allocated to the first terminal device for use and a part (for example, a 20 MHz spectrum resource) is allocated to another terminal device in the second network for use, the access network device may allocate, to the first terminal device, a 20 MHz spectrum resource of the second network that is allocated to the another terminal device in the second network, that is, allocate a 30 MHz spectrum resource between 3.4 GHz and 3.6 GHz to the first terminal device for use.

In some embodiments, the spectrum resource sharing method further includes: The access network device sends a second message to the mobility management entity when the access network device determines that a required quantity of spectrum resources of the second network to which the first terminal device subscribes is greater than or equal to a preset threshold, where the second message indicates that the second network to which the first terminal device subscribes has insufficient spectrum resources, or the second message is for requesting to determine whether the first terminal device is allowed to occupy the spectrum resource of the first network. Further, before step S601, the mobility management entity receives the second message from the access network device, and determines whether the first terminal device is allowed to occupy the spectrum resource of the first network. In this solution, the access network device dynamically requests, based on a service requirement, the mobility management entity to determine whether the first terminal device is allowed to occupy the spectrum resource of the first network. Therefore, the solution design is more flexible.

In some embodiments, the first message further includes duration in which the first terminal device is allowed to occupy the spectrum resource of the first network. In this way, when duration in which the first terminal device occupies the spectrum resource of the first network reaches the duration, the access network device may no longer occupy the spectrum resource of the first network for the first terminal device, to effectively control occupation of a spectrum resource of another network.

Based on the spectrum resource sharing method provided in this embodiment of this application, the access network device can occupy, only after the mobility management entity determines that the first terminal device is allowed to occupy the spectrum resource of the first network, the spectrum resource of the first network for the first terminal device based on the first indication information sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

The processor 501 in the communication apparatus 500 shown in FIG. 5 may invoke the application program code stored in the memory 503, to indicate the mobility management entity to perform the actions of the mobility management entity in steps S601 to S603. The processor 501 in the communication apparatus 500 shown in FIG. 5 may invoke the application program code stored in the memory 503, to indicate the access network device to perform the actions of the access network device in steps S601 to S603. This is not limited in this embodiment.

It should be noted that, in this embodiment shown in FIG. 6, an example in which the mobility management entity sends the first indication information to the access network device after determining that the first terminal device is allowed to occupy the spectrum resource of the first network is used for description. Alternatively, in this embodiment of this application, the mobility management entity may obtain the first indication information, and send the first indication information to the access network device. This is not specifically limited in this embodiment of this application. That the mobility management entity obtains the first indication information includes: The mobility management entity obtains the first indication information from the subscription information of the first terminal device, the access and mobility control policy information of the first terminal device, or the local policy information of the second network. For other related descriptions, refer to the embodiment shown in FIG. 6. Details are not described herein again.

Figures 7, 8:
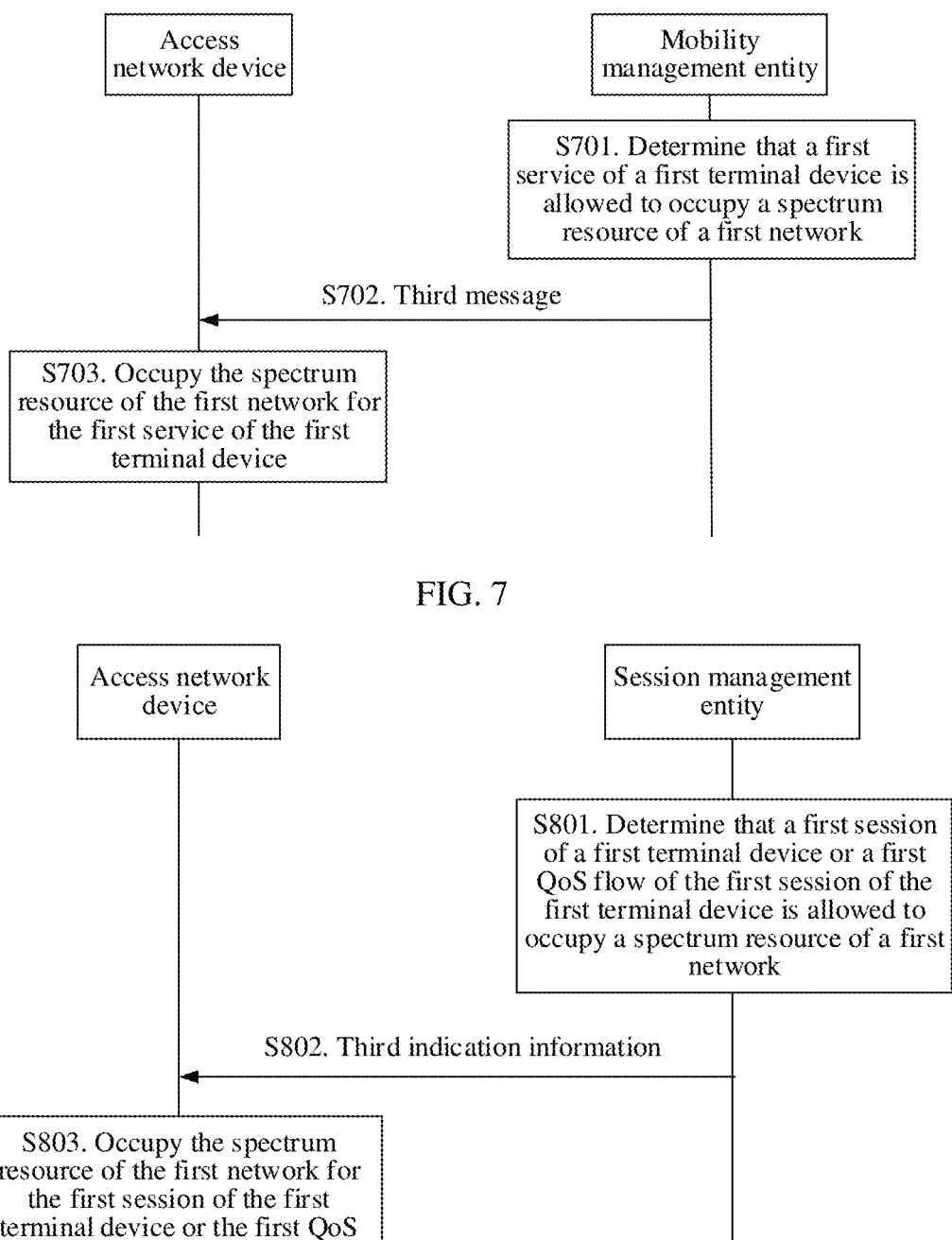
FIG. 7 is a schematic flowchart 2 of a spectrum resource sharing method according to an embodiment of this application.
FIG. 8 is a schematic flowchart 3 of a spectrum resource sharing method according to an embodiment of this application.

FIG. 7 shows another spectrum resource sharing method according to an embodiment of this application. Details are as follows:

S701. A mobility management entity determines that a first service of a first terminal device is allowed to occupy a spectrum resource of a first network.

The first terminal device subscribes to a second network. The mobility management entity is a mobility management entity in the second network.

For example, in this embodiment of this application, the first service of the first terminal device may include a high-value service such as an internet of vehicles service, a terminal device positioning service, an IP multimedia subsystem (IMS) service, or a Migu Video service.

In some embodiments, step S701 includes: The mobility management entity determines, based on at least one of subscription information of the first terminal device, access and mobility control policy information of the first terminal device, or local policy information of the second network, that the first service of the first terminal device is allowed to occupy the spectrum resource of the first network.

In some embodiments, for example, the subscription information of the first terminal device may include at least one of first information, fourth information, or identification information of the first service of the first terminal device. The first information indicates that the first terminal device is allowed to occupy the spectrum resource of the first network. The fourth information indicates that the first service of the first terminal device is allowed to occupy the spectrum resource of the first network.

For related descriptions of the first information, refer to the embodiment shown in FIG. 6. Details are not described herein again.

For example, the fourth information may be represented by using one bit. For example, "1" indicates that the first service of the first terminal device is allowed to occupy the spectrum resource of the first network, and "0" indicates that the first service of the first terminal device is not allowed to occupy the spectrum resource of the first network. Alternatively, "0" indicates that the first service of the first terminal device is allowed to occupy the spectrum resource of the first network, and "1" indicates that the first service of the first terminal device is not allowed to occupy the spectrum resource of the first network. This is not specifically limited in this embodiment of this application.

In this embodiment of this application, the identification information of the first service is for uniquely identifying the first service. For example, when the first service is an internet of vehicles service, the identification information of the first service may be, for example, network slice selection assistance information (NSSAI) corresponding to the internet of vehicles service, or the NSSAI and a data network name (DNN) corresponding to the internet of vehicles service. Alternatively, when the first service is an IMS service, the identification information of the first service may be, for example, NSSAI corresponding to the IMS service, or the NSSAI and a DNN corresponding to the IMS service.

In some embodiments, for example, the access and mobility control policy information of the first terminal device may include fifth information, where the fifth information indicates that the first service of the first terminal device is allowed to occupy the spectrum resource of the first network in a first time period, in a first location area, and/or in a first spectrum resource, and the first spectrum resource is a spectrum resource in the first network.

For example, the fifth information may include information about the first time period, the first location area, and/or the first spectrum resource in which the first service of the first terminal device is allowed to occupy the spectrum resource of the first network.

In some embodiments, for example, the local policy information of the second network may include sixth information, where sixth third information indicates that a first service of a terminal device that subscribes to the second network is allowed to occupy the spectrum resource of the first network.

For example, the sixth information may be represented by using one bit. For example, "1" indicates that a first service of a terminal device that subscribes to the second network is allowed to occupy the spectrum resource of the first network, and "0" indicates that the first service of the terminal device that subscribes to the second network is not allowed to occupy the spectrum resource of the first network. Alternatively, "0" indicates that a first service of a terminal device that subscribes to the second network is allowed to occupy the spectrum resource of the first network, and "1" indicates that the first service of the terminal device that subscribes to the second network is not allowed to occupy the spectrum resource of the first network. This is not specifically limited in this embodiment of this application.

For example, when the subscription information of the first terminal device includes the fourth information, the mobility management entity may determine, based on the subscription information of the first terminal device, that the first service of the first terminal device is allowed to occupy the spectrum resource of the first network. Alternatively, when the access and mobility control policy information of the first terminal device includes the fifth information, the mobility management entity may determine, based on the access and mobility control policy information of the first terminal device, that the first service of the first terminal device is allowed to occupy the spectrum resource of the first network in the first time period, in the first location area, and/or in the first spectrum resource. Alternatively, when the local policy information of the second network includes the sixth information, the mobility management entity may determine, based on the local policy information of the second network, that the first service of the terminal device that subscribes to the second network is allowed to occupy the spectrum resource of the first network. Because the first terminal device subscribes to the second network, the mobility management entity may determine that the first service of the first terminal device is allowed to occupy the spectrum resource of the first network. Alternatively, when the subscription information of the first terminal device includes the first information, and the access and mobility control policy information of the first terminal device includes the fifth information, the mobility management entity may determine, based on the subscription information of the first terminal device, that the first terminal device is allowed to occupy the spectrum resource of the first network. Further, the mobility management entity may determine, based on the access and mobility control policy information of the first terminal device, that the first service of the first terminal device is allowed to occupy the spectrum resource of the first network in the first time period, in the first location area, and/or in the first spectrum resource. Alternatively, when the subscription information of the first terminal device includes the identification information of the first service of the first terminal device, and the local policy information of the second network includes the sixth information, the mobility management entity may determine, based on the local policy information of the second network, that the first service of the terminal device of the second network is allowed to occupy the spectrum resource of the first network. Further, the mobility management entity may determine, based on the subscription information of the first terminal device, that the first service of the first terminal device is allowed to occupy the spectrum resource of the first network. Alternatively, when the access and mobility control policy information of the first terminal device includes the fifth information, and the local policy information of the second network includes the sixth information, the mobility management entity may determine, based on the local policy information of the second network, that the first service of the terminal device of the second network is allowed to occupy the spectrum resource of the first network. Further, because the first terminal device subscribes to the second network, the mobility management entity may determine, based on the access and mobility control policy information of the first terminal device, that the first service of the first terminal device is allowed to occupy the spectrum resource of the first network in the first time period, in the first location area, and/or in the first spectrum resource. Alternatively, when the subscription information of the first terminal device includes the identification information of the first service, the access and mobility control policy information of the first terminal device includes the fifth information, and the local policy information of the second network includes the sixth information, the mobility management entity may determine, based on the local policy information of the second network, that the first service of the terminal device of the second network is allowed to occupy the spectrum resource of the first network. Further, the mobility management entity may determine, based on the subscription information of the first terminal device, that the first service of the first terminal device is allowed to occupy the spectrum resource of the first network. Further, the mobility management entity may determine, based on the access and mobility control policy information of the first terminal device, that the first service of the first terminal device is allowed to occupy the spectrum resource of the first network in the first time period, in the first location area, and/or in the first spectrum resource.

For example, when the local policy information of the second network includes the sixth information, and the subscription information of the first terminal device includes information indicating that the first service of the first terminal device is not allowed to occupy the spectrum resource of the first network, the mobility management entity may determine, based on the subscription information of the first terminal device and the local policy information of the second network, that the first service of the first terminal device is not allowed to occupy the spectrum resource of the first network. Alternatively, when the local policy information of the second network includes the sixth information, the subscription information of the first terminal device includes the fourth information, and a current location of the first terminal device does not meet a location area information requirement in the access and mobility control policy information of the first terminal device (for example, the location area information requirement is that the first service of the first terminal device is allowed to occupy the spectrum resource of the first network in the first location area, but the first terminal device is not in the first location area in this case; or the location area information requirement is that the first service of the first terminal device is not allowed to occupy the spectrum resource of the first network in an area other than the first location area, but the first terminal device is in the area in this case), the mobility management entity may determine, based on the subscription information of the first terminal device, the local policy information of the second network, and the access and mobility control policy information of the first terminal device, that the first service of the first terminal device is not allowed to occupy the spectrum resource of the first network.

S702. The mobility management entity sends a third message to an access network device. Correspondingly, the access network device receives the third message from the mobility management entity.

The third message includes second indication information, and the second indication information indicates that the first service of the first terminal device is allowed to occupy the spectrum resource of the first network. The access network device is an access network device shared by the first network and the second network.

S703. The access network device occupies the spectrum resource of the first network for the first service of the first terminal device based on the second indication information.

It should be noted that, that the access network device occupies the spectrum resource of the first network for the first service of the first terminal device may be understood as that the access network device may transmit data of the first service of the first terminal device by using the spectrum resource of the first network. This is uniformly described herein, and details are not described below again.

For example, it is assumed that the spectrum resource of the first network is 100 MHz between 3.5 GHz and 3.6 GHz, and a spectrum resource of the second network to which the first terminal device subscribes is 100 MHz between 3.4 GHz and 3.5 GHz. When the access network device determines that an available spectrum resource of the second network to which the first terminal device subscribes is only 20 MHz left, which cannot meet a requirement (for example, a 40 MHz spectrum resource is required) of the first service of the first terminal device, the access network device may occupy the spectrum resource of the first network to meet the requirement of the first service of the first terminal device.

In some embodiments, the access network device may continue to occupy the spectrum resource (for example, a 20 MHz spectrum resource in the 100 MHz spectrum resource between 3.5 GHz and 3.6 GHz) of the first network for the first service of the first terminal device after occupying the remaining available spectrum resource (for example, the 20 MHz spectrum resource between 3.4 GHz and 3.5 GHz) of the second network for the first service of the first terminal device.

Alternatively, in another possible implementation, although the spectrum resource of the first network is 100 MHz between 3.4 GHz and 3.5 GHz, and the spectrum resource of the second network is 100 MHz between 3.4 GHz and 3.5 GHz, in a network sharing case, the first network and the second network may dynamically occupy any 100 MHz spectrum resource between 3.4 GHz and 3.6 GHz. In this case, the access network device may occupy a part of the remaining available spectrum resource of the second network and a part of the spectrum resource of the first network for the first service of the first terminal device. For example, the access network device may occupy a 10 MHz spectrum resource (for example, a 10 MHz spectrum resource in the 20 MHz available spectrum resource between 3.4 GHz and 3.5 GHz) of the second network and a 30 MHz spectrum resource (for example, a 30 MHz spectrum resource in the 100 MHz spectrum resource between 3.5 GHz and 3.6 GHz) of the first network for the first service of the first terminal device.

It should be noted that the access network device may allocate the spectrum resource of the first network occupied for the first service of the first terminal device to the first service of the first terminal device, another service of the first terminal device, and/or another terminal device in the second network for use. If the access network device allocates the spectrum resource of the first network occupied for the first service of the first terminal device to another service of the first terminal device and/or another terminal device in the second network for use, the access network device may allocate, to the first service of the first terminal device for use, a corresponding quantity of spectrum resources of the second network that are allocated to the another service of the first terminal device and/or the another terminal device in the second network. How the access network device allocates the spectrum resource of the first network and the spectrum resource of the second network that are occupied for the first service of the first terminal device is not limited in this embodiment of this application. For example, still in the foregoing example, if the spectrum resource (for example, a 20 MHz spectrum resource in the 100 MHz spectrum resource between 3.5 GHz and 3.6 GHz) of the first network occupied to meet the requirement of the first service of the first terminal device is allocated to another service of the first terminal device and/or another terminal device in the second network for use, the access network device may allocate, to the first service of the first terminal device, a 20 MHz spectrum resource of the second network that is allocated to the another service of the first terminal device and/or the another terminal device in the second network, that is, allocate a 40 MHz spectrum resource between 3.4 GHz and 3.5 GHz to the first service of the first terminal device for use. Alternatively, still in the foregoing example, in the spectrum resource (for example, a 30 MHz spectrum resource in the 100 MHz spectrum resource between 3.5 GHz and 3.6 GHz) of the first network occupied to meet the requirement of the first service of the first terminal device, if a part (for example, a 10 MHz spectrum resource) is allocated to the first service of the first terminal device for use and a part (for example, a 20 MHz spectrum resource) is allocated to another service of the first terminal device and/or another terminal device in the second network for use, the access network device may allocate, to the first service of the first terminal device, a 20 MHz spectrum resource of the second network that is allocated to the another service of the first terminal device and/or the another terminal device in the second network, that is, allocate a 30 MHz spectrum resource between 3.4 GHz and 3.5 GHz to the first service of the first terminal device for use.

In some embodiments, the spectrum resource sharing method further includes: The access network device sends a fourth message to the mobility management entity when the access network device determines that a required quantity of spectrum resources of the second network to which the first terminal device subscribes is greater than or equal to a preset threshold, where the fourth message indicates that the second network to which the first terminal device subscribes has insufficient spectrum resources, or the fourth message is for requesting to determine whether the first terminal device or the first service of the first terminal device is allowed to occupy the spectrum resource of the first network. Further, before step S701, the mobility management entity receives the fourth message from the access network device, and determines whether the first service of the first terminal device is allowed to occupy the spectrum resource of the first network. In this solution, the access network device dynamically requests, based on a service requirement, the mobility management entity to determine whether the first service of the first terminal device is allowed to occupy the spectrum resource of the first network. Therefore, the solution design is more flexible.

In some embodiments, the third message further includes duration in which the first service of the first terminal device is allowed to occupy the spectrum resource of the first network. In this way, when duration in which the first service of the first terminal device occupies the spectrum resource of the first network reaches the duration, the access network device may no longer occupy the spectrum resource of the first network for the first service of the first terminal device, to effectively control occupation of a spectrum resource of another network.

Based on the spectrum resource sharing method provided in this embodiment of this application, the access network device can occupy, only after the mobility management entity determines that the first service of the first terminal device is allowed to occupy the spectrum resource of the first network, the spectrum resource of the first network for the first service of the first terminal device based on the second indication information sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

The processor 501 in the communication apparatus 500 shown in FIG. 5 may invoke the application program code stored in the memory 503, to indicate the mobility management entity to perform the actions of the mobility management entity in steps S701 to S703. The processor 501 in the communication apparatus 500 shown in FIG. 5 may invoke the application program code stored in the memory 503, to indicate the access network device to perform the actions of the access network device in steps S701 to S703. This is not limited in this embodiment.

It should be noted that, in this embodiment shown in FIG. 7, an example in which the mobility management entity sends the second indication information to the access network device after determining that the first service of the first terminal device is allowed to occupy the spectrum resource of the first network is used for description. Alternatively, in this embodiment of this application, the mobility management entity may obtain the second indication information, and send the second indication information to the access network device. This is not specifically limited in this embodiment of this application. That the mobility management entity obtains the second indication information includes: The mobility management entity obtains the second indication information from the subscription information of the first terminal device, the access and mobility control policy information of the first terminal device, or the local policy information of the second network. For other related descriptions, refer to the embodiment shown in FIG. 7. Details are not described herein again.

FIG. 8 shows still another spectrum resource sharing method according to an embodiment of this application. Details are as follows:

S801. A session management entity determines that a first session of a first terminal device or a first QoS flow of the first session of the first terminal device is allowed to occupy a spectrum resource of a first network.

The first terminal device subscribes to a second network, and the session management entity is a session management entity in the second network.

In some embodiments, step S801 includes: The session management entity determines, based on subscription information of the first terminal device and/or session policy information of the first terminal device, that the first session of the first terminal device is allowed to occupy the spectrum resource of the first network; or the session management entity determines, based on subscription information of the first terminal device and/or session policy information of the first terminal device, that the first QoS flow of the first session of the first terminal device is allowed to occupy the spectrum resource of the first network.

In some embodiments, the session policy information of the first terminal device is obtained by the session management entity from a policy control entity. For example, the session management entity receives a fifth message from the policy control entity, where the fifth message includes the session policy information of the first terminal device. Certainly, the session policy information of the first terminal device may be preconfigured on the session management entity. This is not specifically limited in this embodiment of this application.

In some embodiments, the session policy information of the first terminal device includes fourth indication information, where the fourth indication information indicates that the first session of the first terminal device or the first QoS flow of the first session of the first terminal device is allowed to occupy the spectrum resource of the first network, the fourth indication information indicates that a session or a QoS flow established based on the session policy information of the first terminal device is allowed to occupy the spectrum resource of the first network, the fourth indication information indicates information indicating that the spectrum resource of the first network is allowed to be occupied for a session corresponding to specific NSSAI, or the fourth indication information indicates information indicating that the spectrum resource of the first network is allowed to be occupied for a session corresponding to specific NSSAI and a specific DNN.

In some embodiments, a service corresponding to the first QoS flow of the first session of the first terminal device is a first service. The service corresponding to the first QoS flow of the first session of the first terminal device is the first service may be understood as that a service to which the first QoS flow of the first session of the first terminal device belongs is the first service. This is uniformly described herein, and details are not described below again.

In some embodiments, when the service corresponding to the first QoS flow of the first session of the first terminal device is the first service, for related descriptions of the subscription information of the first terminal device, refer to the embodiment shown in FIG. 7. Details are not described herein again.

In some embodiments, when the service corresponding to the first QoS flow of the first session of the first terminal device is the first service, the session policy information of the first terminal device includes seventh information, where the seventh information indicates that the first service of the first terminal device is allowed to occupy the spectrum resource of the first network.

For example, when the subscription information of the first terminal device includes fourth information, and the service corresponding to the first QoS flow of the first session of the first terminal device is the first service, the session management entity may determine, based on the subscription information of the first terminal device, that the first session of the first terminal device or the first QoS flow of the first session of the first terminal device is allowed to occupy the spectrum resource of the first network. Alternatively, when the session policy information of the first terminal device includes the fourth indication information, the fourth indication information indicates the information indicating that the spectrum resource of the first network is allowed to be occupied for the session corresponding to the specific NSSAI and the specific DNN, and the first session of the first terminal device is the session corresponding to the specific NSSAI and the specific DNN, the session management entity may determine, based on the session policy information of the first terminal device, that the first session of the first terminal device or the first QoS flow of the first session of the first terminal device is allowed to occupy the spectrum resource of the first network. Alternatively, when the subscription information of the first terminal device includes first information, the session policy information of the first terminal device includes the fourth indication information, the fourth indication information indicates the information indicating that the spectrum resource of the first network is allowed to be occupied for the session corresponding to the specific NSSAI and the specific DNN, and the first session of the first terminal device is the session corresponding to the specific NSSAI and the specific DNN, the session management entity may determine, based on the subscription information of the first terminal device and the session policy information of the first terminal device, that the first session of the first terminal device or the first QoS flow of the first session of the first terminal device is allowed to occupy the spectrum resource of the first network. Alternatively, when the subscription information of the first terminal device includes identification information of the first service of the first terminal device, the service corresponding to the first QoS flow of the first session of the first terminal device is the first service, the session policy information of the first terminal device includes the seventh information, and the seventh information indicates that the first service of the first terminal device is allowed to occupy the spectrum resource of the first network, the session management entity may determine, based on the subscription information of the first terminal device and the session policy information of the first terminal device, that the first QoS flow of the first session of the first terminal device is allowed to occupy the spectrum resource of the first network.

For example, when the subscription information of the first terminal device includes the fourth information, the service corresponding to the first QoS flow of the first session of the first terminal device is the first service, the session policy information of the first terminal device includes the fourth indication information, and the fourth indication information indicates the information indicating that the spectrum resource of the first network is allowed to be occupied for the session corresponding to the specific NSSAI and the specific DNN, but the first session of the first terminal device is not the session corresponding to the specific NSSAI and the specific DNN, the session management entity may determine, based on the subscription information of the first terminal device and the session policy information of the first terminal device, that the first session of the first terminal device or the first QoS flow of the first session of the first terminal device is not allowed to occupy the spectrum resource of the first network.

S802. The session management entity sends third indication information to an access network device. Correspondingly, the access network device receives the third indication information from the session management entity.

The third indication information indicates that the first session of the first terminal device is allowed to occupy the spectrum resource of the first network, or the third indication information indicates that the first QoS flow of the first session of the first terminal device is allowed to occupy the spectrum resource of the first network. The access network device is an access network device shared by the first network and the second network.

In some embodiments, the third indication information in this embodiment of this application is the same as the fourth indication information in the session policy information of the first terminal device.

S803. The access network device occupies the spectrum resource of the first network for the first session of the first terminal device or the first QoS flow of the first session of the first terminal device based on the third indication information.

It should be noted that, that the access network device occupies the spectrum resource of the first network for the first session of the first terminal device or the first QoS flow of the first session of the first terminal device may be understood as that the access network device may transmit data of the first session of the first terminal device or the first QoS flow of the first session of the first terminal device by using the spectrum resource of the first network. This is uniformly described herein, and details are not described below again.

For example, it is assumed that the spectrum resource of the first network is 100 MHz between 3.5 GHz and 3.6 GHz, and a spectrum resource of the second network to which the first terminal device subscribes is only 20 MHz left, which cannot meet a requirement (for example, a 40 MHz spectrum resource is required) of the first session of the first terminal device or the first QoS flow of the first session of the first terminal device, the access network device may occupy the spectrum resource of the first network to meet the requirement of the first session of the first terminal device or the first QoS flow of the first session of the first terminal device.

In some embodiments, the access network device may continue to occupy the spectrum resource (for example, a 20 MHz spectrum resource in the 100 MHz spectrum resource between 3.5 GHz and 3.6 GHz) of the first network for the first session of the first terminal device or the first QoS flow of the first session of the first terminal device after occupying the remaining available spectrum resource (for example, the 20 MHz spectrum resource between 3.4 GHz and 3.5 GHz) of the second network for the first session of the first terminal device or the first QoS flow of the first session of the first terminal device.

Alternatively, in another possible implementation, although the spectrum resource of the first network is 100 MHz between 3.4 GHz and 3.5 GHz, and the spectrum resource of the second network is 100 MHz between 3.4 GHz and 3.5 GHz, in a network sharing case, the first network and the second network may dynamically occupy any 100 MHz spectrum resource between 3.4 GHz and 3.6 GHz. In this case, the access network device may occupy a part of the remaining available spectrum resource of the second network and a part of the spectrum resource of the first network for the first session of the first terminal device or the first QoS flow of the first session of the first terminal device. For example, the access network device may occupy a 10 MHz spectrum resource (for example, 10 MHz in the 20 MHz available spectrum resource between 3.4 GHz and 3.5 GHz) of the second network and a 30 MHz spectrum resource (for example, a 30 MHz spectrum resource in the 100 MHz spectrum resource between 3.5 GHz and 3.6 GHz) of the first network for the first session of the first terminal device or the first QoS flow of the first session of the first terminal device.

It should be noted that the access network device may allocate the spectrum resource of the first network occupied for the first session of the first terminal device to the first session of the first terminal device, another session of the first terminal device, and/or another terminal device in the second network for use. If the access network device allocates the spectrum resource of the first network occupied for the first session of the first terminal device to another session of the first terminal device and/or another terminal device in the second network for use, the access network device may allocate, to the first session of the first terminal device for use, a corresponding quantity of spectrum resources of the second network that are allocated to the another session of the first terminal device and/or the another terminal device in the second network. How the access network device allocates the spectrum resource of the first network and the spectrum resource of the second network that are occupied for the first session of the first terminal device is not limited in this embodiment of this application. For example, still in the foregoing example, if the spectrum resource (for example, a 20 MHz spectrum resource in the 100 MHz spectrum resource between 3.5 GHz and 3.6 GHz) of the first network occupied to meet the requirement of the first session of the first terminal device is allocated to another session of the first terminal device and/or another terminal device in the second network for use, the access network device may allocate, to the first session of the first terminal device, a 20 MHz spectrum resource of the second network that is allocated to the another session of the first terminal device and/or the another terminal device in the second network, that is, allocate a 40 MHz spectrum resource between 3.4 GHz and 3.5 GHz to the first session of the first terminal device for use. Alternatively, still in the foregoing example, in the spectrum resource (for example, a 30 MHz spectrum resource in the 100 MHz spectrum resource between 3.5 GHz and 3.6 GHz) of the first network occupied to meet the requirement of the first session of the first terminal device, if a part (for example, a 10 MHz spectrum resource) is allocated to the first session of the first terminal device for use and a part (for example, a 20 MHz spectrum resource) is allocated to another session of the first terminal device and/or another terminal device in the second network for use, the access network device may allocate, to the first session of the first terminal device, a 20 MHz spectrum resource of the second network that is allocated to the another session of the first terminal device and/or the another terminal device in the second network, that is, allocate a 30 MHz spectrum resource between 3.4 GHz and 3.5 GHz to the first session of the first terminal device for use.

It should be noted that the access network device may allocate the spectrum resource of the first network occupied for the first QoS flow of the first session of the first terminal device to the first QoS flow of the first session of the first terminal device, another QoS flow of the first session of the first terminal device, another session of the first terminal device, and/or another terminal device in the second network for use. If the access network device allocates the spectrum resource of the first network occupied for the first QoS flow of the first session of the first terminal device to another QoS flow of the first session of the first terminal device, another session of the first terminal device, and/or another terminal device in the second network for use, the access network device may allocate, to the first QoS flow of the first session of the first terminal device for use, a corresponding quantity of spectrum resources of the second network that are allocated to the another QoS flow of the first session of the first terminal device, the another session of the first terminal device, and/or the another terminal device in the second network. How the access network device allocates the spectrum resource of the first network and the spectrum resource of the second network that are occupied for the first QoS flow of the first session of the first terminal device is not limited in this embodiment of this application. For example, still in the foregoing example, if the spectrum resource (for example, a 20 MHz spectrum resource in the 100 MHz spectrum resource between 3.5 GHz and 3.6 GHz) of the first network occupied to meet the requirement of the first QoS flow of the first session of the first terminal device is allocated to another QoS flow of the first session of the first terminal device, another session of the first terminal device, and/or another terminal device in the second network for use, the access network device may allocate, to the first QoS flow of the first session of the first terminal device, a 20 MHz spectrum resource of the second network that is allocated to the another QoS flow of the first session of the first terminal device, the another session of the first terminal device, and/or the another terminal device in the second network, that is, allocate a 40 MHz spectrum resource between 3.4 GHz and 3.5 GHz to the first QoS flow of the first session of the first terminal device for use. Alternatively, still in the foregoing example, in the spectrum resource (for example, a 30 MHz spectrum resource in the 100 MHz spectrum resource between 3.5 GHz and 3.6 GHz) of the first network occupied to meet the requirement of the first QoS flow of the first session of the first terminal device, if a part (for example, a 10 MHz spectrum resource) is allocated to the first QoS flow of the first session of the first terminal device for use and a part (for example, a 20 MHz spectrum resource) is allocated to, another QoS flow of the first session of the first terminal device, another session of the first terminal device, and/or another terminal device in the second network for use, the access network device may allocate, to the first QoS flow of the first session of the first terminal device, a 20 MHz spectrum resource of the second network that is allocated to the another QoS flow of the first session of the first terminal device, the another session of the first terminal device, and/or the another terminal device in the second network, that is, allocate a 30 MHz spectrum resource between 3.4 GHz and 3.5 GHz to the first QoS flow of the first session of the first terminal device for use.

Based on spectrum resource sharing method provided in this embodiment of this application, the access network device can occupy, only after the session management entity determines that the first session of the first terminal device or the first QoS flow of the first session of the first terminal device is allowed to occupy the spectrum resource of the first network, the spectrum resource of the first network for the first session of the first terminal device or the first QoS flow of the first session of the first terminal device based on the third indication information sent by the session management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

The processor 501 in the communication apparatus 500 shown in FIG. 5 may invoke the application program code stored in the memory 503, to indicate the session management entity to perform the actions of the session management entity in steps S801 to S803. The processor 501 in the communication apparatus 500 shown in FIG. 5 may invoke the application program code stored in the memory 503, to indicate the access network device to perform the actions of the access network device in steps S801 to S803. This is not limited in this embodiment.

It should be noted that, in this embodiment shown in FIG. 8, an example in which the session management entity sends the third indication information to the access network device after determining that the first session of the first terminal device or the first QoS flow of the first session of the first terminal device is allowed to occupy the spectrum resource of the first network is used for description. Alternatively, in this embodiment of this application, the session management entity may obtain the third indication information, and send the third indication information to the access network device. This is not specifically limited in this embodiment of this application. That the session management entity obtains the third indication information includes: The session management entity obtains the third indication information from the subscription information of the first terminal device or the session policy information of the first terminal device. For other related descriptions, refer to the embodiment shown in FIG. 8. Details are not described herein again.

Figure 9:
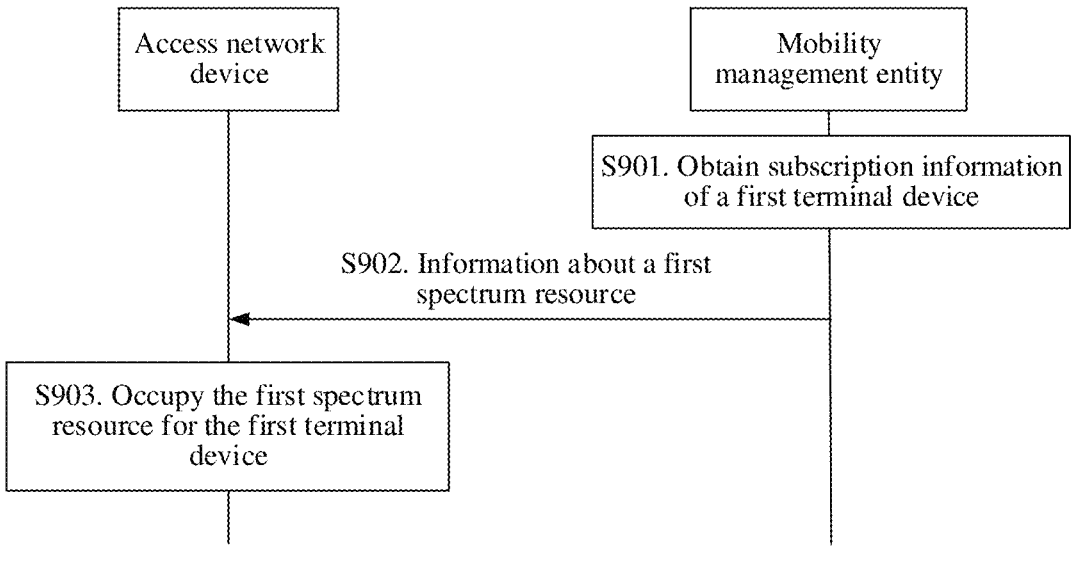
FIG. 9 is a schematic flowchart 4 of a spectrum resource sharing method according to an embodiment of this application.

FIG. 9 shows still another spectrum resource sharing method according to an embodiment of this application. Details are as follows:

S901. A mobility management entity obtains subscription information of a first terminal device.

The subscription information of the first terminal device includes information about a first spectrum resource, the first spectrum resource is a spectrum resource that is of a first network and that is allowed to be occupied by the first terminal device, the first terminal device subscribes to a second network, and the mobility management entity is a mobility management entity in the second network.

In some embodiments, the information about the first spectrum resource is an identifier of the first spectrum resource.

It should be noted that the subscription information of the first terminal device may include an identifier of one or more first spectrum resources. This is not specifically limited in this embodiment of this application.

S902. The mobility management entity sends the information about the first spectrum resource to an access network device. Correspondingly, the access network device receives the information about the first spectrum resource from the mobility management entity, and the access network device is an access network device shared by the first network and the second network.

S903. The access network device occupies the first spectrum resource for the first terminal device.

After obtaining the information about the first spectrum resources, the access network device may determine the first spectrum resources based on the information about the first spectrum resources. Further, the access network device occupies the determined first spectrum resource for the first terminal device.

It should be noted that, that the access network device occupies the first spectrum resource for the first terminal device may be understood as that the access network device may occupy the first spectrum resource for all services of the first terminal device, or may be understood as that the access network device may transmit all service data of the first terminal device by using the first spectrum resource. This is uniformly described herein, and details are not described below again.

For example, it is assumed that the spectrum resource of the first network is 100 MHz between 3.5 GHz and 3.6 GHz, and a spectrum resource of the second network to which the first terminal device subscribes is 100 MHz between 3.4 GHz and 3.5 GHz.

When the access network device determines that the spectrum resource (for example, a 20 MHz available spectrum resource between 3.4 GHz and 3.5 GHz) of the second network to which the first terminal device subscribes cannot meet a service requirement of the first terminal device, assuming that the first spectrum resource indicated by the information about the first spectrum resource is 50 MHz between 3.50 GHz and 3.55 GHz, the access network device may continue to occupy the spectrum resource (for example, a 20 MHz spectrum resource in the 50 MHz spectrum resource between 3.50 GHz and 3.55 GHz) of the first network for the first terminal device after occupying the spectrum resource (for example, the 20 MHz available spectrum resource between 3.4 GHz and 3.5 GHz) of the second network for the first terminal device.

Alternatively, when the access network device determines that the spectrum resource (for example, a 20 MHz available spectrum resource between 3.4 GHz and 3.5 GHz) of the second network to which the first terminal device subscribes cannot meet a service requirement of the first terminal device, assuming that the first spectrum resource indicated by the information about the first spectrum resource is 50 MHz between 3.50 GHz and 3.55 GHz, the access network device occupies the spectrum resource (for example, a 10 MHz spectrum resource in the 20 MHz available spectrum resource between 3.4 GHz and 3.5 GHz) of the second network and the spectrum resource (for example, a 30 MHz spectrum resource in the 50 MHz spectrum resource between 3.50 GHz and 3.55 GHz) of the first network for the first terminal device.

It should be noted that the foregoing example is described by using an example of a frequency band that is specifically the first spectrum resource indicated by the information about the first spectrum resource. Certainly, the first spectrum resource indicated by the information about the first spectrum resource may not be specifically a frequency band, but a quantity of spectrum resources that can be occupied is indicated. For example, in the foregoing example, the information about the first spectrum resource may indicate that the first spectrum resource is 50 MHz. This is not specifically limited in this embodiment of this application.

Based on the spectrum resource sharing method provided in this embodiment of this application, the access network device can occupy, only after the mobility management entity determines that the first terminal device is allowed to occupy the spectrum resource of the first network, the first spectrum resource for the first terminal device based on the information about the first spectrum resource sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

The processor 501 in the communication apparatus 500 shown in FIG. 5 may invoke the application program code stored in the memory 503, to indicate the mobility management entity to perform the actions of the mobility management entity in steps S901 to S903. The processor 501 in the communication apparatus 500 shown in FIG. 5 may invoke the application program code stored in the memory 503, to indicate the access network device to perform the actions of the access network device in steps S901 to S903. This is not limited in this embodiment.

Figure 10:
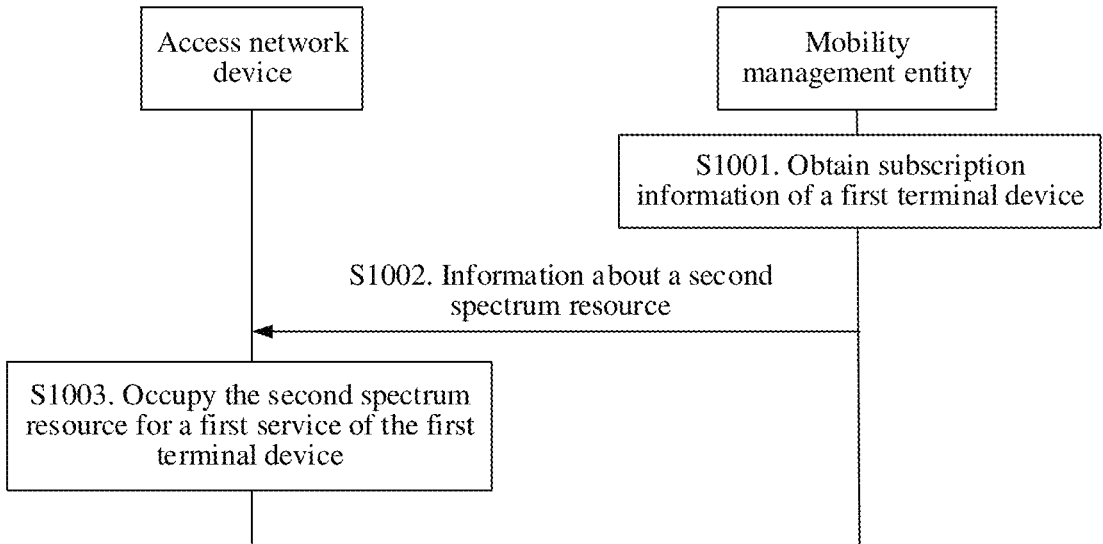
FIG. 10 is a schematic flowchart 5 of a spectrum resource sharing method according to an embodiment of this application.

FIG. 10 shows still another spectrum resource sharing method according to an embodiment of this application. Details are as follows:

S1001. A mobility management entity obtains subscription information of a first terminal device.

The subscription information of the first terminal device includes information about a second spectrum resource, the second spectrum resource is a spectrum resource that is of the first network and that is allowed to be occupied by a first service of the first terminal device, the first terminal device subscribes to a second network, and the mobility management entity is a mobility management entity in the second network.

In this embodiment of this application, for example, the first service of the first terminal device may include a high-value service such as an internet of vehicles service, a terminal device positioning service, an IMS service, or a Migu Video service.

In some embodiments, the information about the second spectrum resources includes a first identifier. There is a mapping relationship between the first identifier, an identifier of the second spectrum resource, and identification information of the first service. In other words, the first identifier may indicate the identifier of the second spectrum resource and the first service.

It should be noted that, that there is a mapping relationship between the first identifier, an identifier of the second spectrum resource, and identification information of the first service may be understood as that there is a mapping relationship between the first identifier and the identifier of the second spectrum resource and there is a mapping relationship between the first identifier and the identification information of the first service. Alternatively, that there is a mapping relationship between the first identifier, an identifier of the second spectrum resource, and identification information of the first service may be understood as that there is a mapping relationship among the first identifier, the identifier of the second spectrum resource, and the identification information of the first service. This is not specifically limited in this embodiment of this application.

It should be noted that the first identifier may indicate one or more second spectrum resources and one or more first services corresponding to each second spectrum resource. This is not specifically limited in this embodiment of this application.

In another possible implementation, the information about the second spectrum resource in this embodiment of this application includes an identifier of the second spectrum resource and identification information of the first service. In other words, in this embodiment of this application, the second spectrum resource may be determined based on the identifier of the second spectrum resource, and the first service may be determined based on the identification information of the first service. For related descriptions of the identification information of the first service, refer to the embodiment shown in FIG. 7. Details are not described herein again.

It should be noted that the information about the second spectrum resource in this embodiment of this application may include identifiers of a plurality of second spectrum resources, and the identifier of each second spectrum resource may correspond to identification information of one or more first services. In other words, in this embodiment of this application, the identifier of the second spectrum resource and the identification information of the first service may be in a one-to-many relationship, or may be in a one-to-one relationship. This is not specifically limited in this embodiment of this application.

For example, the information about the second spectrum resource may be shown in Table 1, Table 2, or Table 3.

TABLE 1

| Identifier of a second spectrum resource | Identification information of a first service |
| --- | --- |
| A | Identification information of service A and identification information of service B |

TABLE 2

| Identifier of a second spectrum resource | Identification information of a first service |
| --- | --- |
| B | Identification information of service A |
| C | Identification information of service B |

TABLE 3

| Identifier of a second spectrum resource | Identification information of a first service |
| --- | --- |
| B | Identification information of service A and identification information of service C |
| C | Identification information of service B |

S1002. The mobility management entity sends the information about the second spectrum resource to an access network device. Correspondingly, the access network device receives the information about the second spectrum resource from the mobility management entity. The access network device is an access network device shared by the first network and the second network.

S1003. The access network device occupies the second spectrum resource for the first service of the first terminal device based on the information about the second spectrum resource.

When the information about the second spectrum resource includes a first identifier, step S1003 includes: The access network device determines the second spectrum resource based on the first identifier and a mapping relationship between the first identifier and the identifier of the second spectrum resource. The access network device determines the first service based on the first identifier and a mapping relationship between the first identifier and the identification information of the first service. Further, the access network device occupies the second spectrum resource for the first service of the first terminal device.

When the information about the second spectrum resources includes the identifier of the second spectrum resources and the identification information of the first service, step S1003 includes: The access network device determines the second spectrum resource based on the identifier of the second spectrum resources. The access network device determines the first service based on the identification information of the first service. Further, the access network device occupies the second spectrum resource for the first service of the first terminal device.

It should be noted that, in this embodiment of this application, that the access network device occupies the second spectrum resource for the first service of the first terminal device may be understood as that the access network device may transmit data of the first service of the first terminal device by using the second spectrum resource. This is uniformly described herein, and details are not described below again.

For example, it is assumed that the spectrum resource of the first network is 100 MHz between 3.5 GHz and 3.6 GHz, and a spectrum resource of the second network to which the first terminal device subscribes is 100 MHz between 3.4 GHz and 3.5 GHz.

It is assumed that the second spectrum resource indicated by the information about the second spectrum resource is 50 MHz between 3.50 GHz and 3.55 GHz, and the first service indicated by the information about the second spectrum resource is an internet of vehicles service. When the access network device determines that the spectrum resource (for example, a 20 MHz available spectrum resource between 3.4 GHz and 3.5 GHz) of the second network to which the first terminal device subscribes cannot meet a requirement of the first service of the first terminal device, the access network device may continue to occupy the spectrum resource (for example, a 20 MHz spectrum resource in the 50 MHz spectrum resource between 3.50 GHz and 3.55 GHz) of the first network for the first service of the first terminal device after occupying the spectrum resource (for example, the 20 MHz available spectrum resource between 3.4 GHz and 3.5 GHz) of the second network for the first service of the first terminal device.

Alternatively, it is assumed that the second spectrum resource indicated by the information about the second spectrum resource is 50 MHz between 3.50 GHz and 3.55 GHz, and the first service indicated by the information about the second spectrum resource is an internet of vehicles service. When the access network device determines that the spectrum resource (for example, a 20 MHz available spectrum resource between 3.4 GHz and 3.5 GHz) of the second network to which the first terminal device subscribes cannot meet a requirement of the first service of the first terminal device, the access network device may occupy the spectrum resource (for example, a 10 MHz spectrum resource in the 20 MHz available spectrum resource between 3.4 GHz and 3.5 GHz) of the second network and the spectrum resource (for example, a 30 MHz spectrum resource in the 50 MHz spectrum resource between 3.50 GHz and 3.55 GHz) of the first network for the first service of the first terminal device.

It should be noted that the foregoing example is described by using an example of a frequency band that is specifically the second spectrum resource indicated by the information about the second spectrum resource. Certainly, the second spectrum resource indicated by the information about the second spectrum resource may not be specifically a frequency band, but a quantity of spectrum resources that can be occupied is indicated. For example, in the foregoing example, the information about the second spectrum resource may indicate that the second spectrum resource is 50 MHz. This is not specifically limited in this embodiment of this application.

Based on the spectrum resource sharing method provided in this embodiment of this application, the access network device can occupy, only after the mobility management entity determines that the first service of the first terminal device is allowed to occupy the spectrum resource of the first network, the second spectrum resource for the first service of the first terminal device based on the information about the second spectrum resource sent by the mobility management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator.

The processor 501 in the communication apparatus 500 shown in FIG. 5 may invoke the application program code stored in the memory 503, to indicate the mobility management entity to perform the actions of the mobility management entity in steps S1001 to S1003. The processor 501 in the communication apparatus 500 shown in FIG. 5 may invoke the application program code stored in the memory 503, to indicate the access network device to perform the actions of the access network device in steps S1001 to S1003. This is not limited in this embodiment.

Figure 11:
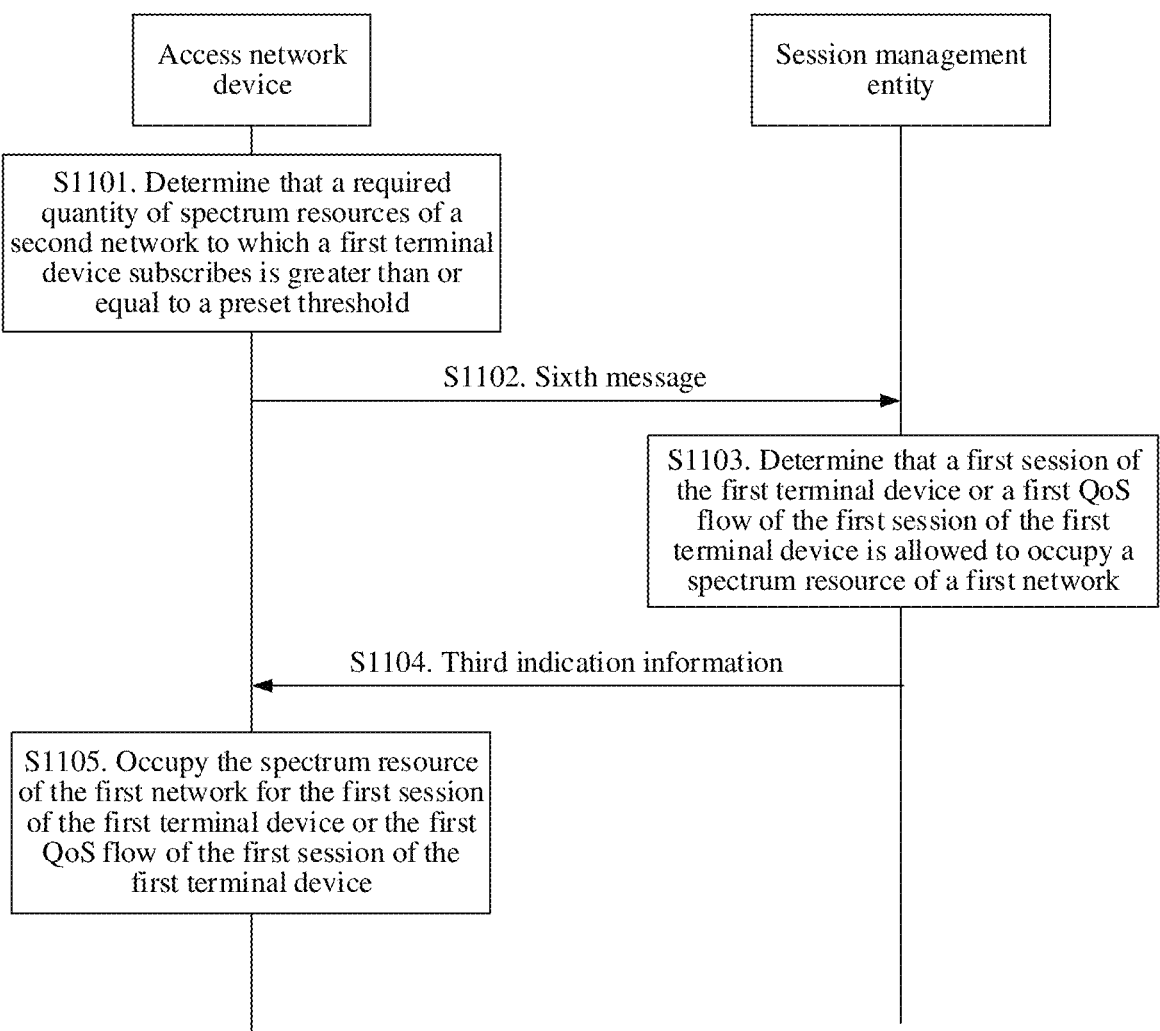
FIG. 11 is a schematic flowchart 6 of a spectrum resource sharing method according to an embodiment of this application.

FIG. 11 shows still another spectrum resource sharing method according to an embodiment of this application. Details are as follows:

S1101. An access network device determines that a required quantity of spectrum resources of a second network to which a first terminal device subscribes is greater than or equal to a preset threshold. The access network device is an access network device shared by a first network and the second network.

S1102. The access network device sends a sixth message to a session management entity. Correspondingly, the session management entity receives the sixth message from the access network device.

The sixth message indicates that the second network to which the first terminal device subscribes has insufficient spectrum resources, or the sixth message is for requesting to determine whether a first session of the first terminal device or a first QoS flow of the first session of the first terminal device is allowed to occupy a spectrum resource of the first network. The session management entity is a session management entity in the second network.

For example, in this embodiment of this application, when the sixth message includes an identifier of the first session of the first terminal device, the sixth message may be for requesting to determine whether the first session of the first terminal device is allowed to occupy the spectrum resource of the first network. Alternatively, when the sixth message includes an identifier of the first QoS flow of the first session of the first terminal device, the sixth message may be for requesting to determine whether the first QoS flow of the first session of the first terminal device is allowed to occupy the spectrum resource of the first network. Alternatively, when the sixth message includes an identifier of the first session of the first terminal device and an identifier of the first QoS flow of the first session of the first terminal device, the sixth message indicates that the second network to which the first terminal device subscribes has insufficient spectrum resources. This is not specifically limited in this embodiment of this application.

S1103. In response to the sixth message, the session management entity determines that the first session of the first terminal device or the first QoS flow of the first session of the first terminal device is allowed to occupy the spectrum resource of the first network.

S1104. The session management entity sends third indication information to the access network device. Correspondingly, the access network device receives the third indication information from the session management entity, where the third indication information indicates that the first session of the first terminal device or the first QoS flow of the first session of the first terminal device is allowed to occupy the spectrum resource of the first network.

S1105. The access network device occupies the spectrum resource of the first network for the first session of the first terminal device or the first QoS flow of the first session of the first terminal device based on the third indication information.

For related descriptions of steps S1103 to S1105, refer to steps S801 to S803 in the embodiment described in FIG. 8. Details are not described herein again.

In some embodiments, the spectrum resource sharing method further includes: The session management entity sends, to the access network device, duration in which the first session of the first terminal device or the first QoS flow of the first session of the first terminal device is allowed to occupy the spectrum resource of the first network. In this way, when duration in which the first session of the first terminal device or the first QoS flow of the first session of the first terminal device occupies the spectrum resource of the first network reaches the duration, the access network device may no longer occupy the spectrum resource of the first network for the first session of the first terminal device or the first QoS flow of the first session of the first terminal device, to effectively control occupation of a spectrum resource of another network.

Based on spectrum resource sharing method provided in this embodiment of this application, the access network device can occupy, only after the session management entity determines that the first session of the first terminal device or the first QoS flow of the first session of the first terminal device is allowed to occupy the spectrum resource of the first network, the spectrum resource of the first network for the first session of the first terminal device or the first QoS flow of the first session of the first terminal device based on the third indication information sent by the session management entity. Therefore, a problem of spectrum resource congestion caused by occupation of spectrum resources of another network by all terminal devices or all services of the terminal devices can be avoided, thereby improving experience of a specific user (for example, a high-value user) or a specific service (for example, a high-value service). In addition, a problem can be avoided that when a non-specific user (for example, a low-value user) or a non-specific service (for example, a low-value service) occupies a spectrum resource of the another network, an operator of a current network may pay, to an operator of the another network for the user or the service, a fee higher than a fee paid by the user or the service to the operator of the current network. This maximizes commercial interests of the operator. In addition, in this solution, the access network device dynamically requests, based on a service requirement, the mobility management entity to determine whether the first session of the first terminal device or the first QoS flow of the first session of the first terminal device is allowed to occupy the spectrum resource of the first network. Therefore, the solution design is more flexible.

The processor 501 in the communication apparatus 500 shown in FIG. 5 may invoke the application program code stored in the memory 503, to indicate the session management entity to perform the actions of the session management entity in steps S1101 to S1105. The processor 501 in the communication apparatus 500 shown in FIG. 5 may invoke the application program code stored in the memory 503, to indicate the access network device to perform the actions of the access network device in steps S1101 to S1105. This is not limited in this embodiment.

The following uses an example in which the communication system in FIG. 2 or FIG. 3 is applied to the 5G network shown in FIG. 4 and the first terminal device subscribes to the second network to describe the spectrum resource sharing method in FIG. 6 to FIG. 11.

It should be noted that names of messages between network elements, names of parameters in the messages, or the like in the following embodiments of this application are merely examples, and there may be other names in a specific implementation. This is not specifically limited in embodiments of this application.

Figure 12:
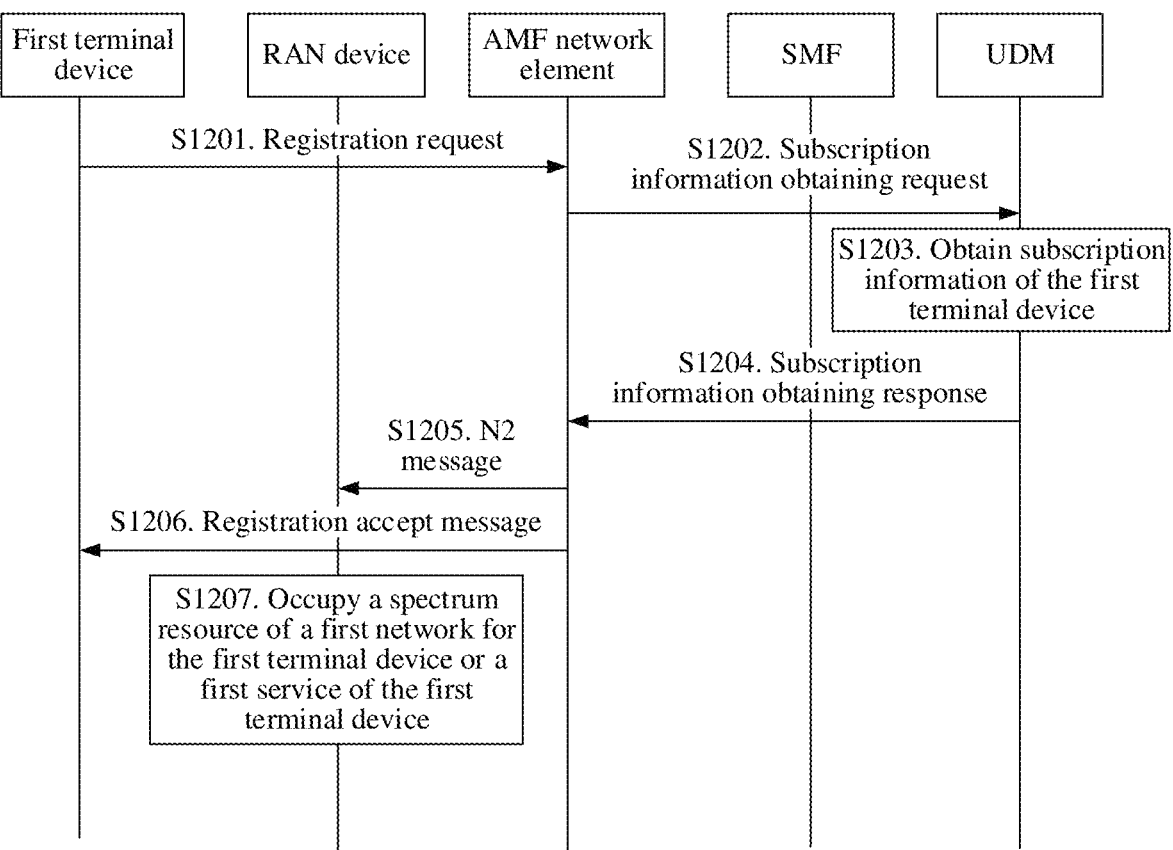
FIG. 12 is a schematic flowchart 1 of a spectrum resource sharing method applied to a 5G network according to an embodiment of this application.

With reference to the spectrum resource sharing method in FIG. 6 or FIG. 7, that the communication system in FIG. 2 is applied to the 5G network shown in FIG. 4 is used as an example. FIG. 12 shows a spectrum resource sharing method according to an embodiment of this application. Details are as follows:

S1201. A first terminal device sends a registration request to an AMF. Correspondingly, the AMF receives the registration request from the first terminal device.

S1202. The AMF sends, to a UDM, a UDM-provided subscription information management (SDM) service subscription information obtaining request (Nudm_SDM_Get request). Correspondingly, the UDM receives the subscription information obtaining request from the AMF. The subscription information obtaining request is for requesting subscription information of the first terminal device.

It should be noted that, when the first terminal device initially registers with a network, or when the first terminal device does not initially register with the network but the AMF does not have user subscription information, step S1202 is performed.

S1203. The UDM obtains the subscription information of the first terminal device. The subscription information includes first information. Alternatively, the subscription information includes at least one of first information, fourth information, or identification information of a first service of the first terminal device.

For related descriptions of the first information, refer to the embodiment shown in FIG. 6. For related descriptions of the fourth information or the identification information of the first service of the first terminal device, refer to the embodiment shown in FIG. 7. Details are not described herein again.

In this embodiment of this application, the subscription information of the first terminal device may further include some existing subscription information, for example, slice information and/or mobility restriction information of the first terminal device. This is not specifically limited in this embodiment of this application.

In some embodiments, the subscription information of the first terminal device is preconfigured in a UDR. Further, when the UDM receives the subscription information obtaining request from the AMF, the UDM obtains the subscription information of the first terminal device from the UDR and stores the subscription information in the UDM.

S1204. The UDM sends, to the AMF, a UDM-provided subscription information management service subscription information obtaining response (Nudm_SDM_Get response). Correspondingly, the AMF receives the subscription information obtaining response from the UDM. The subscription information obtaining response includes the subscription information of the first terminal device.

S1205. The AMF sends an N2 message to a RAN device based on the subscription information of the first terminal device. Correspondingly, the RAN device receives the N2 message from the AMF.

It should be noted that the N2 message in this embodiment of this application is only a specific example of the first message in the embodiment shown in FIG. 6 or the third message in the embodiment shown in FIG. 7. Certainly, the first message in the embodiment shown in FIG. 6 or the third message in the embodiment shown in FIG. 7 may be another message. This is not specifically limited in this embodiment of this application.

In some embodiments, when the subscription information of the first terminal device includes the first information, the AMF may determine, based on at least one of the subscription information of the first terminal device, access and mobility control policy information of the first terminal device, or local policy information of a second network, that the first terminal device is allowed to occupy a spectrum resource of a first network. For related descriptions, refer to the embodiment in FIG. 6. Details are not described herein again. Further, the N2 message includes first indication information, and the first indication information indicates that the first terminal device is allowed to occupy the spectrum resource of the first network.

In another possible implementation, when the subscription information of the first terminal device includes at least one of the first information, the fourth information, or the identification information of the first service of the first terminal device, the AMF may determine, based on at least one of the subscription information of the first terminal device, access and mobility control policy information of the first terminal device, or local policy information of a second network, that the first service of the first terminal device is allowed to occupy a spectrum resource of a first network. For related descriptions, refer to the embodiment in FIG. 7. Details are not described herein again. Further, the N2 message includes second indication information, and the second indication information indicates that the first service of the first terminal device is allowed to occupy the spectrum resource of the first network. For example, the second indication information may include indication information indicating that the first service of the first terminal device is allowed to occupy the spectrum resource of the first network and the identification information of the first service that is of the first terminal device and that is allowed to occupy the spectrum resource of the first network.

In some embodiments, when the AMF determines that the first terminal device is not allowed to occupy the spectrum resource of the first network, the N2 message includes seventh indication information, where the seventh indication information indicates that the first terminal device is not allowed to occupy the spectrum resource of the first network. Certainly, the RAN device may alternatively learn, in an implicit manner, that the network does not allow the first terminal device to occupy the spectrum resource of the first network. For example, when the N2 message does not include the first indication information or the second indication information, the RAN device may determine that the network does not allow the first terminal device to occupy the spectrum resource of the first network. This is not specifically limited in this embodiment of this application.

S1206. The AMF sends a registration accept message to the first terminal device. Correspondingly, the first terminal device receives the registration accept message from the AMF.

Further, in this embodiment of this application, if the N2 message includes the first indication information or the second indication information, the spectrum resource sharing method provided in this embodiment of this application further includes the following step S1207:

S1207. The RAN device occupies the spectrum resource of the first network for the first terminal device or the first service of the first terminal device.

In this embodiment of this application, when the N2 message includes the first indication information, the RAN device may occupy the spectrum resource of the first network for the first terminal device based on the first indication information For related descriptions and examples, refer to the embodiment shown in FIG. 6. Details are not described herein again.

In this embodiment of this application, when the N2 message includes the second indication information, the RAN device may occupy the spectrum resource of the first network for the first service of the first terminal device based on the second indication information For related descriptions and examples, refer to the embodiment shown in FIG. 7. Details are not described herein again.

It should be noted that, in this embodiment of this application, the RAN device may occupy the spectrum resource of the first network for the first terminal device or the first service of the first terminal device when determining that a required quantity of spectrum resources of the second network to which the first terminal device subscribes is greater than or equal to a preset threshold. Certainly, alternatively, after receiving the N2 message, the RAN device may directly occupy the spectrum resource of the first network for the first terminal device or the first service of the first terminal device without determining whether a required quantity of spectrum resources of the second network to which the first terminal device subscribes is greater than or equal to a preset threshold. This is not specifically limited in this embodiment of this application.

The embodiment shown in FIG. 12 is described by using a registration procedure as an example. In some embodiments, the foregoing spectrum resource sharing method may also be applied to a service request procedure. For example, when the spectrum resource sharing method is applied to the service request procedure, step S1201 is replaced with: The first terminal device is in an idle state and sends a service request message to the AMF. In addition, step S1206 is replaced with: The AMF sends a service accept message to the first terminal device. For other related descriptions, refer to the embodiment shown in FIG. 12. Details are not described herein again.

For technical effects of the embodiment shown in FIG. 12, refer to the embodiment shown in FIG. 6 or FIG. 7. Details are not described herein again.

The processor 501 in the communication apparatus 500 shown in FIG. 5 may invoke the application program code stored in the memory 503, to indicate the AMF to perform the actions of the AMF in steps S1201 to S1207. The processor 501 in the communication apparatus 500 shown in FIG. 5 may invoke the application program code stored in the memory 503, to indicate the RAN device to perform the actions of the RAN device in steps S1201 to S1207. This is not limited in this embodiment.

Figure 13:
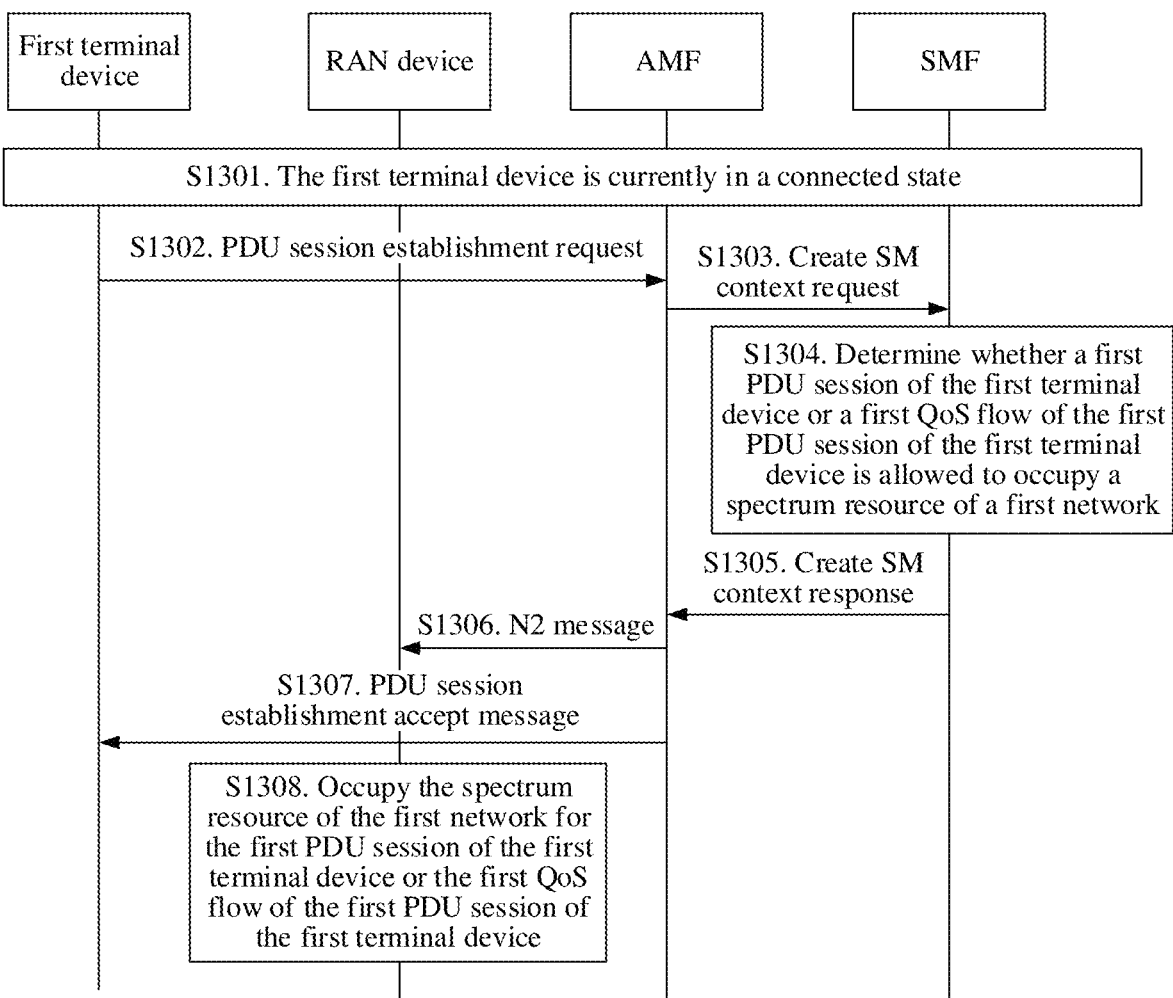
FIG. 13 is a schematic flowchart 2 of a spectrum resource sharing method applied to a 5G network according to an embodiment of this application.

With reference to the spectrum resource sharing method in FIG. 8, that the communication system in FIG. 3 is applied to the 5G network shown in FIG. 4 is used as an example. FIG. 13 shows another spectrum resource sharing method according to an embodiment of this application. Details are as follows:

S1301. A first terminal device is currently in a connected state.

In this embodiment of this application, that the first terminal device is in the connected state means that there is a signaling connection between the first terminal device and a network, for example, a non-access stratum (NAS) signaling connection between the first terminal device and an AMF.

S1302. The first terminal device sends a PDU session establishment request to the AMF. Correspondingly, the AMF receives the PDU session establishment request from the first terminal device. The PDU session establishment request is for requesting to establish a first PDU session for the first terminal device. For related descriptions, refer to some approaches. Details are not described herein.

It should be noted that in this embodiment of this application, the 5G network is used as an example for description. Therefore, a first session is the first PDU session. Certainly, in another future network, the session may be another session than the PDU session. This is not specifically limited in this embodiment of this application.

S1303. The AMF sends a PDU session establishment request to an SMF by using an SMF-provided PDU session create session management (SM) context request (Nsmf_P-DUSession_CreateSM context request). Correspondingly, the SMF receives the create SM context request from the AMF.

It should be noted that the create SM context request in this embodiment of this application is merely a specific example of the fifth message in the embodiment shown in FIG. 8. The fifth message is for requesting to establish the first PDU session for the first terminal device. Certainly, the fifth message in the embodiment shown in FIG. 8 may be another message. This is not specifically limited in this embodiment of this application.

S1304. The SMF determines, based on subscription information of the first terminal device and/or session policy information of the first terminal device, that the first PDU session of the first terminal device or a first QoS flow of the first PDU session of the first terminal device is allowed to occupy a spectrum resource of a first network.

In this embodiment of this application, if the SMF does not have the subscription information of the first terminal device, the SMF may request the subscription information of the first terminal device from a UDM. Further, if the UDM does not have the subscription information of the first terminal device, the UDM may request the subscription information of the first terminal device from a UDR. This is uniformly described herein, and details are not described below again.

In this embodiment of this application, for related descriptions of the subscription information of the first terminal device and/or the session policy information of the first terminal device, refer to the embodiment shown in FIG. 8. Details are not described herein again.

It should be noted that, in this embodiment of this application, when the SMF obtains the session policy information of the first terminal device from a PCF, the fourth indication information in the embodiment shown in FIG. 8 may be included in a policy and charging control (PCC) rule in the session policy information of the first terminal device, or the session policy information of the first terminal device includes the PCC rule and the fourth indication information in the embodiment shown in FIG. 8. This is not specifically limited in this embodiment of this application. It may be understood that, that the fourth indication information indicates that a session or a QoS flow established based on the session policy information is allowed to occupy the spectrum resource of the first network in the embodiment shown in FIG. 8 may also be understood as that a session or a QoS flow established based on the PCC rule is allowed to occupy the spectrum resource of the first network. This is uniformly described herein, and details are not described below.

S1305. The SMF sends a PDU session establishment accept (PDU session establishment accept) message to the AMF by using an SMF-provided PDU session create SM context response (Nsmf_PDUSession_CreateSM context response). Correspondingly, the AMF receives the create SM context response from the SMF.

S1306. The AMF sends an N2 message to a RAN device. Correspondingly, the RAN device receives the N2 message from the AMF.

For step S1305 and step S1306:

When the SMF determines that the first PDU session of the first terminal device or the first QoS flow of the first PDU session of the first terminal device is allowed to occupy the spectrum resource of the first network, the create SM context response in step S1305 includes third indication information, and the N2 message in step S1306 includes the third indication information. The third indication information indicates that the first PDU session of the first terminal device or the first QoS flow of the first PDU session of the first terminal device is allowed to occupy the spectrum resource of the first network.

In some embodiments, when the SMF determines that the first PDU session of the first terminal device or the first QoS flow of the first PDU session of the first terminal device is not allowed to occupy the spectrum resource of the first network, the create SM context response in step S1305 may include eighth indication information, and the N2 message in step S1306 includes the eighth indication information. The eighth indication information indicates that the first PDU session of the first terminal device or the first QoS flow of the first PDU session of the first terminal device is not allowed to occupy the spectrum resource of the first network. Certainly, the RAN device may alternatively learn, in an implicit manner, that the network does not allow the first PDU session of the first terminal device or the first QoS flow of the first PDU session of the first terminal device to occupy the spectrum resource of the first network. For example, when the N2 message does not include the third indication information, the RAN device may determine that the network does not allow the first PDU session of the first terminal device or the first QoS flow of the first PDU session of the first terminal device to occupy the spectrum resource of the first network. This is not specifically limited in this embodiment of this application.

S1307. The AMF sends the PDU session establishment accept message to the first terminal device. Correspondingly, the first terminal device receives the PDU session establishment accept message from the AMF.

It should be noted that, in this embodiment of this application, steps S1307 and S1306 may be performed at the same time. Alternatively, the PDU session establishment accept message in step S1307 is included in the N2 message in step S1306 and sent to the RAN device, and the RAN device further sends the PDU session establishment accept message to the first terminal device. This is not specifically limited in this embodiment of this application.

Further, in this embodiment of this application, if the N2 message includes the third indication information, the spectrum resource sharing method provided in this embodiment of this application further includes the following step S1308:

S1308. The RAN device occupies the spectrum resource of the first network for the first PDU session of the first terminal device or the first QoS flow of the first PDU session of the first terminal device.

For related descriptions and examples in which the RAN device occupies the spectrum resource of the first network for the first PDU session of the first terminal device or the first QoS flow of the first PDU session of the first terminal device, refer to the embodiment shown in FIG. 8. Details are not described herein again.

It should be noted that, in this embodiment of this application, the RAN device may occupy the spectrum resource of the first network for the first PDU session of the first terminal device or the first QoS flow of the first PDU session of the first terminal device based on the third indication information when determining that a required quantity of spectrum resources of a second network to which the first terminal device subscribes is greater than or equal to a preset threshold. Certainly, alternatively, after receiving the N2 message, the RAN device may directly occupy the spectrum resource of the first network for the first PDU session of the first terminal device or the first QoS flow of the first PDU session of the first terminal device without determining whether a required quantity of spectrum resources of a second network is greater than or equal to a preset threshold. This is not specifically limited in this embodiment of this application.

The embodiment shown in FIG. 13 is described by using a PDU session establishment procedure as an example. In some embodiments, the foregoing spectrum resource sharing method may also be applied to a PDU session activation procedure. For example, when the spectrum resource sharing method is applied to the PDU session activation procedure, step S1301 is optional, to be specific, the first terminal device may be in the connected state or may be in an idle state. In addition, the PDU session establishment request in step S1302 may be replaced with a service request for requesting to activate the PDU session, the PDU session establishment request in step S1303 may be replaced with an SMF-provided PDU session update SM context request (Nsmf_PDUSession_UpdateSM context request), the create SM context response in step S1305 may be replaced with an SMF-provided PDU session update session management context response (Nsmf_PDUSession_UpdateSM context response), and the PDU session establishment accept message in the create SM context response in step S1305 and the PDU session establishment accept message in step S1307 are replaced with service accept messages. For other related descriptions, refer to the embodiment shown in FIG. 13. Details are not described herein again.

For technical effects of the embodiment shown in FIG. 13, refer to the embodiment shown in FIG. 8. Details are not described herein again.

The processor 501 in the communication apparatus 500 shown in FIG. 5 may invoke the application program code stored in the memory 503, to indicate the SMF to perform the actions of the SMF in steps S1301 to S1308. The processor 501 in the communication apparatus 500 shown in FIG. 5 may invoke the application program code stored in the memory 503, to indicate the RAN device to perform the actions of the RAN device in steps S1301 to S1308. This is not limited in this embodiment.

Figure 14:
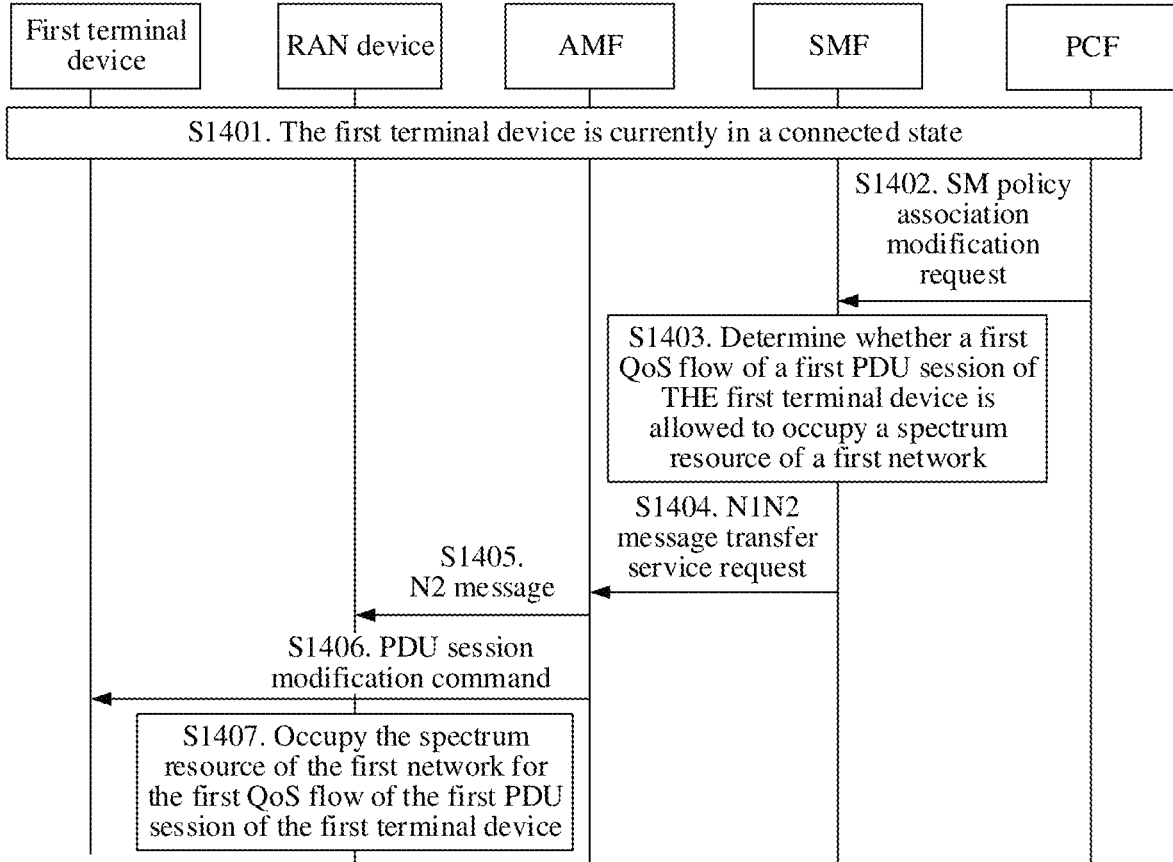
FIG. 14 is a schematic flowchart 3 of a spectrum resource sharing method applied to a 5G network according to an embodiment of this application.

It should be noted that, in the embodiment shown in FIG. 13, an example in which the first QoS flow of the first PDU session of the first terminal device is established in the procedure for establishing the first PDU session of the first terminal device is used for description. Certainly, the first QoS flow of the first PDU session of the first terminal device and the first PDU session of the first terminal device may not be established in a same procedure. For example, FIG. 14 shows still another spectrum resource sharing method according to an embodiment of this application. Details are as follows:

S1401. A first terminal device is currently in a connected state. For related descriptions in which the first terminal device is in the connected state, refer to step S1301 in FIG. 13. Details are not described herein again.

S1402. A PCF sends an SM policy association modification request to an SMF. Correspondingly, the SMF receives the SM policy association modification request from the PCF. The SM policy association modification request includes session policy information of the first terminal device.

It should be noted that the SM policy association modification request in this embodiment of this application is merely a specific example of the fifth message in the embodiment shown in FIG. 8. Certainly, the fifth message in the embodiment shown in FIG. 8 may alternatively be another message. This is not specifically limited in this embodiment of this application.

In some embodiments, the PCF may determine, based on a local configuration, whether to allow occupation of a spectrum resource of a first network for a first service (such as the foregoing internet of vehicles service or the foregoing IMS service).

For related descriptions of the session policy information of the first terminal device obtained by the SMF from the PCF, refer to the embodiment shown in FIG. 13. Details are not described herein again.

S1403. The SMF establishes the first QoS flow of the first PDU session of the first terminal device, and determines, based on the session policy information of the first terminal device, whether the first QoS flow of the first PDU session of the first terminal device is allowed to occupy the spectrum resource of the first network.

For example, it is assumed that the session policy information of the first terminal device includes fourth indication information, and the fourth indication information indicates that a session or a QoS flow established based on the session policy information of the first terminal device is allowed to occupy the spectrum resource of the first network. In this case, the SMF may determine, based on the session policy information of the first terminal device, that the first QoS flow of the first PDU session of the first terminal device is allowed to occupy the spectrum resource of the first network.

In some embodiments, when determining, based on the session policy information of the first terminal device, whether the first QoS flow of the first PDU session of the first terminal device is allowed to occupy the spectrum resource of the first network, the SMF may perform determining based on subscription information of the first terminal device. For related examples, refer to the embodiment shown in FIG. 13. Details are not described herein again.

S1404. The SMF sends, to an AMF, an AMF-provided N1N2 message transfer service (Namf_Communication_N1N2MessageTransfer service) request. Correspondingly, the AMF receives the N1N2 message transfer service request from the SMF.

S1405. The AMF sends an N2 message to a RAN device. Correspondingly, the RAN device receives the N2 message from the AMF.

For step S1404 and step S1405:

When the SMF determines that the first QoS flow of the first PDU session of the first terminal device is allowed to occupy the spectrum resource of the first network, the N1N2 message transfer service request in step S1404 includes third indication information, and the N2 message in step S1405 includes the third indication information. The third indication information indicates that the first QoS flow of the first PDU session of the first terminal device is allowed to occupy the spectrum resource of the first network.

In some embodiments, when the SMF determines that the first QoS flow of the first PDU session of the first terminal device is not allowed to occupy the spectrum resource of the first network, the N1N2 message transfer service request in step S1404 may include eighth indication information, and the N2 message in step S1406 includes the eighth indication information. The eighth indication information indicates that the first QoS flow of the first PDU session of the first terminal device is not allowed to occupy the spectrum resource of the first network. Certainly, the RAN device may alternatively learn, in an implicit manner, that the network does not allow the first QoS flow of the first PDU session of the first terminal device to occupy the spectrum resource of the first network. For example, when the N2 message does not include the third indication information, the RAN device may determine that the network does not allow the first QoS flow of the first PDU session of the first terminal device to occupy the spectrum resource of the first network. This is not specifically limited in this embodiment of this application.

S1406. The AMF sends a PDU session modification command to the first terminal device. Correspondingly, the first terminal device receives the PDU session modification command from the AMF.

It should be noted that, in this embodiment of this application, steps S1405 and S1406 may be performed at the same time. Alternatively, the PDU session modification command in step S1406 is included in the N2 message in step S1405 and sent to the RAN device, and the RAN device further sends the PDU session modification command to the first terminal device. This is not specifically limited in this embodiment of this application.

Further, in this embodiment of this application, if the N2 message includes the third indication information, the spectrum resource sharing method provided in this embodiment of this application further includes the following step S1407:

S1407. The RAN device occupies the spectrum resource of the first network for the first QoS flow of the first PDU session of the first terminal device.

For related descriptions in which the RAN device occupies the spectrum resource of the first network for the first QoS flow of the first PDU session of the first terminal device, refer to the embodiment shown in FIG. 8. Details are not described herein again.

It should be noted that, in this embodiment of this application, the RAN device may occupy the spectrum resource of the first network for the first QoS flow of the first PDU session of the first terminal device based on the third indication information when determining that a required quantity of spectrum resources of a second network to which the first terminal device subscribes is greater than or equal to a preset threshold. Certainly, alternatively, after receiving the N2 message, the RAN device may directly occupy the spectrum resource of the first network for the first QoS flow of the first PDU session of the first terminal device without determining whether a required quantity of spectrum resources of a second network is greater than or equal to a preset threshold. This is not specifically limited in this embodiment of this application.

For technical effects of the embodiment shown in FIG. 14, refer to the embodiment shown in FIG. 8. Details are not described herein again.

The processor 501 in the communication apparatus 500 shown in FIG. 5 may invoke the application program code stored in the memory 503, to indicate the SMF to perform the actions of the SMF in steps S1401 to S1407. The processor 501 in the communication apparatus 500 shown in FIG. 5 may invoke the application program code stored in the memory 503, to indicate the RAN device to perform the actions of the RAN device in steps S1401 to S1407. This is not limited in this embodiment.

Figure 15:
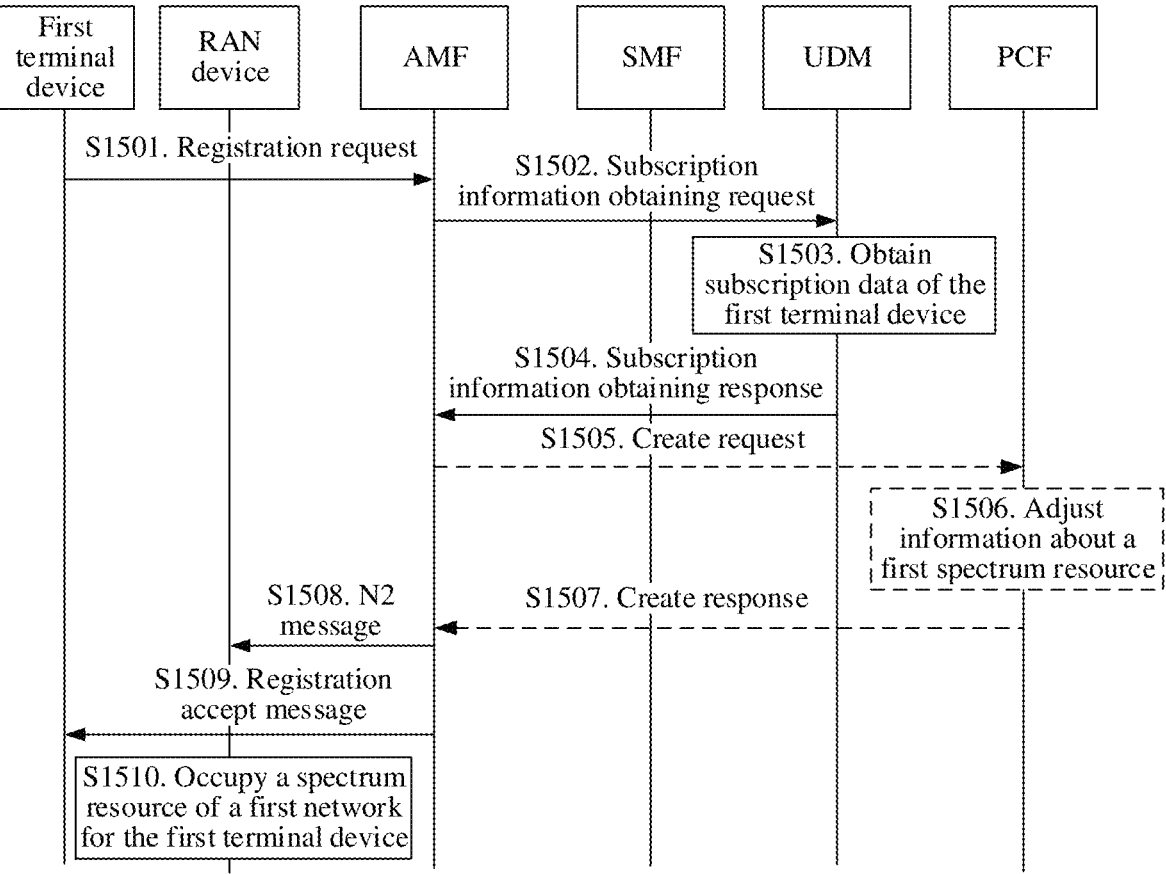
FIG. 15 is a schematic flowchart 4 of a spectrum resource sharing method applied to a 5G network according to an embodiment of this application.

With reference to the spectrum resource sharing method in FIG. 9, that the communication system in FIG. 2 is applied to the 5G network shown in FIG. 4 is used as an example. FIG. 15 shows another spectrum resource sharing method according to an embodiment of this application. Details are as follows:

S1501 and S1502 are the same as steps S1201 and S1202 in the embodiment shown in FIG. 12. Details are not described herein again.

S1503. The UDM obtains the subscription information of the first terminal device. The subscription information includes information about a first spectrum resource. For related descriptions of the information about the first spectrum resource, refer to the embodiment shown in FIG. 9. Details are not described herein again.

In some embodiments, the information about the first spectrum resource further indicates a PLMN ID and/or a RAT type corresponding to the first spectrum resource. This is not specifically limited in this embodiment of this application.

Certainly, in this embodiment of this application, the subscription information of the first terminal device may further include some existing subscription information, for example, slice information and/or mobility restriction information of the first terminal device. This is not specifically limited in this embodiment of this application.

In some embodiments, the subscription information of the first terminal device is preconfigured in a UDR. Further, when the UDM receives the subscription information obtaining request from the AMF, the UDM obtains the subscription information of the first terminal device from the UDR and stores the subscription information in the UDM.

S1504. The UDM sends, to the AMF, a UDM-provided subscription information management service subscription information obtaining response (Nudm_SDM_Get response). Correspondingly, the AMF receives the subscription information obtaining response from the UDM. The subscription information obtaining response includes the subscription information of the first terminal device.

Therefore, the AMF can obtain the subscription information of the first terminal device. The subscription information includes the information about the first spectrum resource. In some embodiments, the UDM may further adjust the information about the first spectrum resource by interacting with a PCF, as shown in steps S1505 to S1507.

S1505. The AMF sends, to the PCF, a PCF-provided access and mobility (AM) policy control create request (Npcf_AM policy control_create request). Correspondingly, the PCF receives the create request from the AMF. The create request includes the information about the first spectrum resource.

S1506. The PCF adjusts the information about the first spectrum resources according to a local policy.

For example, it is assumed that the information about the first spectrum resource in the subscription information of the terminal device is 1, and the information about the first spectrum resource indicates a spectrum resource 1 of the first network. In this case, the PCF may adjust the information about the first spectrum resource, where the adjusted information about the first spectrum resource indicates a spectrum resource 2 of the first network (in other words, it is recommended that another spectrum resource of the first network be used) or the adjusted information about the first spectrum resource indicates a spectrum resource 2 of a second network (in other words, it is recommended that only a spectrum resource of the local network be used).

S1507. The PCF sends, to the AMF, a PCF-provided AM policy control create response (Npcf_AM policy control-_create response). Correspondingly, the AMF receives the create response from the PCF. The create response includes the information about the first spectrum resource or the adjusted information about the first spectrum resource (also referred to as information about the first spectrum resource below).

Further, in this embodiment of this application, after the AMF obtains the subscription information of the first terminal device, the spectrum resource sharing method provided in this embodiment of this application may further include the following steps.

S1508. The AMF sends an N2 message to a RAN device. Correspondingly, the RAN device receives the N2 message from the AMF. The N2 message includes the information about the first spectrum resource.

S1509. The AMF sends a registration accept message to the first terminal device. Correspondingly, the first terminal device receives the registration accept message from the AMF.

S1510. The RAN device occupies the first spectrum resource for the first terminal device based on the information about the first spectrum resource.

For related descriptions and examples in which the RAN device occupies the first spectrum resource for the first terminal device, refer to the embodiment shown in FIG. 9. Details are not described herein again.

In some embodiments, the spectrum resource sharing method provided in this embodiment of this application further includes: The RAN device stores a correspondence between the first spectrum resource and the PLMN ID and/or the RAT type. After determining the first spectrum resource, the RAN device may further determine, based on the correspondence between the first spectrum resource and the PLMN ID and/or the RAT type, the PLMN ID and/or the RAT type corresponding to the first spectrum resource. Further, the RAN device may determine that the first spectrum resource belongs to a network corresponding to the PLMN ID and/or that the first spectrum resource is for the RAT type. In this way, it may be convenient for the RAN device to collect statistics on spectrum resource occupation from a PLMN ID and/or RAT dimension. This is uniformly described herein, and details are not described below.

It should be noted that, in this embodiment of this application, the RAN device may occupy the first spectrum resource for the first terminal device when determining that a required quantity of spectrum resources of the second network to which the first terminal device subscribes is greater than or equal to a preset threshold. Certainly, alternatively, after receiving the information about the first spectrum resource, the RAN device may directly occupy the first spectrum resource for the first terminal device without determining whether a required quantity of spectrum resources of the second network to which the first terminal device subscribes is greater than or equal to a preset threshold. This is not specifically limited in this embodiment of this application.

For technical effects of the embodiment shown in FIG. 15, refer to the embodiment shown in FIG. 9. Details are not described herein again.

The processor 501 in the communication apparatus 500 shown in FIG. 5 may invoke the application program code stored in the memory 503, to indicate the AMF to perform the actions of the AMF in steps S1501 to S1510. The processor 501 in the communication apparatus 500 shown in FIG. 5 may invoke the application program code stored in the memory 503, to indicate the RAN device to perform the actions of the RAN device in steps S1501 to S1510. This is not limited in this embodiment.

Figure 16:
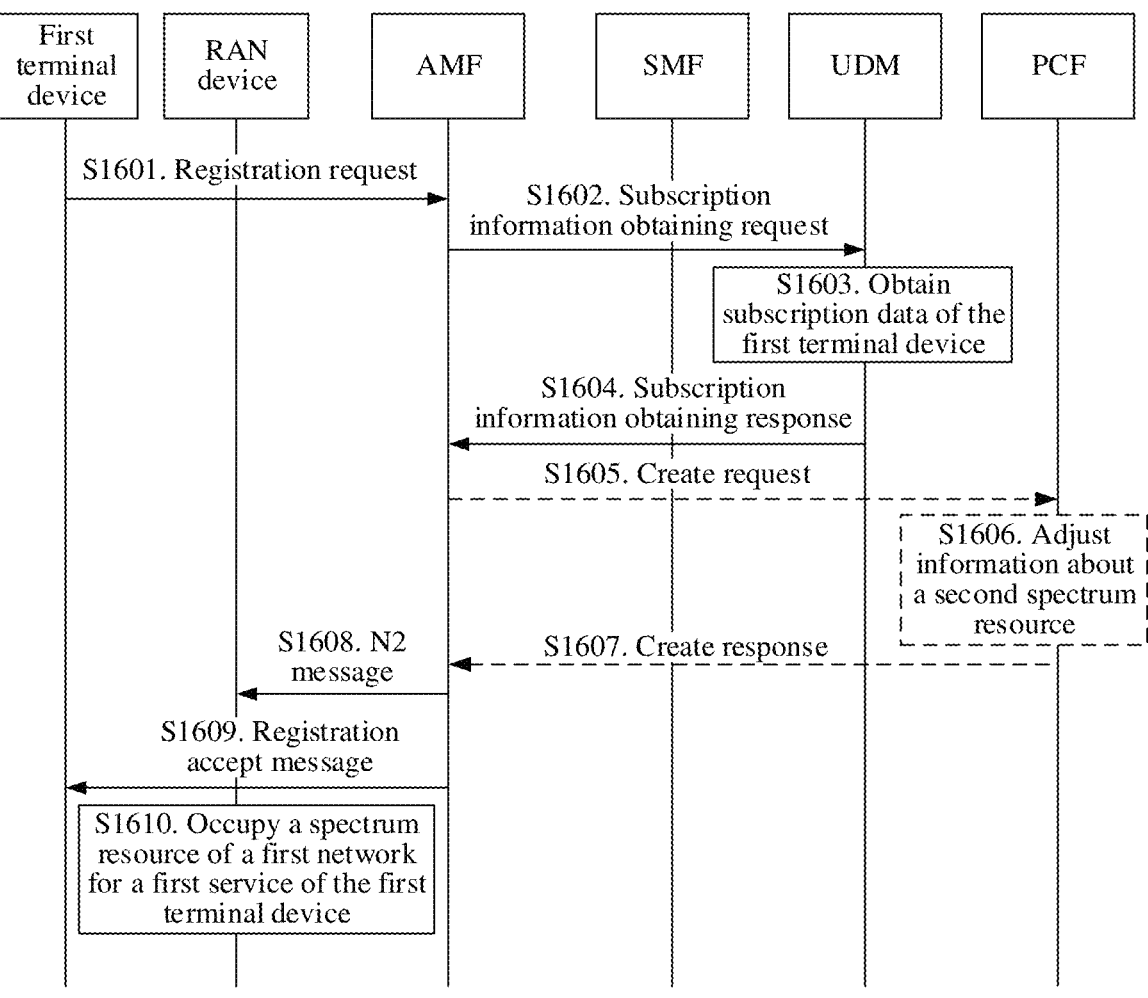
FIG. 16 is a schematic flowchart 5 of a spectrum resource sharing method applied to a 5G network according to an embodiment of this application.

With reference to the spectrum resource sharing method in FIG. 10, that the communication system in FIG. 2 is applied to the 5G network shown in FIG. 4 is used as an example. FIG. 16 shows another spectrum resource sharing method according to an embodiment of this application. Details are as follows:

S1601 and S1602 are the same as steps S1201 and S1202 in the embodiment shown in FIG. 12. Details are not described herein again.

S1603. The UDM obtains the subscription information of the first terminal device. The subscription information includes information about a second spectrum resource. For related descriptions of the information about the second spectrum resource, refer to the embodiment shown in FIG. 10. Details are not described herein again.

Certainly, in this embodiment of this application, the subscription information of the first terminal device may further include some existing subscription information, for example, slice information and/or mobility restriction information of the first terminal device. This is not specifically limited in this embodiment of this application.

In some embodiments, the subscription information of the first terminal device is preconfigured in a UDR. Further, when the UDM receives the subscription information obtaining request from the AMF, the UDM obtains the subscription information of the first terminal device from the UDR and stores the subscription information in the UDM.

In some embodiments, the information about the second spectrum resource further indicates a PLMN ID and/or a RAT type corresponding to the second spectrum resource. This is not specifically limited in this embodiment of this application.

S1604. The UDM sends, to the AMF, a UDM-provided subscription information management service subscription information obtaining response (Nudm_SDM_Get response). Correspondingly, the AMF receives the subscription information obtaining response from the UDM. The subscription information obtaining response includes the subscription information of the first terminal device.

Therefore, the AMF can obtain the subscription information of the first terminal device. The subscription information includes the information about the second spectrum resource. In some embodiments, the UDM may further adjust the information about the second spectrum resource by interacting with a PCF, as shown in steps S1605 to S1607.

S1605. The AMF sends, to the PCF, a PCF-provided access and mobility (AM) policy control create request (Npcf_AM policy control_create request). Correspondingly, the PCF receives the create request from the AMF. The create request includes the information about the second spectrum resource.

S1606. The PCF adjusts the information about the second spectrum resources according to a local policy.

For example, the information about the second spectrum resource in the subscription information of the terminal device includes a first identifier, and the first identifier indicates a spectrum resource 1 of a first network. In this case, the PCF may adjust the first identifier, where the adjusted first identifier indicates a spectrum resource 2 of the first network (in other words, it is recommended that another spectrum resource of the first network be used) or the adjusted first identifier indicates a spectrum resource 2 of a second network (in other words, it is recommended that only a spectrum resource of the local network be used).

S1607. The PCF sends, to the AMF, a PCF-provided AM policy control create response (Npcf_AM policy control-_create response). Correspondingly, the AMF receives the create response from the PCF. The create response includes the information about the second spectrum resource or the adjusted information about the second spectrum resource (also referred to as information about the second spectrum resource below).

Further, in this embodiment of this application, after the AMF obtains the subscription information of the first terminal device, the spectrum resource sharing method provided in this embodiment of this application may further include the following steps.

S1608. The AMF sends an N2 message to a RAN device. Correspondingly, the RAN device receives the N2 message from the AMF. The N2 message includes the information about the second spectrum resource.

S1609. The AMF sends a registration accept message to the first terminal device. Correspondingly, the first terminal device receives the registration accept message from the AMF.

S1610. The RAN device occupies the second spectrum resource for a first service of the first terminal device based on the information about the second spectrum resource.

For related descriptions and examples in which the RAN device occupies the second spectrum resource for the first service of the first terminal device based on the information about the second spectrum resource, refer to the embodiment shown in FIG. 10. Details are not described herein again.

In some embodiments, the spectrum resource sharing method further includes: The RAN device stores a correspondence between the second spectrum resource and the PLMN ID and/or the RAT type. After determining the second spectrum resource, the RAN device may further determine, based on the correspondence between the second spectrum resource and the PLMN ID and/or the RAT type, the PLMN ID and/or the RAT type corresponding to the second spectrum resource. Further, the RAN device may determine that the second spectrum resource belongs to a network corresponding to the PLMN ID and/or that the second spectrum resource is for the RAT type. In this way, it may be convenient for the RAN device to collect statistics on spectrum resource occupation from a PLMN ID and/or RAT dimension. This is uniformly described herein, and details are not described below.

It should be noted that, in this embodiment of this application, the RAN device may occupy the second spectrum resource for the first service of the first terminal device based on the information about the second spectrum resource when determining that a required quantity of spectrum resources of the second network to which the first terminal device subscribes is greater than or equal to a preset threshold. Certainly, alternatively, after receiving the information about the second spectrum resource, the RAN device may directly occupy the second spectrum resource for the first service of the first terminal device without determining whether a required quantity of spectrum resources of the second network to which the first terminal device subscribes is greater than or equal to a preset threshold. This is not specifically limited in this embodiment of this application.

For technical effects of the embodiment shown in FIG. 16, refer to the embodiment shown in FIG. 10. Details are not described herein again.

The processor 501 in the communication apparatus 500 shown in FIG. 5 may invoke the application program code stored in the memory 503, to indicate the AMF to perform the actions of the AMF in steps S1601 to S1610. The processor 501 in the communication apparatus 500 shown in FIG. 5 may invoke the application program code stored in the memory 503, to indicate the RAN device to perform actions of the RAN device in steps S1601 to S1610. This is not limited in this embodiment.

Figure 17:
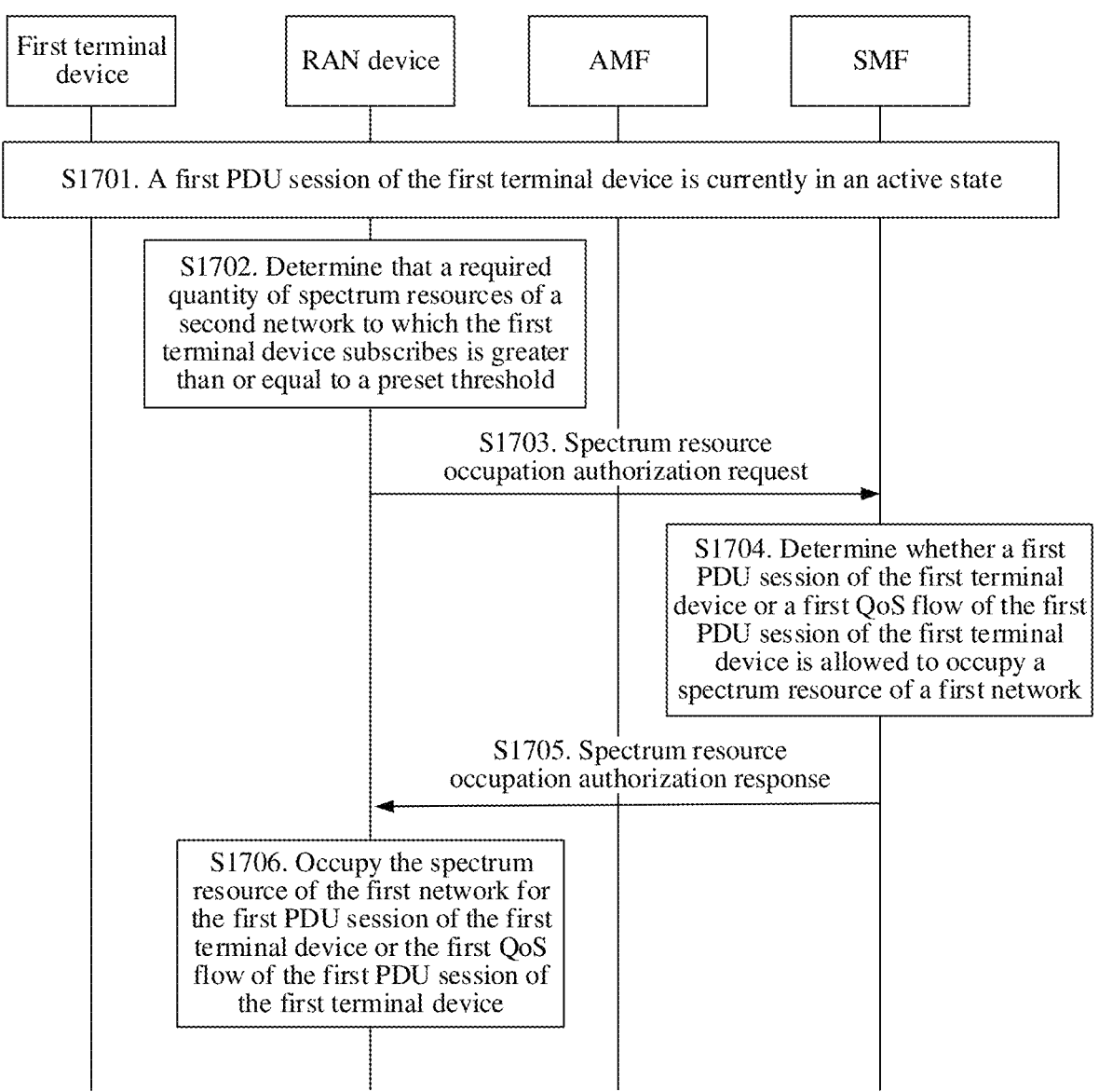
FIG. 17 is a schematic flowchart 6 of a spectrum resource sharing method applied to a 5G network according to an embodiment of this application.

With reference to the spectrum resource sharing method in FIG. 11, that the communication system in FIG. 3 is applied to the 5G network shown in FIG. 4 is used as an example. FIG. 17 shows another spectrum resource sharing method according to an embodiment of this application. Details are as follows:

S1701. A first PDU session of a first terminal device is currently in an active state.

In this embodiment of this application, that the first PDU session of the first terminal device is currently in the active state means that the first terminal device may send and receive data to and from a UPF on a network side by using the first PDU session. Specifically, an N3 interface data transmission channel is established between the UPF and a RAN device for the first PDU session, and an air interface data transmission channel, for example, a data radio bearer (DRB), is established between the RAN device and the first terminal device for the first PDU session. In this way, the first terminal device may perform data receiving and sending with the UPF on the network side through the N3 interface data transmission channel and the air interface data transmission channel of the first PDU session.

It should be noted that in this embodiment of this application, the 5G network is used as an example for description. Therefore, a first session is the first PDU session. Certainly, in another future network, the session may be another session than the PDU session. This is not specifically limited in this embodiment of this application.

S1702. The RAN device determines that a required quantity of spectrum resources of a second network to which the first terminal device subscribes is greater than or equal to a preset threshold.

S1703. The RAN device sends a spectrum resource occupation authorization request (radio resource usage authorization request) to an SMF. Correspondingly, the SMF receives the spectrum resource occupation authorization request from the RAN device. The spectrum resource occupation authorization request includes a session identifier of a first PDU session of the first terminal device and/or a first QoS flow identifier of the first PDU session of the first terminal device.

It should be noted that the spectrum resource occupation authorization request in this embodiment of this application is only a specific example of the sixth message in the embodiment shown in FIG. 11. Certainly, the sixth message in the embodiment shown in FIG. 11 may be another message. This is not specifically limited in this embodiment of this application.

S1704. The SMF determines, based on subscription information of the first terminal device and/or session policy information of the first terminal device, that the first PDU session of the first terminal device or a first QoS flow of the first PDU session of the first terminal device is allowed to occupy a spectrum resource of a first network.

For related descriptions of step S1704, refer to step S1304 in the embodiment shown in FIG. 13. Details are not described again herein.

S1705. The SMF sends a spectrum resource occupation authorization response (radio resource usage authorization response) to the RAN device. Correspondingly, the RAN device receives the spectrum resource occupation authorization response from the SMF.

In some embodiments, when the SMF determines that the first PDU session of the first terminal device or the first QoS flow of the first PDU session of the first terminal device is allowed to occupy the spectrum resource of the first network, the spectrum resource occupation authorization response includes third indication information, and the third indication information indicates that the first PDU session of the first terminal device or the first QoS flow of the first PDU session of the first terminal device is allowed to occupy the spectrum resource of the first network.

In some embodiments, when the SMF determines that the first PDU session of the first terminal device or the first QoS flow of the first PDU session of the first terminal device is allowed to occupy the spectrum resource of the first network, the spectrum resource occupation authorization response further includes during in which the first PDU session of the first terminal device or the first QoS flow of the first PDU session of the first terminal device is allowed to occupy the spectrum resource of the first network.

In some embodiments, when the SMF determines that the first PDU session of the first terminal device or the first QoS flow of the first PDU session of the first terminal device is not allowed to occupy the spectrum resource of the first network, the spectrum resource occupation authorization response includes eighth indication information, and the eighth indication information indicates that the first PDU session of the first terminal device or the first QoS flow of the first PDU session of the first terminal device is not allowed to occupy the spectrum resource of the first network. Certainly, the RAN device may alternatively learn, in an implicit manner, that the network does not allow the first PDU session of the first terminal device or the first QoS flow of the first PDU session of the first terminal device to occupy the spectrum resource of the first network. For example, when the spectrum resource occupation authorization response does not include the third indication information, the RAN device may determine that the network does not allow the first PDU session of the first terminal device or the first QoS flow of the first PDU session of the first terminal device to occupy the spectrum resource of the first network; or when the SMF determines that the first PDU session of the first terminal device or the first QoS flow of the first PDU session of the first terminal device is not allowed to occupy the spectrum resource of the first network, the SMF may send a spectrum resource occupation authorization reject/failure (radio resource usage authorization reject/failure) message to the RAN device. Correspondingly, the RAN device receives the spectrum resource occupation authorization reject/failure message from the SMF, and determines, based on the spectrum resource occupation authorization reject/failure message, that the network does not allow the first PDU session of the first terminal device or the first QoS flow of the first PDU session of the first terminal device to occupy the spectrum resource of the first network. This is not specifically limited in this embodiment of this application.

Further, in this embodiment of this application, if the spectrum resource occupation authorization response message includes the third indication information, the spectrum resource sharing method provided in this embodiment of this application further includes the following step S1706:

S1706. The RAN device occupies the spectrum resource of the first network for the first PDU session of the first terminal device or the first QoS flow of the first PDU session of the first terminal device.

For related descriptions and examples in which the RAN device occupies the spectrum resource of the first network for the first PDU session of the first terminal device or the first QoS flow of the first PDU session of the first terminal device, refer to the embodiment shown in FIG. 8. Details are not described herein again.

In this embodiment of this application, when the spectrum resource occupation authorization response includes the duration in which the first PDU session of the first terminal device or the first QoS flow of the first PDU session of the first terminal device is allowed to occupy the spectrum resource of the first network, when duration in which the first PDU session of the first terminal device or the first QoS flow of the first PDU session of the first terminal device occupies the spectrum resource of the first network reaches the duration, the RAN device may no longer occupy the spectrum resource of the first network for the first PDU session of the first terminal device or the first QoS flow of the first PDU session of the first terminal device, to effectively control occupation of a spectrum resource of another network.

For technical effects of the embodiment shown in FIG. 17, refer to the embodiment shown in FIG. 11. Details are not described herein again.

The processor 501 in the communication apparatus 500 shown in FIG. 5 may invoke the application program code stored in the memory 503, to indicate the SMF to perform the actions of the SMF in steps S1701 to S1706. The processor 501 in the communication apparatus 500 shown in FIG. 5 may invoke the application program code stored in the memory 503, to indicate the RAN device to perform the actions of the RAN device in steps S1701 to S1706. This is not limited in this embodiment.

Figures 18, 19:
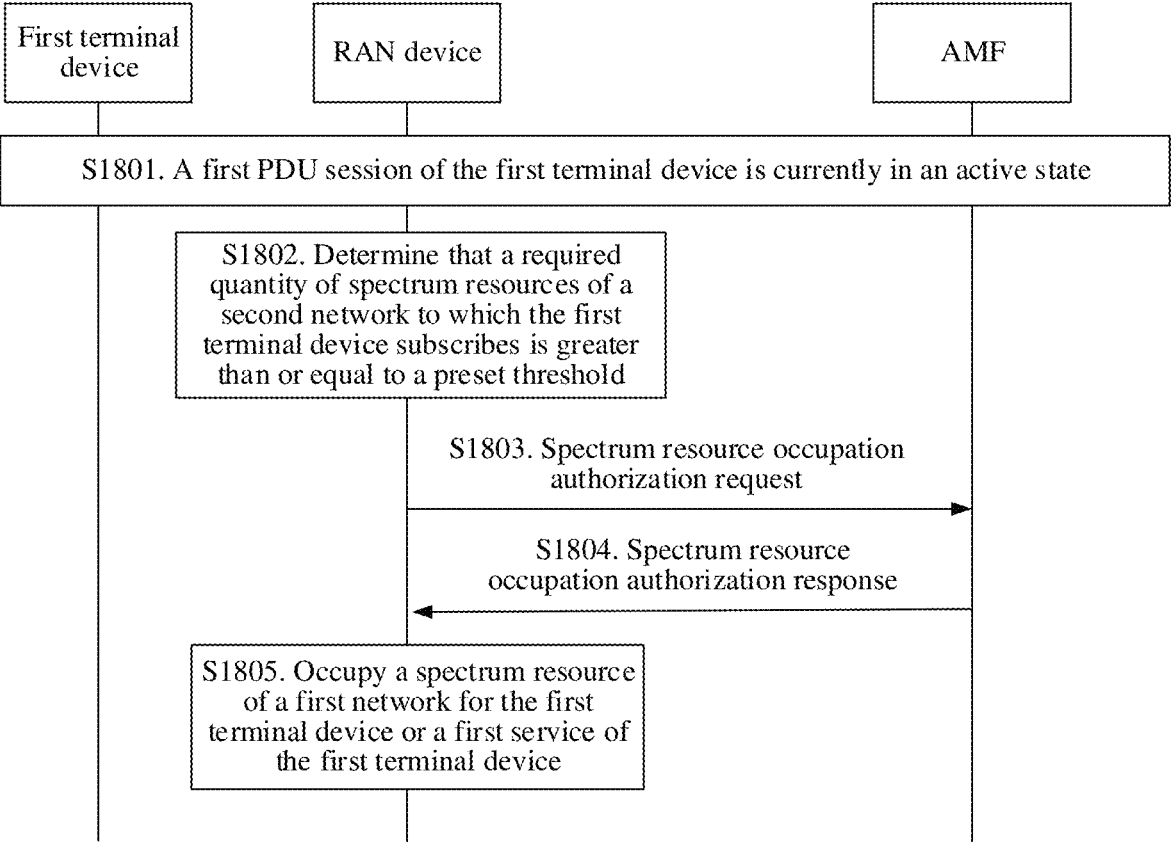
FIG. 18 is a schematic flowchart 7 of a spectrum resource sharing method applied to a 5G network according to an embodiment of this application.
FIG. 19 is a schematic diagram of a structure of another communication apparatus according to an embodiment of this application.

With reference to the spectrum resource sharing method in FIG. 6 or FIG. 7, that the communication system in FIG. 2 is applied to the 5G network shown in FIG. 4 is used as an example. FIG. 18 shows another spectrum resource sharing method according to an embodiment of this application. Details are as follows:

S1801 and S1802 are the same as steps S1701 and S1702 in the embodiment shown in FIG. 17. Details are not described herein again.

S1803. The RAN device sends a spectrum resource occupation authorization request (radio resource usage authorization request) to an AMF. Correspondingly, the AMF receives the spectrum resource occupation authorization request from the RAN device.

It should be noted that the spectrum resource occupation authorization request in this embodiment of this application is only a specific example of the second message in the embodiment shown in FIG. 6 or the fourth message in the embodiment shown in FIG. 7. Certainly, the second message in the embodiment shown in FIG. 6 or the fourth message in the embodiment shown in FIG. 7 may be another message. This is not specifically limited in this embodiment of this application.

S1804. The AMF sends a spectrum resource occupation authorization response (radio resource usage authorization response) to the RAN device based on subscription information of the first terminal device. Correspondingly, the RAN device receives the spectrum resource occupation authorization response from the AMF.

For related descriptions of the subscription information of the first terminal device and a manner of obtaining the subscription information, refer to the embodiment shown in FIG. 12. Details are not described herein again.

In some embodiments, when the subscription information of the first terminal device includes the first information described above, the AMF may determine, based on at least one of the subscription information of the first terminal device, access and mobility control policy information of the first terminal device, or local policy information of a second network, that the first terminal device is allowed to occupy a spectrum resource of a first network. For related descriptions, refer to the embodiment in FIG. 6. Details are not described herein again. Further, the spectrum resource occupation authorization response includes first indication information, and the first indication information indicates that the first terminal device is allowed to occupy the spectrum resource of the first network.

In another possible implementation, when the subscription information of the first terminal device includes at least one of first information, fourth information, or identification information of a first service of the first terminal device, the AMF may determine, based on at least one of the subscription information of the first terminal device, access and mobility control policy information of the first terminal device, or local policy information of the second network, that the first service of the first terminal device is allowed to occupy a spectrum resource of a first network. For related descriptions, refer to the embodiment in FIG. 7. Details are not described herein again. Further, the spectrum resource occupation authorization response includes second indication information, and the second indication information indicates that the first service of the first terminal device is allowed to occupy the spectrum resource of the first network. For example, the second indication information includes indication information indicating that the first service of the first terminal device is allowed to occupy the spectrum resource of the first network and the identification information of the first service that is of the first terminal device and that is allowed to occupy the spectrum resource of the first network.

In some embodiments, when the AMF determines that the first terminal device or the first service of the first terminal device is allowed to occupy the spectrum resource of the first network, the spectrum resource occupation authorization response further includes duration in which the first terminal device or the first service of the first terminal device is allowed to occupy the spectrum resource of the first network.

In some embodiments, when the AMF determines that the first terminal device is not allowed to occupy the spectrum resource of the first network, the spectrum resource occupation authorization response includes seventh indication information, where the seventh indication information indicates that the first terminal device is not allowed to occupy the spectrum resource of the first network. Certainly, the RAN device may alternatively learn, in an implicit manner, that the network does not allow the first terminal device to occupy the spectrum resource of the first network. For example, when the spectrum resource occupation authorization response does not include the first indication information or the second indication information, the RAN device may determine that the network does not allow the first terminal device to occupy the spectrum resource of the first network. Alternatively, when the AMF determines that the first terminal device is not allowed to occupy the spectrum resource of the first network, the AMF may send a spectrum resource occupation authorization reject/failure (radio resource usage authorization reject/failure) message to the RAN device. Correspondingly, the RAN device receives the spectrum resource occupation authorization reject/failure message from the AMF, and determines, based on the spectrum resource occupation authorization reject/failure message, that the network does not allow the first terminal device to occupy the spectrum resource of the first network. This is not specifically limited in this embodiment of this application.

Further, in this embodiment of this application, if the spectrum resource occupation authorization response message includes the first indication information or the second indication information, the spectrum resource sharing method provided in this embodiment of this application further includes the following step S1805:

S1805. The RAN device occupies the spectrum resource of the first network for the first terminal device or the first service of the first terminal device.

In this embodiment of this application, when the spectrum resource occupation authorization response includes the duration in which the first terminal device or the first service of the first terminal device is allowed to occupy the spectrum resource of the first network, when duration in which the first terminal device or the first service of the first terminal device occupies the spectrum resource of the first network reaches the duration, the RAN device may no longer occupy the spectrum resource of the first network for the first terminal device or the first service of the first terminal device, to effectively control occupation of a spectrum resource of another network.

In this embodiment of this application, when the spectrum resource occupation authorization response includes the first indication information, the RAN device may occupy the spectrum resource of the first network for the first terminal device based on the first indication information For related descriptions and examples, refer to the embodiment shown in FIG. 6. Details are not described herein again.

In this embodiment of this application, when the spectrum resource occupation authorization response includes the second indication information, the RAN device may occupy the spectrum resource of the first network for the first service of the first terminal device based on the second indication information For related descriptions and examples, refer to the embodiment shown in FIG. 7. Details are not described herein again.

For technical effects of the embodiment shown in FIG. 18, refer to the embodiment shown in FIG. 5 or FIG. 6. Details are not described herein again.

The processor 501 in the communication apparatus 500 shown in FIG. 5 may invoke the application program code stored in the memory 503, to indicate the AMF to perform the actions of the AMF in steps S1801 to S1805. The processor 501 in the communication apparatus 500 shown in FIG. 5 may invoke the application program code stored in the memory 503, to indicate the RAN device to perform the actions of the RAN device in steps S1801 to S1805. This is not limited in this embodiment.

In some embodiments, in the embodiments shown in FIG. 12 to FIG. 18, if the RAN device occupies the spectrum resource of the first network for the first terminal device, the spectrum resource sharing method provided in embodiments of this application further includes: The RAN device collects statistics on an amount of data that is corresponding to the first terminal device and that is received and sent by the RAN device. If the RAN device occupies the spectrum resource of the first network for the first service of the first terminal device, the spectrum resource sharing method provided in embodiments of this application further includes: The RAN device collects statistics on an amount of data that is corresponding to the first service of the first terminal device and that is received and sent by the RAN device. If the RAN device occupies the spectrum resource of the first network for the first PDU session of the first terminal device or the first QoS flow of the first PDU session of the first terminal device, the spectrum resource sharing method provided in embodiments of this application further includes: The RAN device collects statistics on an amount of data that is corresponding to the first PDU session of the first terminal device or the first QoS flow of the first PDU session of the first terminal device and that is received and sent by the RAN device. In some embodiments, the spectrum resource sharing method provided in embodiments of this application further includes: The RAN device reports the collected amount of data to an operation and management (OAM) system or the SMF for a subsequent charging operation. In other words, in embodiments of this application, statistics collection and reporting of the amount of data may be enabled at a granularity of a terminal device, a granularity of a service of the terminal device, a granularity of a session of the terminal device, or a granularity of a QoS flow of the terminal device, to implement more accurate data monitoring. For example, the RAN device may collect statistics on the amount of data that is corresponding to the first terminal device and that is received and sent by the RAN device, and then report the amount to the SMF; the RAN device may collect statistics on the amount of data that is corresponding to the first service of the first terminal device and that is received and sent by the RAN device, and then report the amount to the SMF; the RAN device may collect statistics on the amount of data that is corresponding to the first PDU session of the first terminal device and that is received and sent by the RAN device, and then report the amount to the SMF; or the RAN device may collect statistics on the amount of data that is corresponding to the first QoS flow of the first PDU session of the first terminal device and that is received and sent by the RAN device, and then report the amount to the SMF. This is not specifically limited in embodiments of this application.

It may be understood that in the foregoing embodiments, a method and/or step implemented by the mobility management entity may alternatively be implemented by a component (such as a chip or circuit) that may be used in the mobility management entity, a method and/or step implemented by the access network device may alternatively be implemented by a component (such as a chip or circuit) that may be used in the access network device, and a method and/or step implemented by the session management entity may alternatively be implemented by a component (such as a chip or circuit) that may be used in the session management entity.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the mobility management entity in the foregoing method embodiments, an apparatus including the mobility management entity, or a component that can be used in the mobility management entity, for example, a chip or a chip system. Alternatively, the communication apparatus may be the access network device in the foregoing method embodiments, an apparatus including the access network device, or a component that can be used in the access network device, for example, a chip or a chip system. Alternatively, the communication apparatus may be the session management entity in the foregoing method embodiments, an apparatus including the session management entity, or a component that can be used in the session management entity, for example, a chip or a chip system. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

FIG. 19 is a schematic diagram of a structure of a communication apparatus 190. The communication apparatus 190 includes a transceiver module 1901 and a processing module 1902. The transceiver module 1901 may also be referred to as a transceiver unit, and is configured to implement a transceiver function. For example, the transceiver module may be a transceiver circuit, a transceiver machine, a transceiver, or a communication interface.

For example, the communication apparatus 190 is the mobility management entity in the foregoing method embodiments.

In some embodiments, the processing module 1902 is configured to determine that a first terminal device is allowed to occupy a spectrum resource of a first network, where the first terminal device subscribes to a second network. The transceiver module 1901 is configured to send first indication information to an access network device, where the first indication information indicates that the first terminal device is allowed to occupy the spectrum resource of the first network.

In some embodiments, the processing module 1902 is specifically configured to determine, based on at least one of subscription information of the first terminal device, access and mobility control policy information of the first terminal device, or local policy information of the second network, that the first terminal device is allowed to occupy the spectrum resource of the first network.

In some embodiments, the subscription information of the first terminal device includes first information, and the first information indicates that the first terminal device is allowed to occupy the spectrum resource of the first network.

In some embodiments, the access and mobility control policy information includes second information, where the second information indicates that the first terminal device is allowed to occupy the spectrum resource of the first network in a first time period, in a first location area, and/or in a first spectrum resource, and the first spectrum resource is a spectrum resource in the first network.

In some embodiments, the local policy information of the second network includes third information, where the third information indicates that a terminal device that subscribes to the second network is allowed to occupy the spectrum resource of the first network.

In another possible implementation, the processing module 1902 is configured to determine that a first service of a first terminal device is allowed to occupy a spectrum resource of a first network, where the first terminal device subscribes to a second network. The transceiver module 1901 is configured to send second indication information to an access network device, where the second indication information indicates that the first service of the first terminal device is allowed to occupy the spectrum resource of the first network.

In some embodiments, the processing module 1902 is specifically configured to determine, based on at least one of subscription information of the first terminal device, access and mobility control policy information of the first terminal device, or local policy information of the second network, that the first service of the first terminal device is allowed to occupy the spectrum resource of the first network.

In some embodiments, the subscription information of the first terminal device includes at least one of the following: first information, fourth information, or identification information of the first service, where the first information indicates that the first terminal device is allowed to occupy the spectrum resource of the first network, and the fourth information indicates that the first service of the first terminal device is allowed to occupy the spectrum resource of the first network.

In some embodiments, the access and mobility control policy information includes fifth information, where the fifth information indicates that the first service of the first terminal device is allowed to occupy the spectrum resource of the first network in a first time period, in a first location area, and/or in a first spectrum resource, and the first spectrum resource is a spectrum resource in the first network.

In some embodiments, the local policy information of the second network includes sixth information, where sixth third information indicates that a first service of a terminal device that subscribes to the second network is allowed to occupy the spectrum resource of the first network.

In still another possible implementation, the processing module 1902 is configured to obtain subscription information of a first terminal device, where the subscription information of the first terminal device includes information about a first spectrum resource, the first spectrum resource is a spectrum resource that is of a first network and that is allowed to be occupied by the first terminal device, and the first terminal device subscribes to a second network. The transceiver module 1901 is configured to send the information about the first spectrum resource to an access network device.

In still another possible implementation, the processing module 1902 is configured to obtain subscription information of a first terminal device, where the subscription information of the first terminal device includes information about a second spectrum resource, the second spectrum resource is a spectrum resource that is of a first network and that is allowed to be occupied by a first service of the first terminal device, and the first terminal device subscribes to a second network. The transceiver module 1901 is configured to send the information about the second spectrum resource to an access network device.

In some embodiments, the information about the second spectrum resource includes a first identifier, where there is a mapping relationship among the first identifier, an identifier of the second spectrum resource, and identification information of the first service.

In some embodiments, the information about the second spectrum resource includes an identifier of the second spectrum resource and identification information of the first service.

For example, the communication apparatus 190 is the access network device in the foregoing method embodiments.

In some embodiments, the transceiver module 1901 is configured to receive first indication information from a mobility management entity, where the first indication information indicates that a first terminal device is allowed to occupy a spectrum resource of a first network, and the first terminal device subscribes to a second network. The processing module 1902 is configured to occupy the spectrum resource of the first network for the first terminal device based on the first indication information.

In another possible implementation, the transceiver module 1901 is configured to receive second indication information from a mobility management entity, where the second indication information indicates that a first service of a first terminal device is allowed to occupy a spectrum resource of a first network, and the first terminal device subscribes to a second network. The processing module 1902 is configured to occupy the spectrum resource of the first network for the first service of the first terminal device based on the second indication information.

In still another possible implementation, the transceiver module 1901 is configured to receive third indication information from a session management entity, where the third indication information indicates that a first session of a first terminal device is allowed to occupy a spectrum resource of a first network, or the third indication information indicates that a first QoS flow of the first session of the first terminal device is allowed to occupy the spectrum resource of the first network, and the first terminal device subscribes to a second network. The processing module 1902 is configured to occupy the spectrum resource of the first network for the first session of the first terminal device or the first QoS flow of the first session of the first terminal device based on the third indication information.

In still another possible implementation, the transceiver module 1901 is configured to receive information about a first spectrum resource from a mobility management entity, where the first spectrum resource is a spectrum resource that is of a first network and that is allowed to be occupied by a first terminal device, and the first terminal device subscribes to a second network. The processing module 1902 is configured to occupy the first spectrum resource for the first terminal device based on the information about the first spectrum resource.

In still another possible implementation, the transceiver module 1901 is configured to receive information about a second spectrum resource from a mobility management entity, where the second spectrum resource is a spectrum resource that is of a first network and that is allowed to be occupied by a first service of a first terminal device, and the first terminal device subscribes to a second network. The processing module 1902 is configured to occupy the second spectrum resource for the first service of the first terminal device based on the information about the second spectrum resource.

In some embodiments, the information about the second spectrum resource includes a first identifier, where there is a mapping relationship among the first identifier, an identifier of the second spectrum resource, and identification information of the first service.

In some embodiments, the information about the second spectrum resource includes an identifier of the second spectrum resource and identification information of the first service.

In some embodiments, when the information about the second spectrum resource includes the first identifier, the processing module is specifically configured to: determine the second spectrum resource based on the first identifier and a mapping relationship between the first identifier and the identifier of the second spectrum resource; determine the first service based on the first identifier and a mapping relationship between the first identifier and the identification information of the first service; and occupy the second spectrum resource for the first service of the first terminal device.

For example, the communication apparatus 190 is the session management entity in the foregoing method embodiments.

In some embodiments, the processing module 1902 is configured to determine that a first session of a first terminal device or a first QoS flow of the first session of the first terminal device is allowed to occupy a spectrum resource of a first network, where the first terminal device subscribes to a second network. The transceiver module 1901 is further configured to send third indication information to an access network device, where the third indication information indicates that the first session of the first terminal device is allowed to occupy the spectrum resource of the first network, or the third indication information indicates that the first QoS flow of the first session of the first terminal device is allowed to occupy the spectrum resource of the first network.

In some embodiments, the processing module 1902 is specifically configured to determine, based on subscription information of the first terminal device and/or session policy information of the first terminal device, that the first session of the first terminal device or the first QoS flow of the first session of the first terminal device is allowed to occupy the spectrum resource of the first network.

In some embodiments, a service corresponding to the first QoS flow of the first session of the first terminal device is a first service, and the subscription information of the first terminal device includes at least one of the following: first information, fourth information, or identification information of the first service, where the first information indicates that the first terminal device is allowed to occupy the spectrum resource of the first network, and the fourth information indicates that the first service of the first terminal device is allowed to occupy the spectrum resource of the first network.

In some embodiments, the service corresponding to the first QoS flow of the first session of the first terminal device is the first service, and the session policy information of the first terminal device includes seventh information, where the seventh information indicates that the first service of the first terminal device is allowed to occupy the spectrum resource of the first network.

In some embodiments, the transceiver module 1901 is further configured to receive session policy information of the first terminal device from a policy control entity.

All related content of the steps in the foregoing method embodiments may be cited in function descriptions of the corresponding functional modules. Details are not described herein again.

In this embodiment, the communication apparatus 190 is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 190 may be in a form of the communication apparatus 500 shown in FIG. 5.

For example, the processor 501 in the communication apparatus 500 shown in FIG. 5 may invoke the computer-executable instructions stored in the memory 503, so that the communication apparatus 500 performs the spectrum resource sharing method in the foregoing method embodiments.

Specifically, functions/implementation processes of the transceiver module 1901 and the processing module 1902 in FIG. 19 may be implemented by the processor 501 in the communication apparatus 500 shown in FIG. 4 by invoking the computer-executable instructions stored in the memory 503. Alternatively, a function/implementation process of the processing module 1902 in FIG. 19 may be implemented by the processor 501 in the communication apparatus 500 shown in FIG. 4 by invoking the computer-executable instructions stored in the memory 503, and a function/implementation process of the transceiver module 1901 in FIG. 19 may be implemented by using the communication interface 504 in the communication apparatus 500 shown in FIG. 4.

The communication apparatus 190 provided in this embodiment can perform the foregoing spectrum resource sharing method. Therefore, for a technical effect that can be achieved by the communication apparatus, refer to the foregoing method embodiments. Details are not described herein again.

It should be noted that one or more of the foregoing modules or units may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into an SoC (system-on-a-chip) or an ASIC, or may be an independent semiconductor chip. In addition to a core for executing software instructions to perform operations or processing, the processor may further include a necessary hardware accelerator, for example, a field programmable gate array (FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processor (DSP) chip, a microcontroller unit (MCU), an artificial intelligence processor, an ASIC, an SoC, an FPGA, a PLD, a dedicated digital circuit, a hardware accelerator, or a non-integrated discrete device, and the hardware may run necessary software or does not depend on software to perform the foregoing method procedures.

In some embodiments, a chip system, including at least one processor and an interface, where the at least one processor is coupled to a memory through the interface. When the at least one processor executes a computer program or instructions in the memory, the method in any one of the foregoing method embodiments is performed. In some embodiments, the communication apparatus further includes a memory. In some embodiments, the chip system may include a chip, or may include a chip and another discrete component. This is not specifically limited in embodiments of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A spectrum resource sharing method, wherein the method comprises:

determining, by a mobility management entity, that a first terminal device is configured to be allowed to occupy a spectrum resource of a first network, wherein the first terminal device is configured to subscribe to a second network, and the mobility management entity is in the second network; and sending, by the mobility management entity, first indication information to an access network device, wherein the first indication information is useable to indicate that the first terminal device is configured to be allowed to occupy the spectrum resource of the first network, and the access network device is shared by the first network and the second network, wherein the determining, by the mobility management entity, that the first terminal device is configured to be allowed to occupy the spectrum resource of the first network comprises:

determining, by the mobility management entity based on subscription information of the first terminal device that the first terminal device is configured to be allowed to occupy the spectrum resource of the first network, wherein the subscription information of the first terminal device comprises first information, and the first information indicates that the first terminal device is configured to be allowed to occupy the spectrum resource of the first network.

2. The method according to claim 1, wherein the determining, by the mobility management entity, that the first terminal device is configured to be allowed to occupy the spectrum resource of the first network further comprises:

determining, by the mobility management entity based on at least one of subscription information of the first terminal device, access and mobility control policy information of the first terminal device, or local policy information of the second network, that the first terminal device is configured to be allowed to occupy the spectrum resource of the first network.

3. The method according to claim 2, wherein the access and mobility control policy information of the first terminal device comprises second information, wherein the second information is useable to indicate that the first terminal device is configured to be allowed to occupy the spectrum resource of the first network in at least one of a first time period, a first location area, or a first spectrum resource, and the first spectrum resource is in the first network; or the local policy information of the second network comprises third information, wherein the third information is useable to indicate that a terminal device that is configured to subscribe to the second network is configured to be allowed to occupy the spectrum resource of the first network.

4. The method according to claim 1, wherein the first network is a first public land mobile network (PLMN) network, and the second network is a second PLMN network; and one of:

the first network is a public network, and the second network is a private network; or the first network is the private network, and the second network is the public network.

5. A spectrum resource sharing method, wherein the method comprises:

receiving, by an access network device, first indication information from a mobility management entity, wherein the first indication information is useable to indicate that a first terminal device is configured to be allowed to occupy a spectrum resource of a first network, the first terminal device is configured to subscribe to a second network, the mobility management entity is in the second network, and the access network device is shared by the first network and the second network; and occupying, by the access network device, the spectrum resource of the first network for the first terminal device based on the first indication information;

wherein the first terminal device is determined to be configured to be allowed to occupy the spectrum resource of the first network based on subscription information of the first terminal device;

wherein the subscription information of the first terminal device comprises first information, and the first information indicates that the first terminal device is configured to be allowed to occupy the spectrum resource of the first network.

6. A communication apparatus comprising:

a processor, and a memory, wherein the memory is configured to store non-transitory instructions; and the processor is configured to execute the non-transitory instructions thereby causing the communication apparatus to perform operations comprising:

determining that a first terminal device is configured to be allowed to occupy a spectrum resource of a first network, wherein the first terminal device is configured to subscribe to a second network, and the communication apparatus is a mobility management entity in the second network;

sending first indication information to an access network device, wherein the first indication information is useable to indicate that the first terminal device is configured to be allowed to occupy the spectrum resource of the first network, and the access network device is shared by the first network and the second network; and determining, based on subscription information of the first terminal device, that the first terminal device is configured to be allowed to occupy the spectrum resource of the first network, wherein the subscription information of the first terminal device comprises first information, and the first information indicates that the first terminal device is configured to be allowed to occupy the spectrum resource of the first network.

7. The communication apparatus according to claim 6, wherein the operations further comprise:

determine, based on at least one of subscription information of the first terminal device, access and mobility control policy information of the first terminal device, or local policy information of the second network, that the first terminal device is configured to be allowed to occupy the spectrum resource of the first network.

8. The communication apparatus according to claim 7, wherein the access and mobility control policy information of the first terminal device comprises second information, wherein the second information is useable to indicate that the first terminal device is configured to be allowed to occupy the spectrum resource of the first network in at least one of a first time period, a first location area, or a first spectrum resource, and the first spectrum resource is in the first network; or the local policy information of the second network comprises third information, wherein the third information is useable to indicate that a terminal device that is configured to subscribe to the second network is configured to be allowed to occupy the spectrum resource of the first network.

9. The communication apparatus according to claim 6, wherein the first network is a first public land mobile network (PLMN) network, and the second network is a second PLMN network; and one of:

the first network is a public network, and the second network is a private network; or the first network is the private network, and the second network is the public network.

10. A communication system, comprising:

a mobility management entity; and an access network device, wherein the mobility management entity is in a second network, and the access network device is shared by a first network and the second network, wherein the mobility management entity is configured to: determine that a first terminal device is configured to be allowed to occupy a spectrum resource of the first network, and send first indication information to the access network device, wherein the first indication information is useable to indicate that the first terminal device is configured to be allowed to occupy the spectrum resource of the first network, and the first terminal device is configured to subscribe to the second network;

the access network device is configured to: receive the first indication information from the mobility management entity, and occupy the spectrum resource of the first network for the first terminal device based on the first indication information; and the mobility management entity is further configured to:

determine, based on subscription information of the first terminal device, that the first terminal device is configured to be allowed to occupy the spectrum resource of the first network;

wherein the subscription information of the first terminal device comprises first information, and the first information indicates that the first terminal device is configured to be allowed to occupy the spectrum resource of the first network.

11. The communication system according to claim 10, wherein the mobility management entity is further configured to:

determine, based on at least one of subscription information of the first terminal device, access and mobility control policy information of the first terminal device, or local policy information of the second network, that the first terminal device is configured to be allowed to occupy the spectrum resource of the first network.

12. The communication system according to claim 11, wherein the access and mobility control policy information of the first terminal device comprises second information, wherein the second information is useable to indicate that the first terminal device is configured to be allowed to occupy the spectrum resource of the first network in at least one of a first time period, a first location area, or a first spectrum resource, and the first spectrum resource is in the first network; or the local policy information of the second network comprises third information, wherein the third information is useable to indicate that a terminal device that is configured to subscribe to the second network is configured to be allowed to occupy the spectrum resource of the first network.

13. The communication system according to claim 10, wherein the first network is a first public land mobile network (PLMN) network, and the second network is a second PLMN network; and one of:

the first network is a public network, and the second network is a private network; or the first network is a private network, and the second network is a public network.

* * * * *